(12) United States Patent
Taira et al.

(10) Patent No.: US 7,424,210 B2
(45) Date of Patent: Sep. 9, 2008

(54) INFORMATION STORAGE MEDIUM, INFORMATION REPRODUCTION DEVICE, INFORMATION REPRODUCTION METHOD

(75) Inventors: Kazuhiko Taira, Yokohama (JP); Hideo Ando, Hino (JP); Hideki Mimura, Yokohama (JP); Yoichiro Yamagata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 798 days.

(21) Appl. No.: 10/933,442

(22) Filed: Sep. 3, 2004

(65) Prior Publication Data
US 2005/0084245 A1 Apr. 21, 2005

(30) Foreign Application Priority Data
Sep. 5, 2003 (JP) ............... 2003-314277

(51) Int. Cl.
H04N 7/26 (2006.01)
H04N 5/00 (2006.01)

(52) U.S. Cl. ...................... 386/125; 386/124

(58) Field of Classification Search .............. 386/96, 386/124, 125, 123, 120, 45
See application file for complete search history.

(56) References Cited

U.S. PATENT DOCUMENTS

| | | | |
|---|---|---|---|
| 5,636,200 A | 6/1997 | Taira et al. | |
| 5,642,346 A | 6/1997 | Taira et al. | |
| 5,721,724 A | 2/1998 | Taira et al. | |
| 5,758,007 A | 5/1998 | Kitamura et al. | |
| 5,831,966 A | 11/1998 | Taira et al. | |
| 5,963,704 A | 10/1999 | Mimura et al. | |
| 6,094,414 A | 7/2000 | Taira et al. | |
| 6,160,952 A | 12/2000 | Mimura et al. | |
| 6,167,002 A | 12/2000 | Taira et al. | |
| 6,253,025 B1* | 6/2001 | Kitamura et al. | 386/125 |
| 2004/0163116 A1* | 8/2004 | Taira et al. | 725/89 |
| 2004/0223745 A1* | 11/2004 | Sawabe et al. | 386/96 |

FOREIGN PATENT DOCUMENTS

| | | |
|---|---|---|
| EP | 0 730 272 A2 | 9/1996 |
| EP | 1 235 437 A1 | 8/2002 |
| EP | 1 263 232 A2 | 12/2002 |
| EP | 1 296 518 A2 | 3/2003 |
| JP | 2677775 | 7/1997 |
| JP | 2002-268700 | 9/2002 |
| WO | WO 01/50732 A2 | 7/2001 |

OTHER PUBLICATIONS

"How to order DVD Book (DVD Specifications)", //www.dvdfllc.co.jp/howto/howto.htm, Aug. 2, 2005, 1 Page.
Miho Yonemura, "DVD FLLC", Legal status of DVD books, www.dvdfllc.co.jp, Dec. 21, 2005, 1 Page.

* cited by examiner

*Primary Examiner*—Robert Chevalier
(74) *Attorney, Agent, or Firm*—Oblon, Spivak, McClelland, Maier & Neustadt, P.C.

(57) ABSTRACT

An information storage medium records a video object unit comprising a sub-picture pack comprising sub-picture units, each of the sub-picture units comprising a sub-picture unit header, pixel data, and a sub-picture display control sequence table, and the sub-picture unit header comprising a pre-header and a post header.

4 Claims, 60 Drawing Sheets

HDVMGI_MAT

| | | |
|---|---|---|
| 310 — HD video manager information management table (HDVMGI_MAT) | HDVMG_ID | HD video manager identifier |
| | HDVMG_EA | End address of HD video manager |
| | HDVMGI_EA | End address of HD video manager information |
| | VERN | Version number of HD-DVD video standards |
| | HDVMG_CAT | HD video manager category |
| | VLMS_ID | Volume set identifier |
| | ADP_ID | Adaptation identifier |
| | HDVTS_Ns | Number of HD video title sets |
| | PVR_ID | Identifier unique to provider |
| | POS_CD | POS code |
| | HDVMGI_MAT_EA | End address of HD video manager management information table |
| | FP_PGCI_SA | Start address of first play program chain information |
| | HDVMGM_VOBS_SA | Start address of HDVMGM_VOBS |
| | HDMENU_AOBS_SA | Start address of HDVMGM_AOBS |
| | TT_SRPT_SA | Start address of TT_SRPT |
| | HDVMGM_PGCI_UT_SA | Start address of HDVMGM_PGCI_UT |
| | PTL_MAIT_SA | Start address of PTL_MAIT |
| | HDVTS_ATRT_SA | Start address of HDVTS_ATRT |
| | TXTDT_MG_SA | Start address of TXTDT_MG |
| | HDVMGM_C_ADT_SA | Start address of HDVTSM_C_ADT |
| | HDVMGM_VOBU_ADMAP_SA | Start address of HDVTSM_VOBU_ADMAP |
| | HDMENU_AOBSIT_SA | Start address of information table HDVMGM_AOBS |
| | HDVMGM_V_ATR | Video attribute of HDVMGM |
| | HDVMGM_AST_Ns | Number of HDVMGM audio streams |
| | HDVMGM_AST_ATR | Attribute of HDVMGM audio stream |
| | HDVMGM_SPST_Ns | Number of HDVMGM sub-picture streams |
| | HDVMGM_SPST_ATR | Attribute of HDVMGM sub-picture stream |
| | HDVMGM_GUST_Ns | Number of HDVMGM graphic unit streams |
| | HDVMGM_GUST_ATR | Attribute of HDVMGM graphic unit stream |
| | FP_PGCI | First play PGCI |

FIG. 4

HDVMGM_PGC_CAT

| Byte \ Bit | b7 | b6 | b5 | b4 | b3 | b2 | b1 | b0 |
|---|---|---|---|---|---|---|---|---|
| 0 | Entry type | Reserved | Audio information selection | | | | | |
| 1 | Block mode | | Block type | | Menu ID | | | |
| 2 | PTL_ID_FLD (upper bits) | | | | | | | |
| 3 | PTL_ID_FLD (lower bits) | | | | Audio information number | | | |

F I G. 8

Audio information selection
Indicate selection of audio reproduction of HDMENU_AOBS or
HDVMGM_VOBS, and start/end trigger of HDMENU_AOBS
...00b : Audio in VOB designated by PGC is reproduced (stop HDMENU_AOBS)
...10b : HDMENU_AOBS is continuously reproduced (ignore audio in VOB)
...11b : Start reproduction of HDMENU_AOBS (ignore audio in VOB)

Audio information number
Designate AOB number #n to be reproduced in HDMENU_AOBS

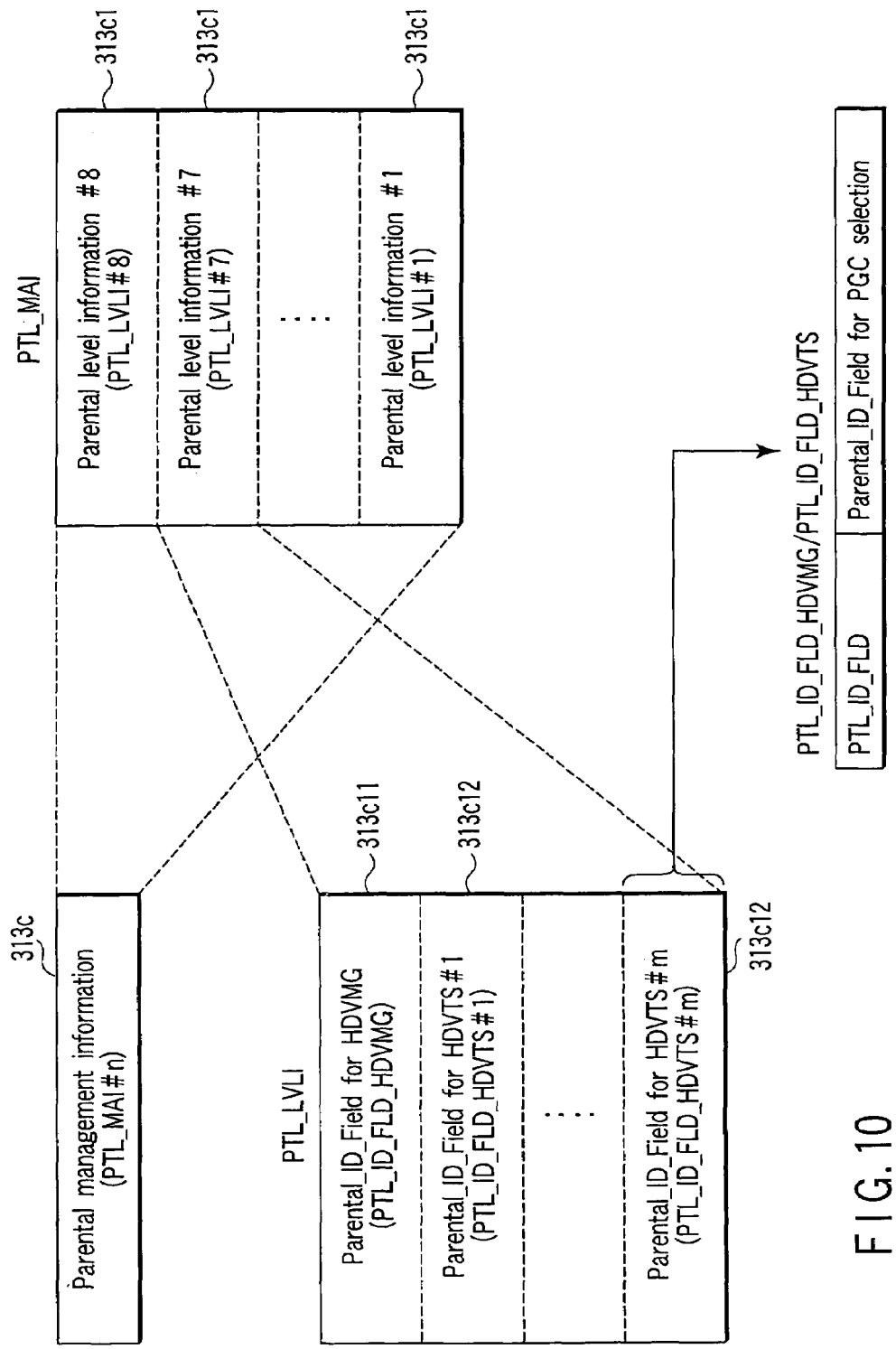
F I G. 10

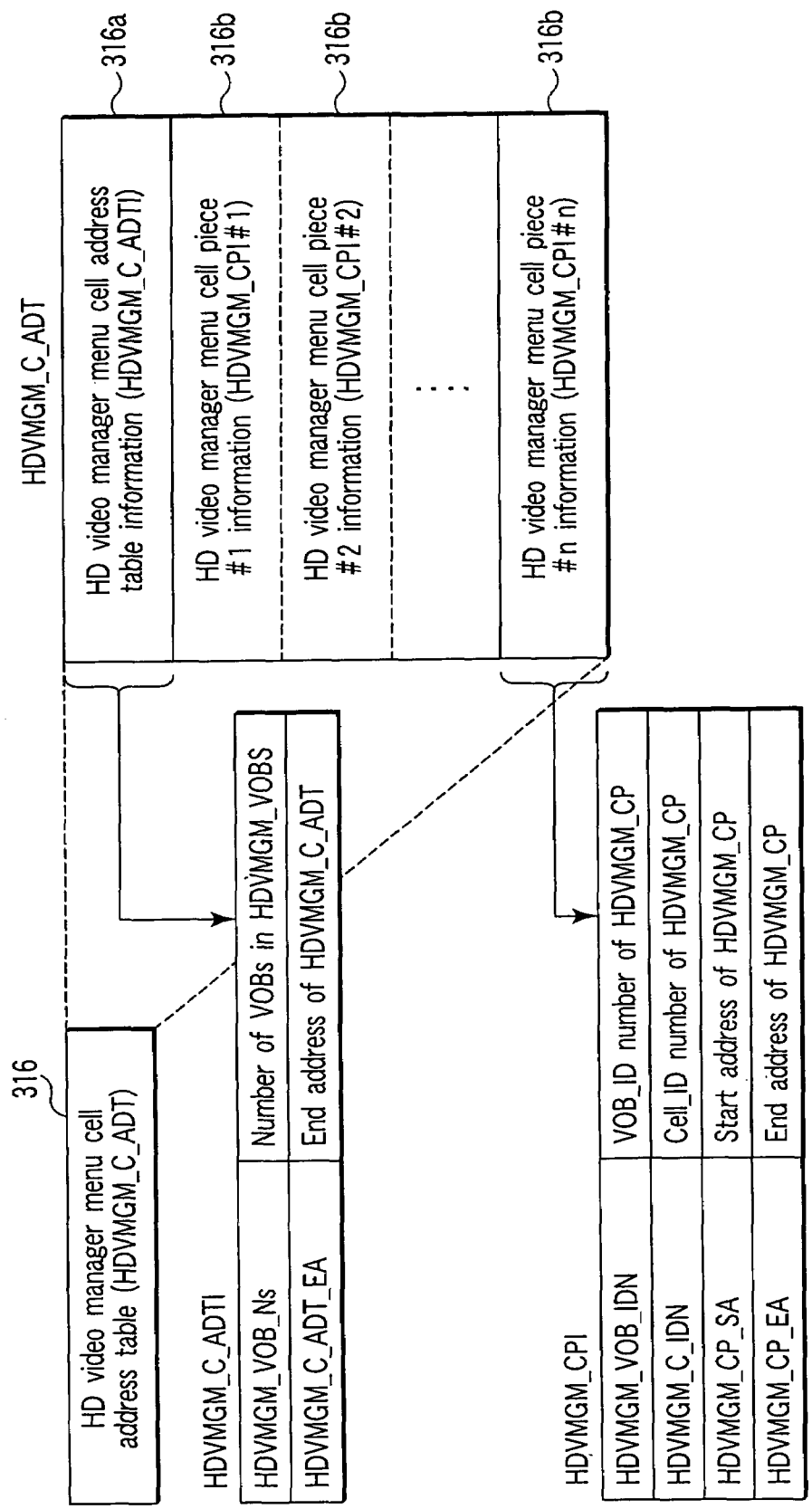
F I G. 15

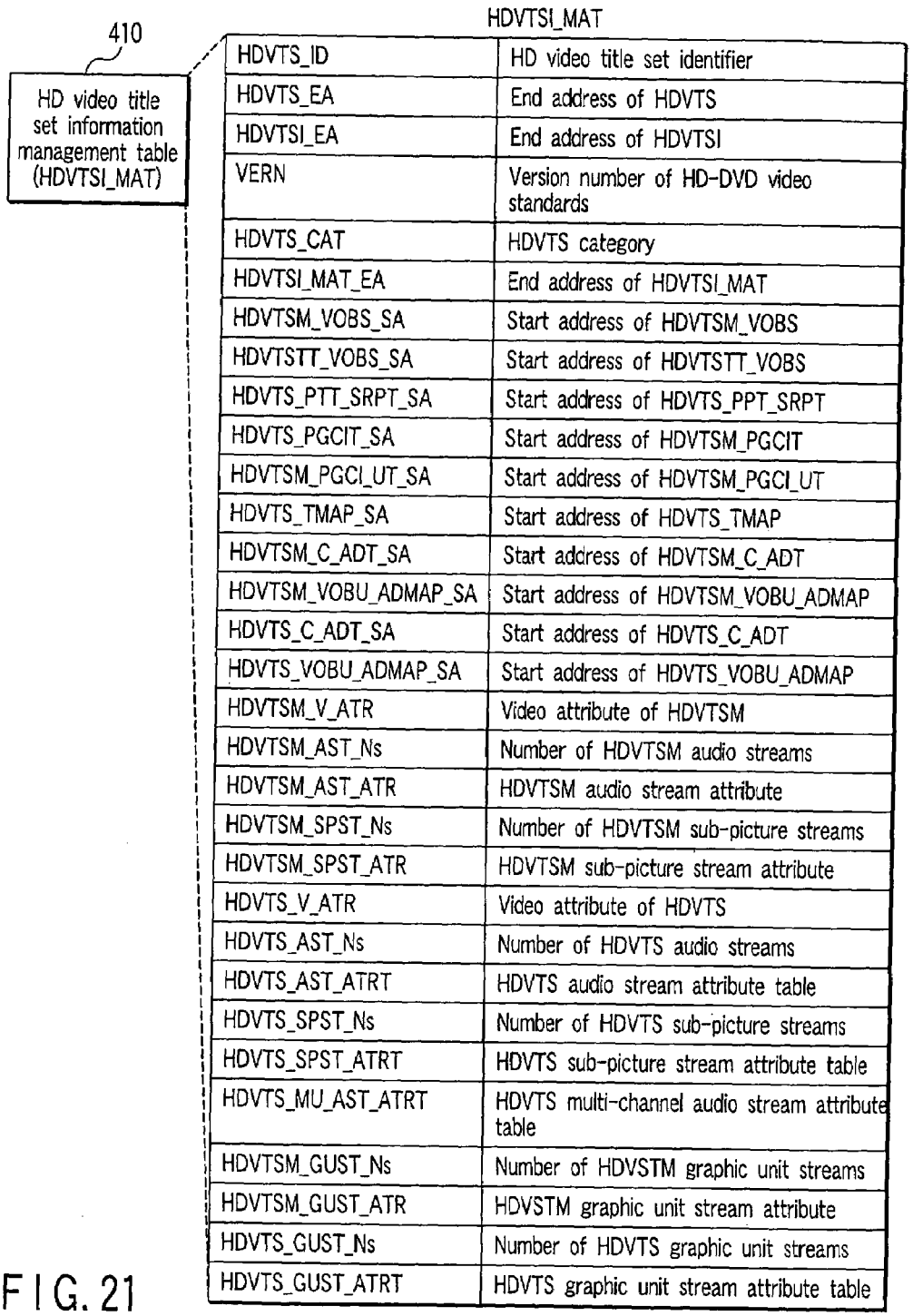

| HDVTSI_MAT | |
|---|---|
| HDVTS_ID | HD video title set identifier |
| HDVTS_EA | End address of HDVTS |
| HDVTSI_EA | End address of HDVTSI |
| VERN | Version number of HD-DVD video standards |
| HDVTS_CAT | HDVTS category |
| HDVTSI_MAT_EA | End address of HDVTSI_MAT |
| HDVTSM_VOBS_SA | Start address of HDVTSM_VOBS |
| HDVTSTT_VOBS_SA | Start address of HDVTSTT_VOBS |
| HDVTS_PTT_SRPT_SA | Start address of HDVTS_PPT_SRPT |
| HDVTS_PGCIT_SA | Start address of HDVTSM_PGCIT |
| HDVTSM_PGCI_UT_SA | Start address of HDVTSM_PGCI_UT |
| HDVTS_TMAP_SA | Start address of HDVTS_TMAP |
| HDVTSM_C_ADT_SA | Start address of HDVTSM_C_ADT |
| HDVTSM_VOBU_ADMAP_SA | Start address of HDVTSM_VOBU_ADMAP |
| HDVTS_C_ADT_SA | Start address of HDVTS_C_ADT |
| HDVTS_VOBU_ADMAP_SA | Start address of HDVTS_VOBU_ADMAP |
| HDVTSM_V_ATR | Video attribute of HDVTSM |
| HDVTSM_AST_Ns | Number of HDVTSM audio streams |
| HDVTSM_AST_ATR | HDVTSM audio stream attribute |
| HDVTSM_SPST_Ns | Number of HDVTSM sub-picture streams |
| HDVTSM_SPST_ATR | HDVTSM sub-picture stream attribute |
| HDVTS_V_ATR | Video attribute of HDVTS |
| HDVTS_AST_Ns | Number of HDVTS audio streams |
| HDVTS_AST_ATRT | HDVTS audio stream attribute table |
| HDVTS_SPST_Ns | Number of HDVTS sub-picture streams |
| HDVTS_SPST_ATRT | HDVTS sub-picture stream attribute table |
| HDVTS_MU_AST_ATRT | HDVTS multi-channel audio stream attribute table |
| HDVTSM_GUST_Ns | Number of HDVSTM graphic unit streams |
| HDVTSM_GUST_ATR | HDVSTM graphic unit stream attribute |
| HDVTS_GUST_Ns | Number of HDVTS graphic unit streams |
| HDVTS_GUST_ATRT | HDVTS graphic unit stream attribute table |

410 HD video title set information management table (HDVTSI_MAT)

FIG. 21

HDVTS_PGC_CAT

| Bit<br>Byte | b7 | b6 | b5 | b4 | b3 | b2 | b1 | b0 |
|---|---|---|---|---|---|---|---|---|
| 0 | Entry type | | | | VTS_TTN | | | |
| 1 | Block mode | | Block type | | Reserved | | | RSM permission |
| 2 | PTL_ID_FLD (upper bits) | | | | | | | |
| 3 | PTL_ID_FLD (lower bits) | | | | | | | |

RSM permission
Indicate whether or not reproduction resume by RSM command or Resume () function is permitted by this PGC
...0b : Permission (update RSM information)
...1b : Prohibition (RSM information is not updated)

F I G. 24

HDVTSM_PGC_CAT

| Bit<br>Byte | b7 | b6 | b5 | b4 | b3 | b2 | b1 | b0 |
|---|---|---|---|---|---|---|---|---|
| 0 | Entry type | Reserved | Audio information selection | | | Menu ID | | |
| 1 | Block mode | | Block type | | Audio information number | | | |
| 2 | PTL_ID_FLD (upper bits) | | | | | | | |
| 3 | PTL_ID_FLD (lower bits) | | | | | | | |

Audio information selection
Indicate selection of audio reproduction of HDMENU_AOBS or HDVTSM_VOBS, and start/end trigger of HDMENU_AOBS
...00b : Audio in VOB designated by PGC is reproduced (stop HDMENU_AOBS)
...10b : HDMENU_AOBS is continuously reproduced (ignore audio in VOB)
...11b : Reproduction of HDMENU_AOBS is started (ignore audio in VOB)

Audio information number
Designate AOB number #n to be reproduced in HDMENU_AOBS

F I G. 27

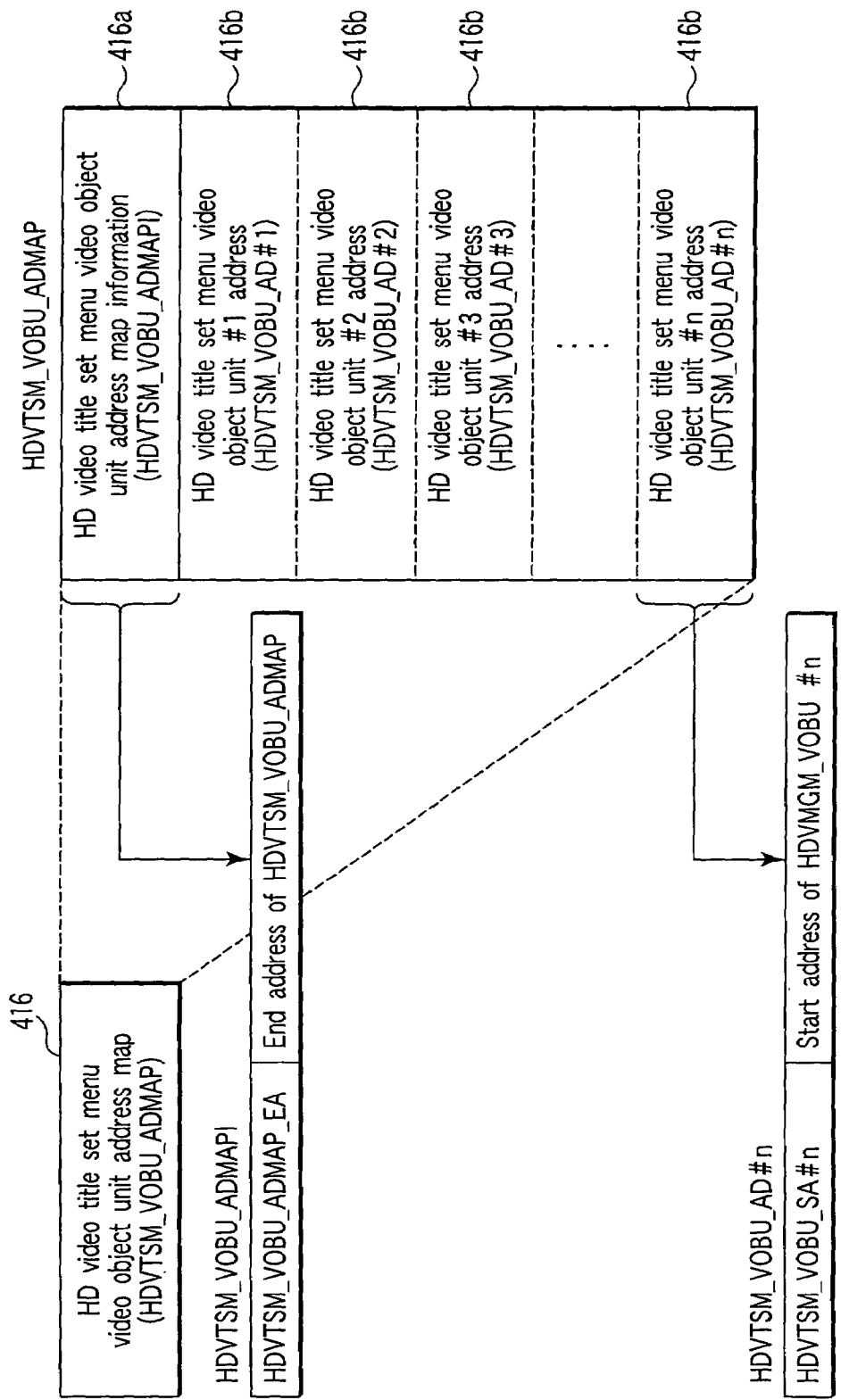
F I G. 30

PGCI_GI

| | |
|---|---|
| PGC_CNT | PGC content |
| PGC_PB_TM | PGC playback time |
| PGC_UOP_CTL | PGC user operation control |
| PGC_AST_CTLT | PGC audio stream control table |
| PGC_SPST_CTLT | PGC sub-picture stream control table |
| PGC_GUST_CTLT | PGC graphic unit stream control table |
| PGC_NV_CTL | PGC navigation control |
| PGC_SP_PLT | PGC sub-picture palette |
| PGC_CMDT_SA | Start address of PGC_CMDT |
| PGC_PGMAP_SA | Start address of PGC_PGMAP |
| C_PBIT_SA | Start address of C_PBIT |
| C_POSIT_SA | Start address of C_POSIT |
| RSM&AOB_CAT | RSM&AOB category |

RSM&AOB_CAT

| Bit / Byte | b7 | b6 | b5 | b4 | b3 | b2 | b1 | b0 |
|---|---|---|---|---|---|---|---|---|
| 0 | Entry type | RSM permission | Audio selection | | Audio number | | | |
| 1 | Block mode | | Block type | | Reserved | | | |
| 2 | PTL_ID_FLD (upper bits) | | | | | | | |
| 3 | PTL_ID_FLD (lower bits) | | | | | | | |

RSM permission
Indicate whether or not reproduction resume by RSM command
or Resume () function is permitted by this PGC
...0b : Permission (update RSM information)
...1b : Prohibition (RSM information is not updated)

PGC_GUST_CTLT

| | |
|---|---|
| PGC_GUST#0 | PGC_GUST_CTL of HD graphic unit stream #0 |
| PGC_GUST#1 | PGC_GUST_CTL of SD wide graphic unit stream #1 |
| PGC_GUST#2 | PGC_GUST_CTL of 4:3 graphic unit stream #2 |
| PGC_GUST#3 | PGC_GUST_CTL of letter box graphic unit stream #3 |
| PGC_GUST#4 | PGC_GUST_CTL of pan-scan graphic unit stream #4 |

FIG. 34

Data structure of PGC_CMDTI and RSM_CMD

| PGC_CMDTI | Contents |
|---|---|
| PRE_CMD_Ns | Number of pre-commands |
| POST_CMD_Ns | Number of post-commands |
| C_CMD_Ns | Number of cell commands |
| RSM_CMD_Ns | Number of resume commands |
| RSM_CMD_SA | Start address of resume command |
| PGC_CMDT_EA | End address of PGC_CMDT |

| RSM_CMD | Contents |
|---|---|
| RSM_CMD | Resume command (8 bytes) |

PGCI_CMDT
- Program chain command table information (PGC_CMDTI) — 510
- Pre-command #1 (PRE_CMD#1) — 511
- Pre-command #i (PRE_CMD#i) — 511
- Post-command #1 (POST_CMD#1) — 512
- Post-command #j (POST_CMD#j) — 512
- Cell command #1 (C_CMD#1) — 513
- Cell command #k (C_CMD#k) — 513
- RSM command #1 (RSM_CMD#1) — 514
- RSM command #m (RSM_CMD#m) — 514

F I G. 36

Substream ID of Graphic unit stream

Private stream 1 : 1011 1101b

| Substream ID<br>0101 0xxxb | Graphic stream number | Contents |
|---|---|---|
| 0101 0001b | 1 | Graphic unit for HD |
| 0101 0010b | 2 | Graphic unit for SD wide |
| 0101 0011b | 3 | Graphic unit for 4 : 3 |
| 0101 0100b | 4 | Graphic unit for letter box |
| 0101 0101b | 5 | Graphic unit for pan-scan |

F I G. 40

Header information contents and general information contents in graphic unit

Header information  b1

| GU_SZ | Graphic unit size |
|---|---|
| GU_ATRI | Graphic unit attribute information |
| HLI_SA | Start address of highlight information (HLI) |
| GD_SA | Start address of graphic data |

FIG. 43A

General information  b21

| GU_PB_S_PTM | Graphic unit playback start time |
|---|---|
| GU_PB_E_PTM | Graphic unit playback end time |
| BTN_OFN | Button offset number |
| BTN_Ns | Number of buttons |
| NSL_BTN_Ns | Number of number selection buttons |
| FOSL_BTNN | Forced selection button number |
| FOAC_BTNN | Forced activation button number |

FIG. 43B

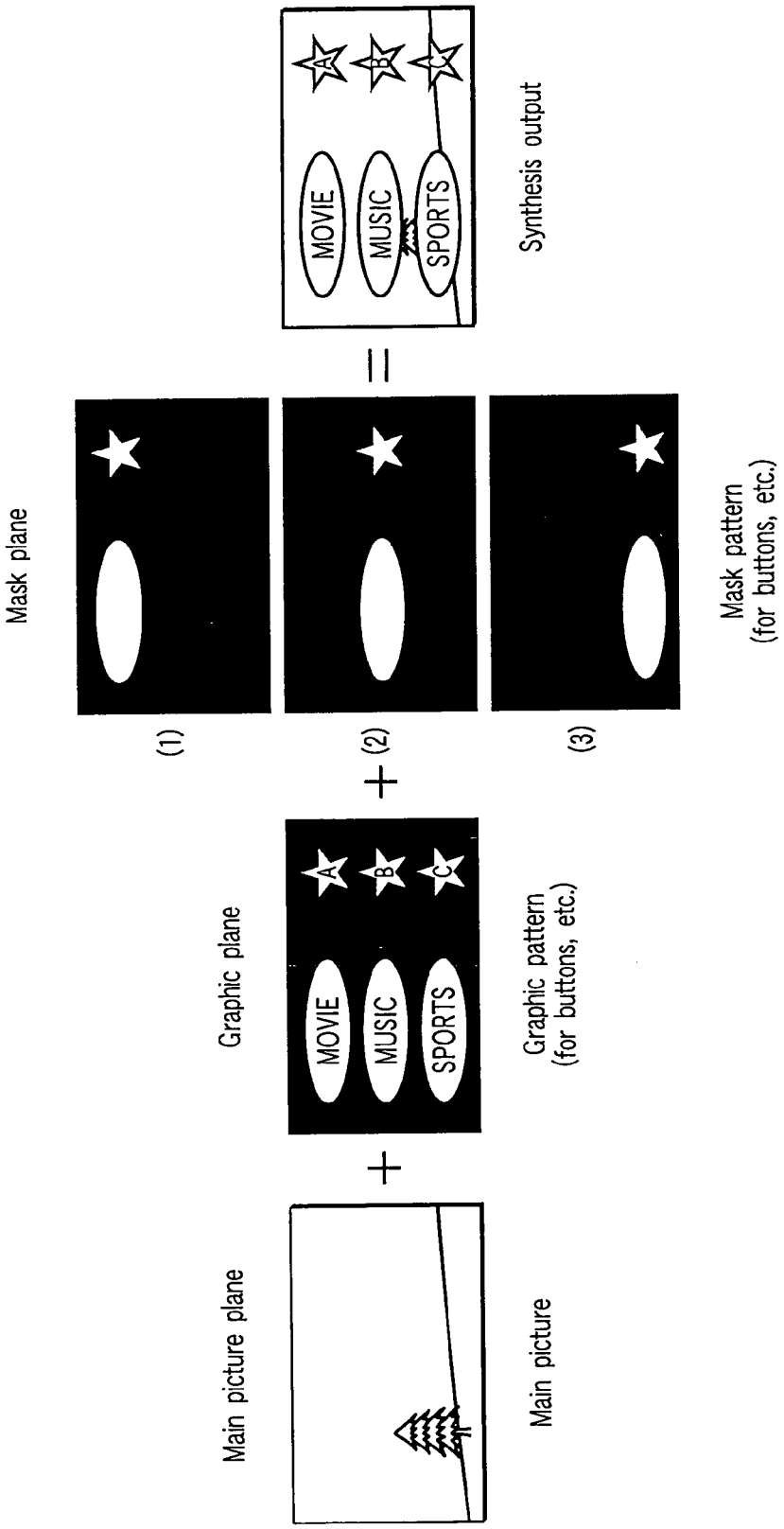
F I G. 45

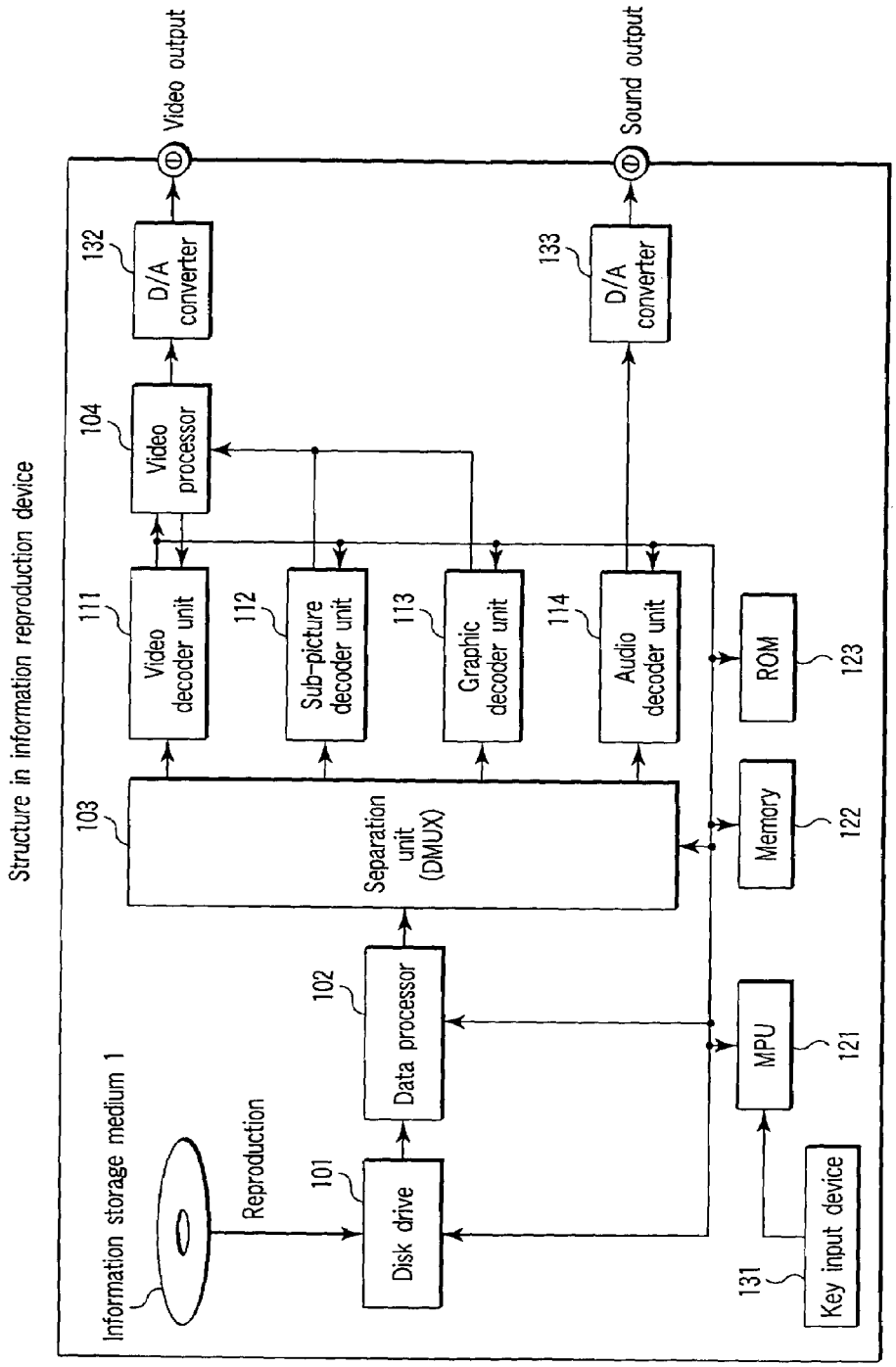
F I G. 48

Structure of sub-picture unit

Sub-picture unit stored in SP pack a7 of FIG. 39C

| Sub-picture unit header (SPUH) | Pixel data (PXD) | | Sub-picture display control sequence table (SP_DCSQT) |
|---|---|---|---|
| | For top field | For bottom field | |

F I G. 56

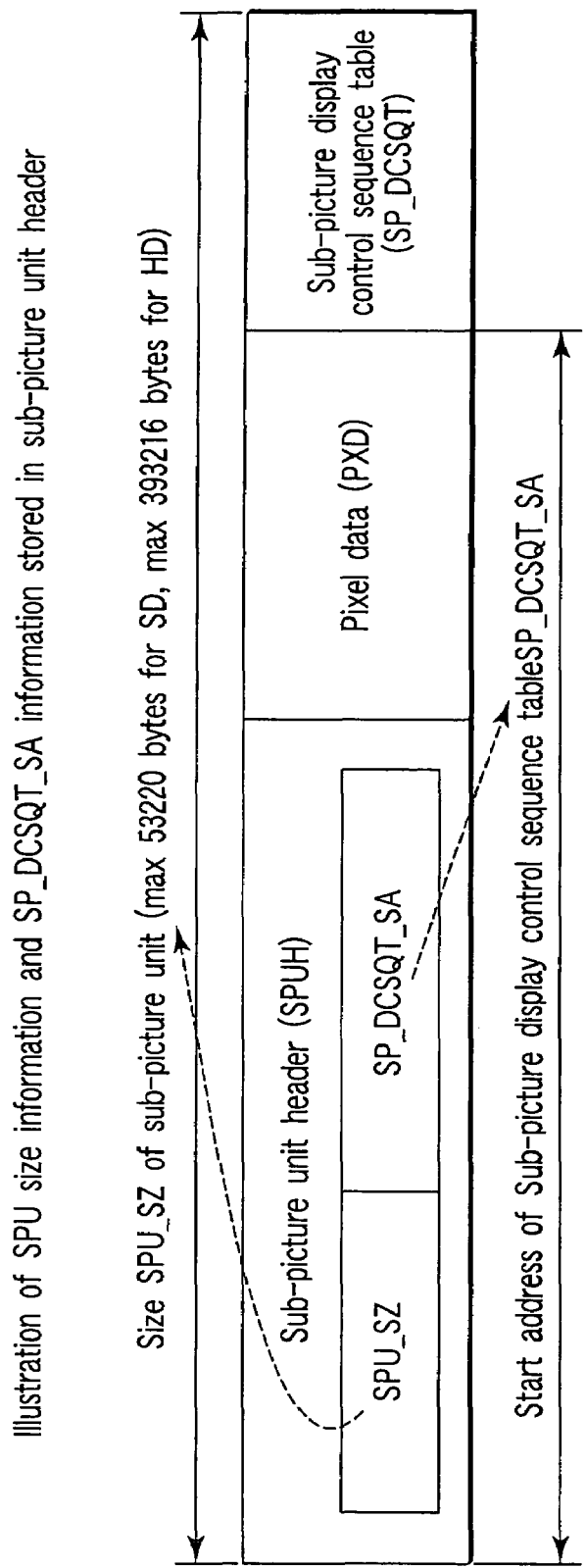
F I G. 57

Sub-picture unit header information

| SPUH | PRE_HEAD | Pre-header of sub-picture unit |
| | POST_HEAD | Post-header of sub-picture unit |

Sub-picture unit following POST_HEAD indicates conventional SD sub-picture unit when PRE_HEAD is other than 0000h, and sub-picture unit following POST_HEAD indicates new HD sub-picture unit when PRE_HEAD is 000h

FIG. 59A

POST_HEAD (when PRE_HEAD is other thann 0000h)

| SP_DCSQT_SA | Start address of sub-picture display control sequence table (2 bytes) |

FIG. 59B

POST_HEAD (when PRE_HEAD is 0000h)

| SPU_SZ | Size of sub-pucture unit (4 bytes) |
| SP_DCSQT_SA | Start address of sub-picture display control sequence table (4 bytes) |

FIG. 59C

Sub-picture display control command

SP_DCCMD

| Command name | Contents | Code |
|---|---|---|
| (1) FSTA_DSP | Forcedly sets display start timing of pixel data | 00h |
| (2) STA_DSP | Sets display start timing of pixel data | 01h |
| (3) STP_DSP | Sets display stop timing of pixel data | 02h |
| (4) SET_COLOR | Sets color code of pixel data | 03h |
| (5) SET_CONTR | Sets contrast between pixel data and main picture | 04h |
| (6) SET_DAREA | Sets display area of pixel data | 05h |
| (7) SET_DSPXA | Sets display start address of pixel data | 06h |
| (8) CHG_COLCON | Sets change of color and contrast for pixel data | 07h |
| (9) SET_DAREA2 | Sets display area of pixel data 2 | 85h |
| (10) SET_DSPXA2 | Sets display start address of pixel data 2 | 86h |
| (11) CHG_COLCON2 | Sets change of color and contrast for pixel data | 87h |
| (12) CMD_END | End of Display Control Command | FFh |

F I G. 60

INFORMATION STORAGE MEDIUM, INFORMATION REPRODUCTION DEVICE, INFORMATION REPRODUCTION METHOD

CROSS-REFERENCE TO RELATED APPLICATIONS

This application is based upon and claims the benefit of priority from prior Japanese Patent Application No. 2003-314277, filed Sep. 5, 2003, the entire contents of which are incorporated herein by reference.

BACKGROUND OF THE INVENTION

1. Field of the Invention

The present invention relates to an information storage medium (or an information recording medium), an information reproduction device, and an information reproduction method.

2. Description of the Related Art

As such an information storage medium, there has been an optical disk called a digital versatile disk (DVD) capable of reproducing digital information using a focused light. Specifications of the current DVD include read-only DVD-ROM specifications, write-once DVD-R specifications, rewritable-type (about 10,000 times) DVD-RW, and rewritable-type (10,000 times or more) DVD-RAM specifications. Any specifications have format specifications which define a data structure recorded on an optical disk (information storage medium) of video information (video data, sub-picture data, and audio data, generically referred to as video objects) itself, and a data structure of management data for managing video information.

The read-only current DVD video specifications simultaneously deal with a large number of languages, and multi-scene presentation is possible such as multi-angle and multi-story. Additionally, there are varieties of menu screens, it is easy for users to directly access desired scenes, and the specifications have formats capable of providing video content which is easily used by the users (see U.S. Pat. No. 5,636,200, and Japanese Patent No. 2,677,775, for example).

As described above, the read-only current DVD video specifications have the formats capable of the video content easily usable by the users, but there has been a demand for improvements of the specifications in order that the users may further easily use the content and content representing power may be further enriched for the users.

Moreover, there is a problem that authoring (preparation and edition of programs to be recorded in the DVD video disk) is complicated in order to provide the content easy to use by the users.

Parts of the current DVD video specifications lacking in content representing power for the users, and parts difficult for the users to use or parts which are complicated in the authoring for providing the content easy to use by the users will be specifically listed.

[1] Difficult for the user to use. Alternatively, the authoring has been complicated in order to prepare the content easy to use by the users.

(A) Disadvantages with respect to a presentation start position at a time when presentation of a title is interrupted halfway to perform another processing, and the presentation of the title is restarted.

(A1) The presentation of video is interrupted, presentation is switched to menu or another video, and the presentation cannot be restarted from the interrupted position.

The presentation of a specific video title is interrupted halfway during the presentation to switch to the menu screen, bonus content is then played back halfway or to the end, and afterwards the video title interrupted halfway is to be played back. However, the content prepared by conventional DVD video specifications cannot be played back only from a start position of the video title in many cases. This is because resume information (presentation interrupted position information) of the previous specific video title is rewritten into position information of the bonus content in a stage in which the presentation of the bonus content is started. A complicated authoring process is required in order to obtain the content such that the presentation can be started from the interrupted position of the previous video title after the bonus content is played back halfway or to the end.

(A2) The presentation cannot be started from a good place to start, when a game is to be resumed after the interruption of the presentation in the game or the like.

In case of the "game" (e.g., role playing game) instead of the above-described video as the specific title, there is a request from a content provider that the game is to be started from an end of a chapter of the game, not from an interrupted position in a case where the game is resumed after returning to the menu screen. However, this request cannot be satisfied with the current DVD video specifications.

(B) There is a portion difficult to use concerning language setting for display.

(B1) A menu description language code cannot be changed with a command which can be designated in the content, and the authoring is complicated.

In the current DVD video specifications, the menu description language code M_LCD is set into SPRM(0) (0-th system parameter: 16 bits) of navigation data, and the value is stored in the memory of the information reproduction device. In the current DVD video specifications, a command for changing the value of SPRM(0) does not exist in a command list which can be set in the content, and it is possible to change the value of SPRM(0) only by user designation under a special condition. Specifically, the value of SPRM(0) can be changed using a user operation function called Menu_Language_Select ( ) in user functions arranged in the information reproduction device, but there is a restriction that the user operation called Menu_Language_Select ( ) can be set only during the stopping of the operation of the information reproduction device. A screen for exclusive use is displayed to set the user operation using a remote controller.

The value of SPRM(0) cannot be changed with the command which can be set in the content in this manner. Therefore, a screen for selecting the menu description language code needs to be prepared with respect to a plurality of menu description language codes in the content (especially VOB data on menu information) so that any setting of the value of SPRM(0) can be handled. The authoring operation at the time of preparation of the content has been very difficult.

(B2) There is a danger that menu description language code information set by the user is deleted.

For example, supposing that a command capable of changing the value of SPRM(0) is newly added in order to solve problem (B1). Then, even when the user carefully sets a specific menu description language code (e.g., set Japanese to SPRM(0)), there is a danger that the value of SPRM(0) is automatically changed by the presentation of the content. When the menu description language code is automatically changed by the command, the user feels dissatisfied. Additionally, a necessity to set the menu description language code again by the user is generated, and this causes a problem that burdens on the user increase.

[2] There is a problem where a content representing power for the user is lacking.

(C) Disadvantage concerning seamless play with respect to a still picture (C1) A seamless play between a moving picture and still picture is not possible with the current DVD video content.

The current DVD video assures the seamless play of the moving picture (Movie Content), and connection/play is seamlessly possible between different VOBs (or different titles) (without interrupting the screen of the moving picture halfway). On the other hand, for example, when the still picture displayed in a slide show (one display method with respect to the still picture, in which the displayed still picture is automatically switched) is switched to the moving picture, the seamless play is not assured, and video or audio stands still halfway depending on the information reproduction device in some case. Reasons why the seamless connection is not assured at a time of the switching to the moving picture from the still picture with the current DVD video content are as follows.

i) In an extended system target decoder (E-STD) in which the seamless play is assured, an access unit is defined in a moving picture object, and the values of a system time clock (STC: a clock value forming a reference) set to a separation unit, video decoder unit, sub-picture decoder unit, and audio decoder unit are switched in a boundary position of the access unit. On the other hand, the access unit cannot be defined with respect to the still picture in the current DVD.

That is, a picture continues to be output constantly continuously by a field unit of the moving picture, whereas the picture is only intermittently output in the still picture displayed, for example, in the slide show. In a data structure in a still picture object, a sequence end code (sequence_end_code) is arranged immediately after an I picture (intra picture) constituting a still picture in accordance with specifications of moving picture experts group 2 (MPEG-2). In the video decoder unit, when this sequence end code is detected, the decoding is stopped until the next I picture is input. Therefore, in the conventional DVD video, the access unit such as the moving picture cannot be set in a timing period in which the still picture is intermittently output.

ii) Switching between common parities has been permitted as a switching timing between the still pictures in the conventional DVD video. That is, after the previous still picture ends in a top field (or a bottom field), the next still picture is permitted to be started from the top field (or the bottom field). Therefore, when the still picture is switched to the moving picture halfway in a frame, the seamless connection is not performed, and there is a danger that the screen is disturbed at a switching end.

(C2) Multi-angle play in which the still pictures are combined or multi-angle play between the moving picture and still picture cannot be performed.

In the current DVD video, it is difficult to perform the multi-angle play in which slide shows of still pictures (still picture content) are combined or the multi-angle play in which the slide show of the still pictures is combined with the moving picture. When multi-angle play handling content is forcibly prepared, the seamless play is not assured with respect to the still picture. Therefore, multi-angled still pictures cannot be continuously played back (the still picture is stopped halfway without being continuously switched), or the screen stops halfway without being smoothly switched at the switching end between a screen of multi-scene and that of one sequential scene. In the moving picture, an interleaved unit (ILVU) is defined in which scattered arrangement is performed for each angle in an interleaved block, whereas the definition of the ILVU with respect to the still picture is not clarified in the current DVD video. A period until the switching of the screen is long in the still picture (the same still picture continues to be played back for a long time), and therefore there has not been a mechanism capable of displaying the corresponding still picture immediately after angle switching at present. Furthermore, as described in (C1), on detecting the sequence end code arranged immediately after the I picture corresponding to the still picture, a decode process of the video decoder unit is temporarily stopped until the next I picture comes. Therefore, the arrangement of the sequence end code is inhibited in video data in a cell constituting the interleaved block in the current DVD video specifications.

(D) The seamless play is not assured in VOB where the command by a cell unit is included.

In the DVD video of the current standard definition (SD), it is possible to designate the command by the cell unit in a program chain (PGC). This command information is recorded in a cell command region in program chain information (PGCI) which is a region where management information of the PGC is recorded. The cell command is executed at the time of the ending of the presentation of the cell in which this cell command is set. Therefore, the presentation of the next cell can be temporarily interrupted. Therefore, the seamless play between the cells is not assured at the presentation time of VOB including the cell command in the current SD DVD video.

(E) Disadvantage on Highlight Information (E1) There is a deviation of a display period (set period) between highlight information and sub-picture.

A menu of the highlight information is displayed at the presentation time of a video title image, and content can be prepared in such a manner that the user can perform an interactive operation. In this case, it is necessary to switch the highlight information or to change the content of the highlight information in accordance with the content of the video title image being played back, and therefore precision of a display period or executable period of the highlight information is important. In the DVD video content of the conventional SD, a button displayed in the screen includes a combination of two types of different streams of a sub-picture stream presenting the image of the button and a video stream including the highlight information required for executing the command designated by the button.

The effective executable period of the highlight information is determined by time information of start and end (PTM: presentation time), and completely coincides with a display period of the sub-picture for use mainly in subtitles. There is a problem that menu selection ends, when the sub-picture ends. Therefore, when a content producer is to prepare the content of the subtitles simultaneously combined with the menu, there are restrictions as to the preparation of the content. For example, the user has to select the menu within an effective (display) period of the sub-picture. The content producer cannot prepare the content as imaged, a degree of freedom is limited, and the content supplied to the user is forced to be limited.

(E2) A selection item image of the menu is not multicolored.

Since only a combination of 16 colors can be represented in the current SD DVD video content, a degree of appeal to the user is low, and multicolored presentation cannot be performed.

(E3) A designated region of the highlight information cannot be set to a shape other than a rectangular shape.

The shape other than the rectangular shape cannot be set as the designated region of the highlight information in the DVD video content of the current SD, and it has not been possible to prepare the content having varieties of highlight information such as a triangular shape and a star shape.

(E4) The same button cannot be set with respect to a plurality of regions distant from one another on the screen.

The same button can be set only in an integrated region in the DVD video content of the current SD.

On the other hand, it is easy to link the same URL to a plurality of regions in the screen of PC or a homepage screen of internet, and the current SD DVD video content has been inferior to the PC screen or the homepage screen of internet.

(F) There is a problem that a background music discontinues at the switching time of the menu screen.

In the current SD DVD video content, audio information (background music) at a menu screen display time accompanies to each menu. Therefore, every time the menu screen changes, the audio information accordingly changes.

The existing SD-DVD video content cannot satisfy a content provider's demand that a background sound be played back continuously without any interruption, even when the menu is changed.

(G) A sub-picture stream corresponding to a clear picture screen having a high resolution cannot be recorded.

In the existing DVD video specifications, the only standard definition (SD) picture having a resolution of 480 lines×720 pixels at maximum is supported, for example, in National Television System Committee (NTSC). An upper limit value of a size of the sub-picture unit SPU for use in subtitles or the like is set to 53,220 bytes or less in consideration of the upper-limit resolution. Therefore, when a high definition (HD) picture having a high resolution, for example, of 1,080 lines×1,920 pixels is handled as the picture information in the NTSC, and the corresponding sub-picture unit (SPU) having the high resolution is to be recorded, a problem occurs that the unit cannot enter the existing sub-picture unit (SPU) whose upper limit is defined as 53,220 bytes. To solve the problem, when the upper limit value of the size of the sub-picture unit (SPU) is simply enlarged, a necessity for the change of the data structure in the sub-picture unit (SPU) is generated, and the compatibility with the processing circuit or the reproduction control program for use in the conventional DVD player cannot be easily taken. Therefore, a problem occurs that the player which handles even the HD picture becomes expensive. A content producer also demands reuse of the conventional content, and there has been a demand for diversion of content assets of the conventional sub-picture unit (SPU) with respect to the contents for HD in addition to the sub-picture unit (SPU) for HD pictures.

BRIEF SUMMARY OF THE INVENTION

An object of the present invention is to provide an information storage medium, an information reproduction apparatus, or an information reproduction method which keeps compatibility with a processing circuit or a reproduction control program for use in a conventional DVD player and records a sub-picture stream for an HD content without changing any data structure in a sub-picture unit (SPU).

According to one embodiment of the present invention, there is provided an information storage medium which records a video object unit comprising a sub-picture pack comprising sub-picture units, each of the sub-picture units comprising a sub-picture unit header, pixel data, and a sub-picture display control sequence table, and the sub-picture unit header comprising a pre-header and a post header.

According to another embodiment, an information reproduction apparatus for reproducing an information storage medium which records a video object unit comprising a sub-picture pack comprising sub-picture units, each of the sub-picture units comprising a sub-picture unit header, pixel data, and a sub-picture display control sequence table, and the sub-picture unit header comprising a pre-header and a post header, the apparatus comprises:

means for reading a first pre-header in the sub-picture unit header of the sub-picture unit; and means for determining whether the sub-picture unit corresponds to a standard-resolution content or high-resolution content.

According to another embodiment, an information reproduction method for reproducing an information storage medium which records a video object unit comprising a sub-picture pack comprising sub-picture units, each of the sub-picture units comprising a sub-picture unit header, pixel data, and a sub-picture display control sequence table, and the sub-picture unit header comprising a pre-header and a post header, the method comprises steps of:

reading a first pre-header in the sub-picture unit header of the sub-picture unit; and determining whether the sub-picture unit corresponds to a standard-resolution content or high-resolution content.

BRIEF DESCRIPTION OF THE SEVERAL VIEWS OF THE DRAWING

FIG. 4 is a diagram showing a data structure in an HD video manager information management table (HDVMGI_MAT) 310 of FIG. 3;

FIG. 8 is a diagram showing a data structure in an HD video manager menu program chain category (HDVMGM_PGC_CAT) recorded in the HD video manager menu/language unit #n (HDVMGM_LU #n) 312c (FIG. 6) shown in FIG. 7;

FIG. 10 is a diagram showing a data structure in parental management information (PTL_MAI) 313c shown in FIG. 8;

FIG. 15 is a diagram showing a data structure in an HD video manager menu cell address table (HDVMGM_C_ADT) 316 shown in FIG. 3;

FIG. 21 is a diagram showing a data structure in an HD video title set information management table (HDVTSI_MAT) 410;

FIG. 24 is a diagram showing a data structure in the HD video title set program chain category (HDVTS_PGC_CAT) recorded in HDVTS_PGCI search pointer (HDVTS_PGCI_SPR) shown in FIG. 23;

FIG. 27 is a diagram showing a data structure in the HD video title set program chain category information (HDVTSM_PGC_CAT) shown in FIG. 26;

FIG. 30 is a diagram showing a data structure in an HD video title set menu video object unit address map (HDVTSM_VOBU_ADMAP) 416 shown in FIG. 20;

FIG. 34 is a diagram showing a data structure in program chain/general information (PGCI_GI) in program chain information (PGCI);

FIG. 36 is a diagram showing a data structure in program chain/command table information (PGC_CMDTI) and resume command (RSM_CMD) in the program chain/command table (PGCI_CMDT) shown in FIG. 35;

FIG. 40 is a diagram showing a substream ID of a graphic unit stream;

FIGS. 43A and 43B are diagrams showing contents of header information and contents of general information in the graphic unit;

FIG. 45 is a diagram showing a video synthesis example including a mask pattern;

FIG. 48 is a block diagram showing a constitution of an information reproduction device (player) of an embodiment of the present invention;

FIG. 56 is a diagram showing a data structure in a sub-picture unit (SPU);

FIG. 57 is a diagram showing definitions of size information (SPU_SZ) and sub-picture display control sequence table start address information (SP_DCSQT_SA) of the sub-picture unit;

FIGS. 59A, 59B, and 59C are diagrams showing a data structure in the sub-picture unit header (SPUH) for HD shown in FIGS. 58A, 58B, and 58C from another viewpoint;

FIG. 60 is a diagram showing contents of a sub-picture display control command (SP_DCCMD) recordable in a sub-picture display control sequence table (SP_DCSQT)

DETAILED DESCRIPTION OF THE INVENTION

Figure 1:
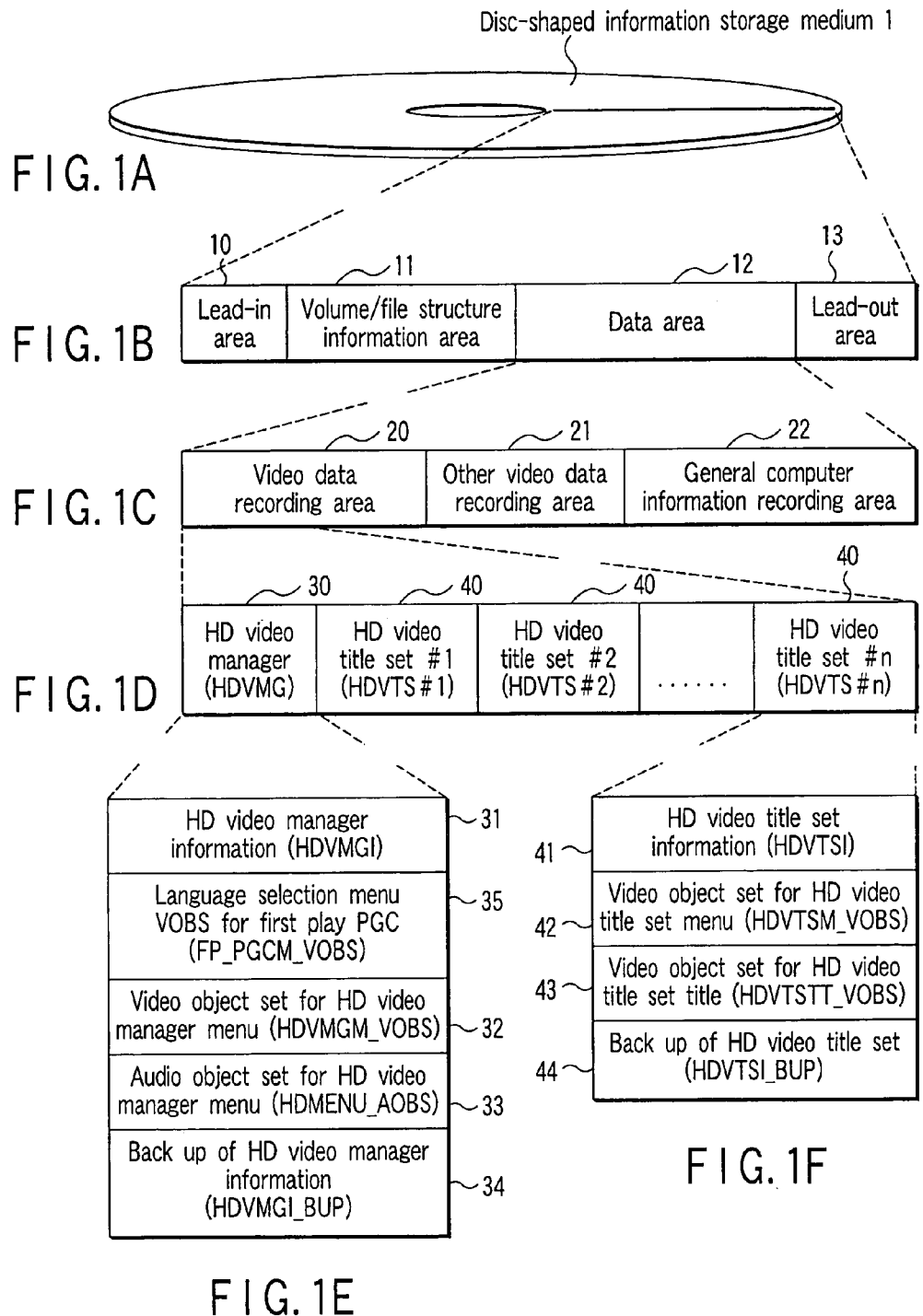
FIGS. 1A, 1B, 1C, 1D, 1E, and 1F show contents of information recorded in a disc-shaped information storage medium 1 in an embodiment of the present invention.

Embodiments of an information storage medium, an information reproduction apparatus, and an information reproduction method according to the present invention will be described hereinafter with reference to the drawings.

First, a total main subject in the embodiments will be generally viewed, and relations between the main subjects will be described. Next, points concerning "sub-picture unit control", which are major technical contents noted in the present specification, will be described. Then, concrete embodiments will be described. The embodiments include appropriate combinations of the following (1) to (4).

(1) A sub-picture unit (SPU) comprises a sub-picture unit header (SPUH), pixel data (PXD), and a sub-picture display control sequence table (SP_DCSQT), and a sub-picture unit header (SPUH) comprises a pre-header (PRE_HEAD) and a post header (POST_HEAD).

(2) The pre-header (PRE_HEAD) indicates a sub-picture unit size (SPU_SZ) for a conventional SD content, and indicates a sub-picture unit identifier (SPU_ID) for an HD content.

(3) The post header (POST_HEAD) comprises a sub-picture display control sequence table start address (SP_DCSQT_SA) for the conventional SD content, and comprises both the sub-picture unit size (SPU_SZ) and the sub-picture display control sequence table start address (SP_DCSQT_SA) for the HD content.

(4) The sub-picture display control sequence table (SP_DCSQT) comprises commands for controlling the HD content in addition to commands for controlling the conventional SD content in the case of the HD content.

In the present specification, video data, sub-picture data, sound data, and graphic data are generically referred to as video objects, and the video objects and control data of the video objects are generically referred to as contents. To clarify differences, conventional DVD video contents are referred to as standard definition (SD) contents, and contents which are objects of the embodiments of the present invention, having the following main subjects (A) to (G) are referred to as high definition (HD) contents.

<<General Description>>

[1] A problem that the content is difficult to use by a user or that authoring is complicated in preparing the content easy to use by the user is solved.

(A) Interrupted Position Information Control Method at Title Interruption Time

[Point 1]

Storage/discharge rules of resume information are modified with respect to the current SD DVD video specifications, and rewrite/change prohibition/discharge process of contents of resume information recorded in a memory 122 of an information reproduction device shown in FIG. 48 are finely controllable.

[Point 2]

When the resume information to be recorded in the memory 122 of the information reproduction device is rewritten, the information is held until a control instruction comes with respect to the next resume information. For example, in the conventional DVD video specifications, there has been a rule of deletion of contents of the resume information in a case where a JumpTT, JumpVTS_TT, or JumpVTS_PTT command is executed. This is changed in the present embodiment. Even after the above-described command is executed, the contents of the resume information are held, and a part of the problem described in (A1) is solved.

[Point 3]

As measures against the problem shown in (A1), as shown in FIG. 24, with respect to each PGC, a resume (RSM: presentation resume) command (command by selection on a screen), or a resume permission flag (=RSM permission flag) indicating whether or not the presentation resume by a resume ( ) function (command performed by the reproduction device) executed, for example, in accordance with user designation is permitted is newly set. As a specific content, at the time of execution of a CallSS command described later, the content of the resume information is updated, when the RSM permission flag is set to "0b". When the flag is set to "1b", the update is inhibited.

For example, when the resume information is prohibited from being updated with respect to the PGC including bonus content in an example described in (A1), the resume information with respect to a specific video title interrupted before is held as the resume information recorded in the memory 122 of the information reproduction device shown in FIG. 48 (details will be described later in detail).

[Point 4]

Figure 35:
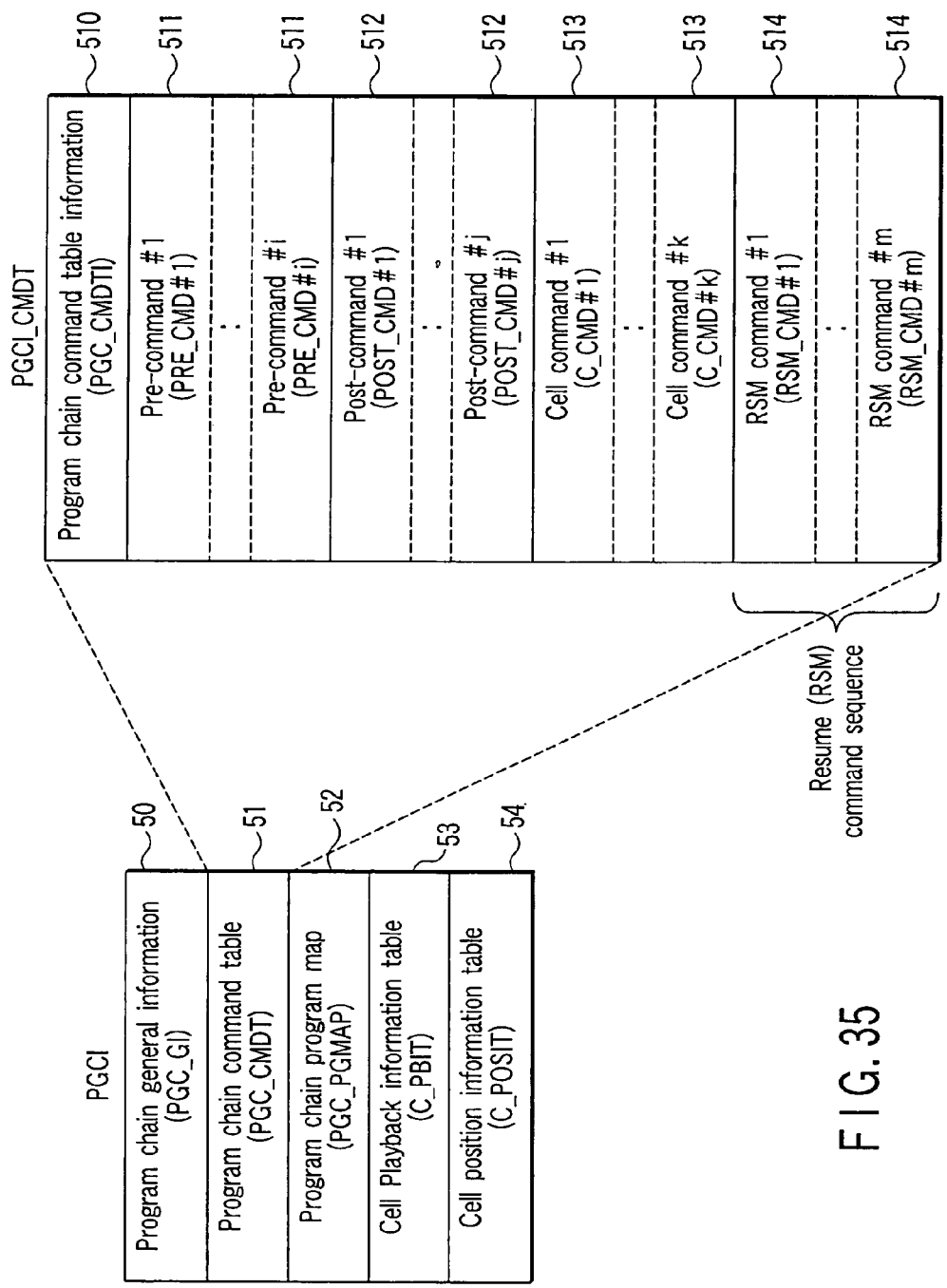
FIG. 35 is a diagram showing a data structure in a program chain/command table (PGCI_CMDT) in program chain information (PGCI) shown in FIG. 34.

As the measures against the problem described in (A2), as shown in FIG. 35, a program chain command table (PGC_CMDT) 51 is newly set in program chain information (PGCI), and resume sequence information is recorded. The resume sequence information described in the program chain command table (PGC_CMDT) 51 means a command string (continuous link order of commands) executed immediately before returning to the PGC of the corresponding title from the menu screen. When returning to the PGC corresponding to the interrupted title from the menu screen, the presence/absence of the resume sequence information is surely confirmed before starting the presentation based on the resume information.

When there is not any resume sequence information, the presentation from the interrupted position is started based on the resume information.

If there is the resume sequence information, the presentation is started from a place designated by the resume sequence information.

For example, as the measures against the problem described in (A2), a command to rewrite "position information of stop of game" into the resume information is set in the resume sequence information recorded in the program chain command table (PGC_CMDT) 51. Accordingly, immediately after returning from the menu screen, the presentation can be started from the stop of the game (detailed contents will be described later).

A cell number which is information indicating a position where the presentation has been interrupted; address information of a navigation pack arranged in a start position of a cell; PGC presentation control situation; video title set (VTS) number; title number (TTN) in a title domain (the value of the title number is stored as that of SPRM(4) as shown in FIG. 62); title number (VTS_TTN) in VTS in the title domain (this value is stored as the value of SPRM(5)); PGC number (TT_PGCN) (SPRM(6)) of the title in the title domain; a part of title number (PTTN) (SPRM(7)) with respect to the title of a sequential PGC; and highlight button number (HL_BTNN) (SPRM(8)) of highlight in a selected state are recorded as the resume information. Not only in a case where the menu screen is returned to PGC corresponding to the interrupted title as described above, but also in cases where situations change, for example, where at least a part of the resume information changes, or highlight position information changes in association of information of SPRM(8), the process is set to be surely executed to the end of the resume sequence information.

[Management Information Recording Place]

Figure 23:
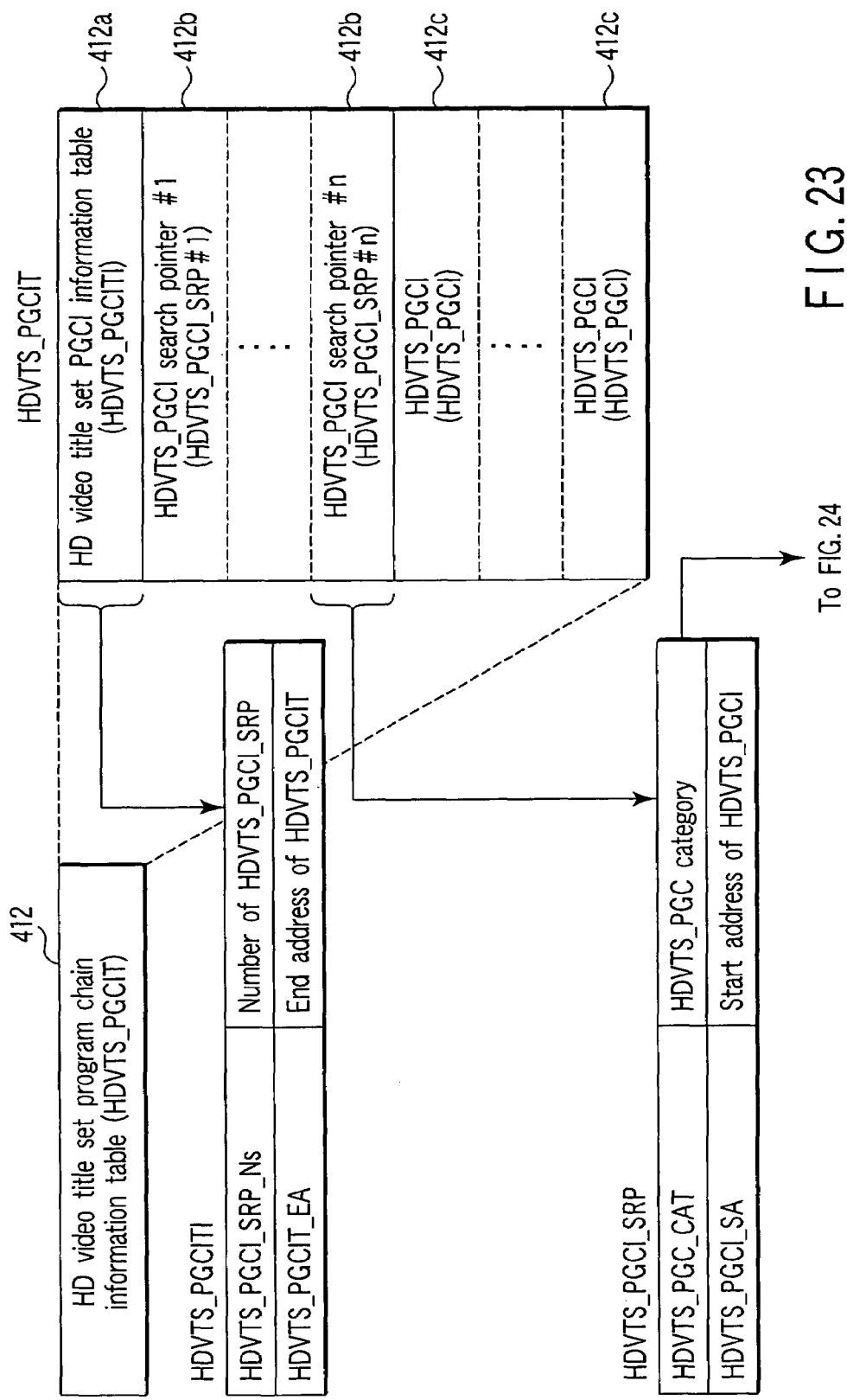
FIG. 23 is a diagram showing a data structure in an HD video title set program chain information table (HDVTS_PGCIT) 412 shown in FIG. 20.

In an arrangement place of information for managing the resume information, in the first embodiment, as shown in FIG. 23, the RSM permission flag (update permission flag of resume information) is recorded in an HDVTS_PGC category (HDVTS_PGC_CAT) in an HDVTS_PGCI search pointer 412b in an HD video title set program chain information table (HDVTS_PGCIT) 412.

Figure 33:
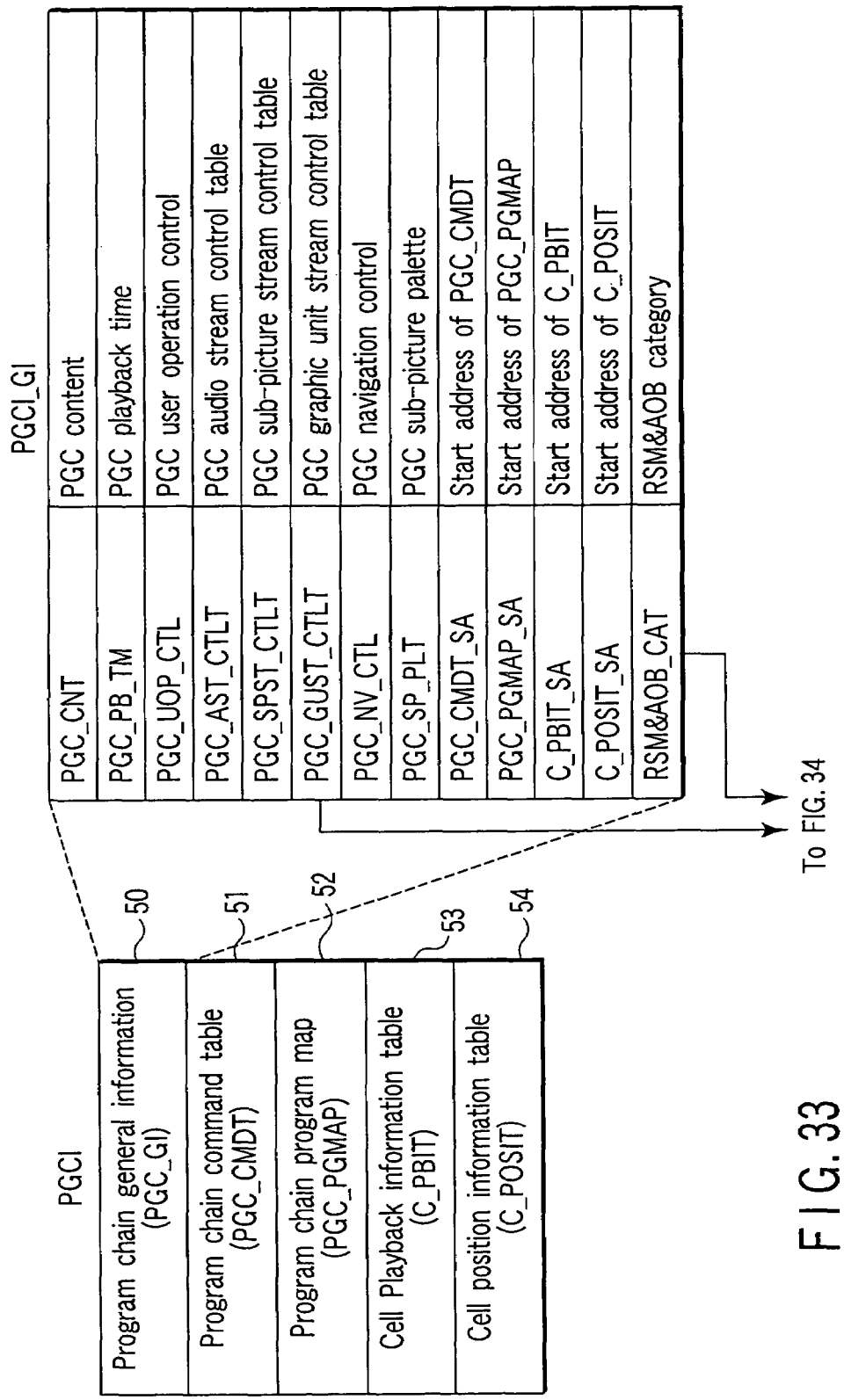
FIG. 33 is a diagram showing a data structure in program chain information (PGCI)

Moreover, in another embodiment (second embodiment), as shown in FIGS. 33 and 34, the RSM permission flag (update permission flag of the resume information) is recorded in RSM&AOB category (RSM&AOB_CAT) in a program chain general information (PGC_GI) 50.

Moreover, in the resume sequence information indicating the command string (continuous link order of the commands) executed immediately after returning to the PGC of the title as described in [Point 4] concerning the subject matter (A) which solves the problem of (A2), as shown in FIG. 35, RSM commands (RSM_CMD) 514 are recorded as a resume (RSM) command sequence in the program chain command table (PGC_CMDT) 51. Number information (RSM_CMD_Ns) of the RSM commands (RSM_CMD) 514 recorded in the program chain command table (PGC_CMDT) 51 is recorded in a program chain command table information (PGC_CMDTI) 510 as shown in FIG. 36.

[Management Information Contents]

The RSM permission flag (update permission flag of the resume information) indicates whether or not the content of the resume information is updated in a stage in which the presentation of the corresponding HDVTS_PGC is started (the resume information is successively updated in accordance with presentation situation of the corresponding PGC). That is, when the flag is "0b", the resume information is updated. When the flag is "1b", the resume information is not updated, and a process of holding the presentation interrupted information of HDVTS_PGC (corresponding program chain in the video title set of the present embodiment) played back before is performed.

In the specific data structure in the RSM command (RSM_CMD) 514, as shown in FIG. 36, a region "for eight bytes" is allocated to each command, and the command content is recorded in the region "for eight bytes".

(B) Language Setting for Display

[Point 1]

To solve the problem described in (B1), a screen in which a menu description language code can be set in the content is provided. Specifically, the setting of the menu description language code is allowed to be possible with first play PGC (FP_PGC) which can be first displayed immediately after the insertion of the information storage medium. To deal with the content capable of setting the menu description language code in the selection on the screen by the user, FP_PGC is set to include a video object (VOB), and this VOB is assumed to be usable only in a language selection menu. When the content supports only a language or when the content automatically takes over the value of the current menu description language code, FP_PGC does not include the VOB for the menu screen in some case. In an example of the content which automatically takes over the value of the menu description language code, there is an embodiment in which the value of SPRM(0) owned by the information reproduction device is automatically compared with the language supported by the HD DVD video content, and the menu description language code is adapted to the value in case of agreement. In this case, the resume sequence information which is a command process sequence to be automatically compared is recorded in first play program chain information (FP_PGCI: FIG. 4) which is management information on FP_PGC.

Furthermore, as a restrictive condition on the FP_PGC, a structure capable of holding one or less cell is constituted (one cell is defined when there is VOB; when the content which does not have a screen for selecting the menu description language code do not have any VOB, any cell is not included in FP_PGC). This FP_PGC permits only sequential play of the program, and a parental block structure or a multi-scene structure is inhibited. Furthermore, the use of only one audio stream (one or zero) is permitted as a usable stream in the FP_PGC, further the use of sub-picture stream is inhibited, and, instead, the use of the graphic unit (GU) described later is introduced.

Therefore, in the embodiment of the present invention, screens for selecting the menu description language code do not have to be prepared in accordance with a plurality of menu description language codes, and an authoring operation at the time of preparation of the content is simplified. As a result, since an authoring operation time is shortened, the selling prices of the content can be reduced.

[Point 2]

To solve the problem described in (B1), a new SetM_LCD command is defined as described later. The value of SPRM(0) can be changed by this SetM_LCD command. This SetM_LCD command is included in the command region of SetSystem as described later, and is usable only in FP_PGC. As a specific command content, the value of SPRM(0) is set as a language code by a general parameter or a specific value which can be designated in SetM_LCD.

[Point 3]

To solve the problem described in (B2), as shown in FIG. 62, SPRM(21) is newly set as a place where only the user can change/set the language code and the changing by the command is impossible, so that the menu description language code set by the user can be held. Moreover, the meaning of SPRM(0) which has heretofore existed is changed a little. That is, the SPRM(21) is newly defined as a storage place of an initial menu language which is a parameter set to the information reproduction device. This SPRM(21) is a player setting language which can be changed/set only by the user, and cannot be changed by the command in the program of the content.

Moreover, the meaning of SPRM(0) is changed to a storage place of "current menu language being played back". This SPRM(0) can be changed/set both by the user and by the command in the content. As a result, even when SPRM(0) is changed by the command described in (B2), the menu description language code set by the user can be held, and any discomfort or excessive burden is not applied to the user.

[Concrete Description of Relation between SPRM(0) and SPRM(21)]

To describe a relation between SPRM(0) and SPRM(21), an example of the operation immediately after the insertion of the information storage medium into the information reproduction device (player) will be described. First, the value of the initial setting menu language SPRM(21) which is the menu description language code set to the information reproduction device by the user is copied to SPRM(0) before executing the process of the first play PGC (FP_PGC).

When the SetM_LCD command exists in FP_PGC, the value of SPRM(0) can be changed in accordance with the command, but in order to avoid the problem of (B2), the value copied from SPRM(21) is preferably held as the value of SPRM(0). If SPRM(0) is rewritten into a value different from that of SPRM(21) by the SetM_LCD command in the content recorded in the information storage medium, the value of SPRM(21) is held. Therefore, when another information storage medium is next inserted, the value of SPRM(0) is automatically rewritten to that of SPRM(21). Therefore, after the next information storage medium is inserted, the problem of (B2) is avoidable. For example, when VOB for the menu does not exist in FP_PGC, and exists in an HD video manager menu language unit (HDVMGM_LU) 312c shown in the language selection menu in FIG. 6, the HD video manager menu language unit (HDVMGM_LU) 312c corresponding to the value of the SPRM(0) is selected. The value of SPRM(21) is persistently changeable only by the user in a stage in which the operation of the information reproduction device is stopped. However, even when the value of SPRM(21) is rewritten by the user, the value of SPRM(0) is not simultaneously rewritten, and the conventional value is held.

[Parameter Information Recording Place in Information Reproduction Device]

Areas in which system parameters SPRM "0" to "31" are recorded are allocated into the memory 122 in a system block diagram in the information reproduction device shown in FIG. 48. The current menu language code information being played back is recorded in the SPRM(0), and the initial setting menu language code information is recorded in the SPRM (21).

[Object Information Recording Place]

Figure 2:
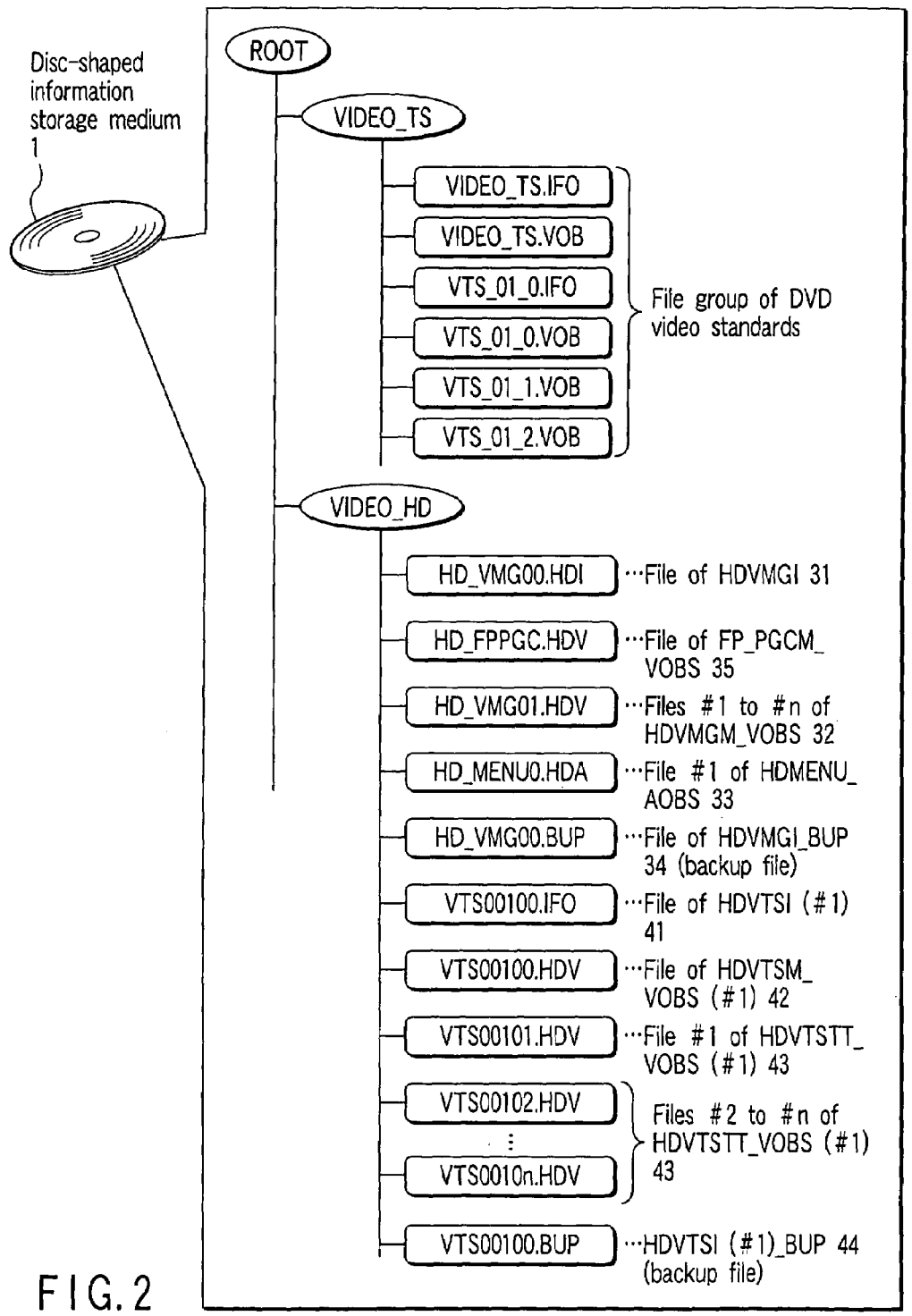
FIG. 2 is a diagram showing a file system of a conventional SD DVD video content.

As shown in FIG. 1E, a screen in which the menu description language code can be set is recorded in the area of a language selection menu VOBS for first play PGC (FP_PGC-M_VOBS) 35. This object information (video data) is independent as a single file named HD_FPPGC.HDV as shown in FIG. 2. [Management Information Recording Place]

As shown in FIG. 4, management information with respect to the language selection menu in which the menu description language code can be set is recorded in first play PGCI (FP_PGCI) in an HD video manager information management table (HDVMGI_MAT) 310.

[2] Problem in which a content representing power to the user is lacking (C) Seamless Play of Still Picture

[Point 1]

Seamless connection between moving pictures is assured even in the conventional DVD content. Therefore, to solve the problems described in the above (C1) and (C2), even in the video object set (VOBS) in which the still picture is recorded, the contents of VOB are defined by the same image as those of VOBS in which the moving picture is recorded. Accordingly, the seamless connection (C1) from the still picture to the moving picture in the same manner as in the seamless connection between the conventional moving pictures and the multi-angle play (C2) of the still picture can be assured.

[Point 2]

A concrete method for realizing a way of thinking in [Point 1] will be described hereinafter. To apply an extended system target decoder (E-STD) which assures the seamless play, an "imaginary access unit" is set in a period between I pictures in which the still picture is recorded. In a method of setting the access unit, in the embodiment of the present invention, an interval between I picture to record the still picture and the next I picture by a unit of a period of a video frame or a period integer times the period of the video frame is imaginarily and finely time-divided for each period of the access unit. Moreover, in the information reproduction device it is imaginarily regarded that the still picture is repeatedly played back/displayed for each imaginary access unit. A decoding time stamp (DTS) indicating a timing at which the still picture is input into a decoder and a presentation time stamp (PTS) indicating a timing at which the still picture is displayed are set beforehand for each still picture. A video frame period is determined by a national television system committee (NTSC) system and a phase alternation by line (PAL) system, and therefore the timing of a boundary position of the "imaginary access unit" can be easily calculated. The problem of (C1) is solved even with respect to the still picture by setting the access unit. That is, the values of STC set in a separation unit 103, video decoder unit 111, sub-picture decoder unit 112, and audio decoder unit 114 shown in FIG. 48 are switched in the boundary position of the access unit to make possible the seamless connection play to the moving picture from the still picture.

When the seamless play/connection to the moving picture from the still picture is assured, the user can comfortably enjoy the content, and further the representing power of the content provider to the user is enhanced. Moreover, the seamless connection/display to the moving picture from the still picture is possible only by the change in an imaginary definition without substantially changing the object structure of the conventional DVD video. Therefore, a most part of an authoring tool of the conventional DVD video is usable, and a rise in medium price in producing the present invention can be minimized.

[Point 3]

As one of the points for solving the problem of (C1), definition (restriction) with respect to the VOBU including the still picture is modified in accordance with the contents of [Point 2] as follows. That is, an integer number of "imaginary access units" are imaginarily set so as to constitute one VOBU. As a result, a display period of the VOBU of each still picture is integer times that of the video frame. Since the switching timing to the moving picture from the still picture surely coincides with a boundary timing of the video frame by the above-described definition (restriction), the screen can be prevented from being disturbed at the switching time (the frame with a filled gap can be displayed instead of interleaved field display), and the screen immediately before/after the switching can be clearly displayed.

Since one I picture indicating the still picture exists in a video access unit VAU, and an imaginary video access unit IVAU does not include any I picture, any video data does not exist in the IVAU. Only one I picture exists in each of the VOBU comprising VAU1 to IVAU15 and the VOBU comprising VAU16 to IVAU30. In the embodiment of the present invention, a plurality of I pictures are prohibited from being included in the same VOBU, and it is defined (restricted) that one VOBU should surely have one or less I picture. Since the sequence end code is arranged after the I picture in conformity to the specifications of MPEG-2, it is defined (restricted) that the VOBU including the I picture in this manner should surely have one sequence end code (i.e., both the I picture and the sequence end code are surely included in the same VOBU without separating the picture and the code into separate VOBUs).

Moreover, the same VOBU has a structure in which VAU is surely (imaginarily) arranged before IVAU. By the structure in which VAU is (imaginarily) arranged in the start position of the VOBU, when the moving picture is switched to the still picture, it is possible to decode the I picture in the VAU at a high rate, and the seamless play to the still picture from the moving picture is possible.

Any video data (I picture) is not included in the VOBU comprising IVAU30 to IVAU45. It is also possible to define the VOB in which any video data is not held.

[Point 4]

As means for solving the problem of (C2), the IVAU is imaginarily defined with respect to a still picture object, and it is further possible to arrange still picture data (still picture object) into an interleaved unit ILVU by the following method. That is, a restriction that "the sequence end code is prohibited from being arranged in the video data in the cell constituting the interleaved block ILVB" in the current DVD video as described in (C2) is imposed. Moreover, when the VOB is used in ILVU, the presentation period in one VOBU is set to be integer times that of the video frame with respect to the VOB including one or more sequence end codes, and a restriction is imposed that each VOBU has only one I picture as the video data or is structured not to have any video data. Furthermore, one sequence end code is arranged in the VOBU including the I picture, and the video data (I picture in which the still picture is recorded) is surely arranged in the first VOBU in ILVU. Immediately after the angle is switched by user instruction or the like, the start position of the ILVU having the corresponding angle is surely accessed. Therefore, when the video data is surely arranged in the first VOBU of ILVU, a time can be shortened until the display of the still picture at the angle switching time.

[Object Information Recording Place]

The still picture data in which the imaginary access unit is defined is recorded in a video object set for title (HDVTST-T_VOBS) 43 in FIG. 1F. This area constitutes a VTS00102.HDV file of FIG. 2.

[Management Information Recording Place]

The management information to manage the still picture data in which the imaginary access unit is defined exists in an HD video title set information (HDVTSI) 41 of FIG. 1F, and this area is grouped in a VTGS00100.IFO file of FIG. 2. As described above, since the period of the access unit is imaginarily and finely time-divided and imaginarily set by the unit of the period of the video frame or the period integer times that of the video frame, an actual boundary position of the imaginary access unit is calculated.

(D) Seamless Play of Cell including Cell Command

[Point 1]

The seamless play between the cells having cell commands is not assured in the conventional SD DVD video specifications, whereas the seamless play between the cells is assured even with respect to the cells which execute the cell commands in a case where there is not any branching point as in multi-angle. That is, the video presentation of the next cell is started as continuously as possible as long as there is not any branching point as in the multi-angle in the video presentation (even when the cell command is executed). As means for realizing this presentation, a physical arrangement of contents or the like is devised in such a manner that the presentation of the next cell can be started within 0.5 second after completion of the presentation of the previous cell.

[Point 2]

Moreover, the following is clearly described in the management information of the object (video data) concerning a place where the seamless play between the cells is assured with respect to the cell in which the cell command is to be executed. Although not shown, a seamless play flag, interleaved arrangement flag, STC discontinuous flag, and cell playback mode information exist in cell category information (C_CAT) in cell playback information (C_PBI) 530 shown in FIG. 38.

Even with respect to the cell in which the cell command is to be executed, concerning a place where the seamless play between the cells is assured, it is set with respect to the seamless play flag that "the cell should be seamlessly played back", it is set with respect to the interleaved arrangement flag that "the flag exists in a continuous block", it is set with respect to the STC discontinuous flag that "the resetting of STC is unnecessary", and "continuous presentation" is set to the cell playback mode.

[Point 3]

Figure 38:
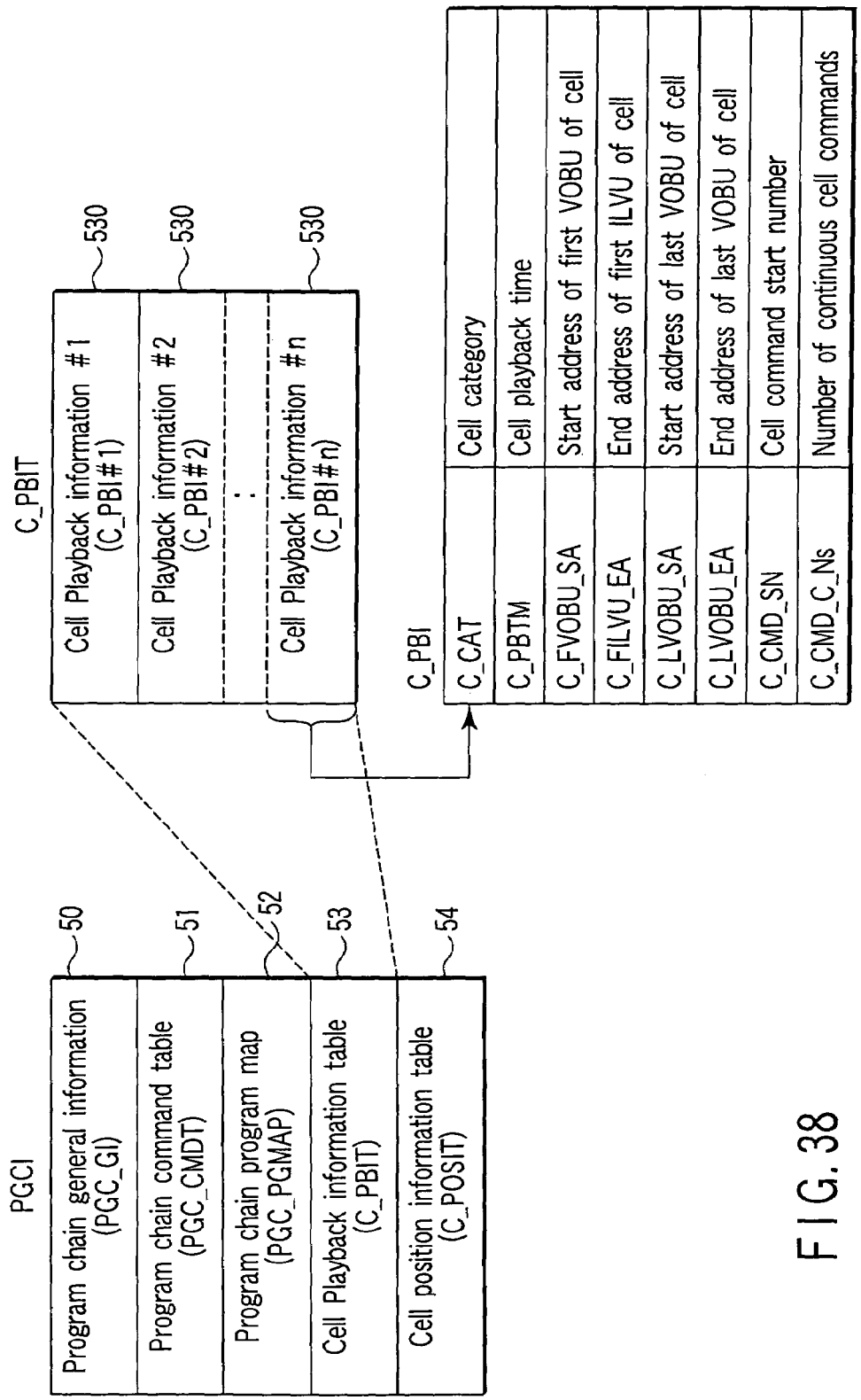
FIG. 38 is a diagram showing a data structure in a cell/Playback information table (C_PBIT) arranged in the program chain information (PGCI)

In the conventional SD DVD video, one command is selected and executed from a set of cell commands at the end of the playback of each cell. However, the restriction is abolished, and the execution of the cell command is not necessarily limited to the execution at the end of the playback of the cell. The execution of the cell command with respect to the cell is not limited to one command, and a plurality of commands can be sequentially executed. That is, as shown in FIG. 38, cell command start number information (C_CMD_SN) and number of continuous cell commands (C_CMD_C_Ns) are recorded in cell playback information (C_PBI) of the management information with respect to one cell in the HD DVD video.

As shown in FIG. 35, cell commands (C_CMDs) 513 are sequentially recorded in the program chain command table (PGC_CMDT) 51. The cell command start number information (C_CMD_SN) indicates the number of the cell command to be executed counted from the top of the string of arranged cell commands (C_CMDs) 513, and the number of continuous cell commands (C_CMD_C_Ns) indicates the number of commands which are sequentially and continuously executed.

(E) Measure Against Unmatched Highlight Information and Sub-Picture

[Point 1]

To solve the problem of (E1), an independent stream "graphic unit" is newly defined, both the highlight information and the graphic data (heretofore arranged in the "sub-picture") are simultaneously arranged in the graphic unit, and the sub-picture information is separated. Accordingly, as described in the above (E1), a content producer can produce the content as imaged without being influenced by the display period of the sub-picture information, a degree of freedom is enhanced, and, as a result, variety of contents can be presented to the user.

Moreover, five types of graphic units can be set in accordance with 16:9 HD image, 16:9 SD image, 4:3 SD image, letterboxed SD image, and pan-scan SD image, and five types of substream IDs can also be set for the respective types.

The highlight information is recorded in PCI recording area in the navigation pack in the conventional SD DVD video content, whereas the recording position of the highlight information is shifted into the graphic unit (GRU) and 24 buttons at maximum can be simultaneously set in one screen in the HD DVD video content of the present embodiment. With respect to each button, 256 colors at maximum can be designated, it is possible to change the color by the highlight at the selection time. Furthermore, mixing of contrasts up to 256 gradations can also be represented.

[Point 2]

To solve the problem described in (E2), instead of increasing the number of colors with respect to the conventional sub-picture stream, the number of usable colors is set to 256 (color presentation by eight bits) with respect to the graphic data in the "graphic unit". As a result, it is possible to display a graphic unit image having bright colors to the user, a display impact to the user is enhanced, and the user can easily select the menu.

[Point 3]

To solve the problem described in (E3), the graphic data and mask data are recorded in the "graphic unit", display patterns of both the data can be set in a bit map form, and accordingly an optional shape can be set. As a result, it is possible to prepare a star-shaped or elliptic highlight information designated region (optional button shape), and there can be provided a screen much more attractive than that of the DVD content of the conventional SD.

[Point 4]

To solve the problem described in (E4), the mask data is recorded in the "graphic unit", and it is possible to simultaneously set a plurality of regions (hot spots) apart from one another in the screen as the mask data. That is, masking data can be superposed upon and set to the respective buttons of the highlight information. As a result, there can be provided a menu screen which is not inferior to the PC screen including the same URL settable with respect to a plurality of regions apart from one another in the screen or to the homepage screen of internet and which is easy to use by the user.

[Point 5]

Graphic Stream

An enhanced video object (EVOB) includes a part of presentation and navigation data. The navigation data recorded in the EVOB are presentation control information (PCI) and data search information (DSI). The presentation data are video data, audio data, and sub-picture data. The EVOBS is a set of EVOBs. The EVOB is divided into cells constituted of EVOBUs. The EVOBU includes a navigation pack, audio pack, video pack, graphic pack, and sub-picture pack.

A graphic stream is completed in the EVOB. The end PTM of the end graphic unit (GRU) is not more than a time described in EVOB_V_E_PTM. The graphic presentation is effective only in the cell in which the GRU is recorded. The PTM of the first GRU is not less than a time described in EVOB_V_S_PTM. The PTM of a certain GRU in the graphic stream is larger than that of a preceding GRU. It is to be noted that the definitions of "completed" are: 1) each stream starts with the first data of each access unit; and 2) each stream ends uniformly in each access unit. Therefore, when a length of the pack including the end data of each stream is not more than 2,048 bytes, the length is adjusted.

[Object Information Recording Place]

The graphic units can be recorded in the following four places.

(1) The information is grouped in an HD_FPPGC.HDV file of FIG. 2 recorded in language selection menu VOBS for first play PGC (FP_PGCM_VOBS) 35 of FIG. 1E.

(2) The information is grouped in an HD_VMG01.HDV file of FIG. 2 recorded in the video object set for HD video manager menu (HDVMGM_VOBS) 32 of FIG. 1E.

(3) The information is grouped in a VTS00100.HDV file of FIG. 2 recorded in the video object set for HD video manager title set menu (HDVTSM_VOBS) 42 of FIG. 1F.

(4) The information is grouped in a VTS00101.HDV or VTS00102.HDV file of FIG. 2 recorded in the video object set for HD video title set menu (HDVTSTT_VOBS) 43 of FIG. 1F.

[Data Structure in Object Information]

Figure 39:
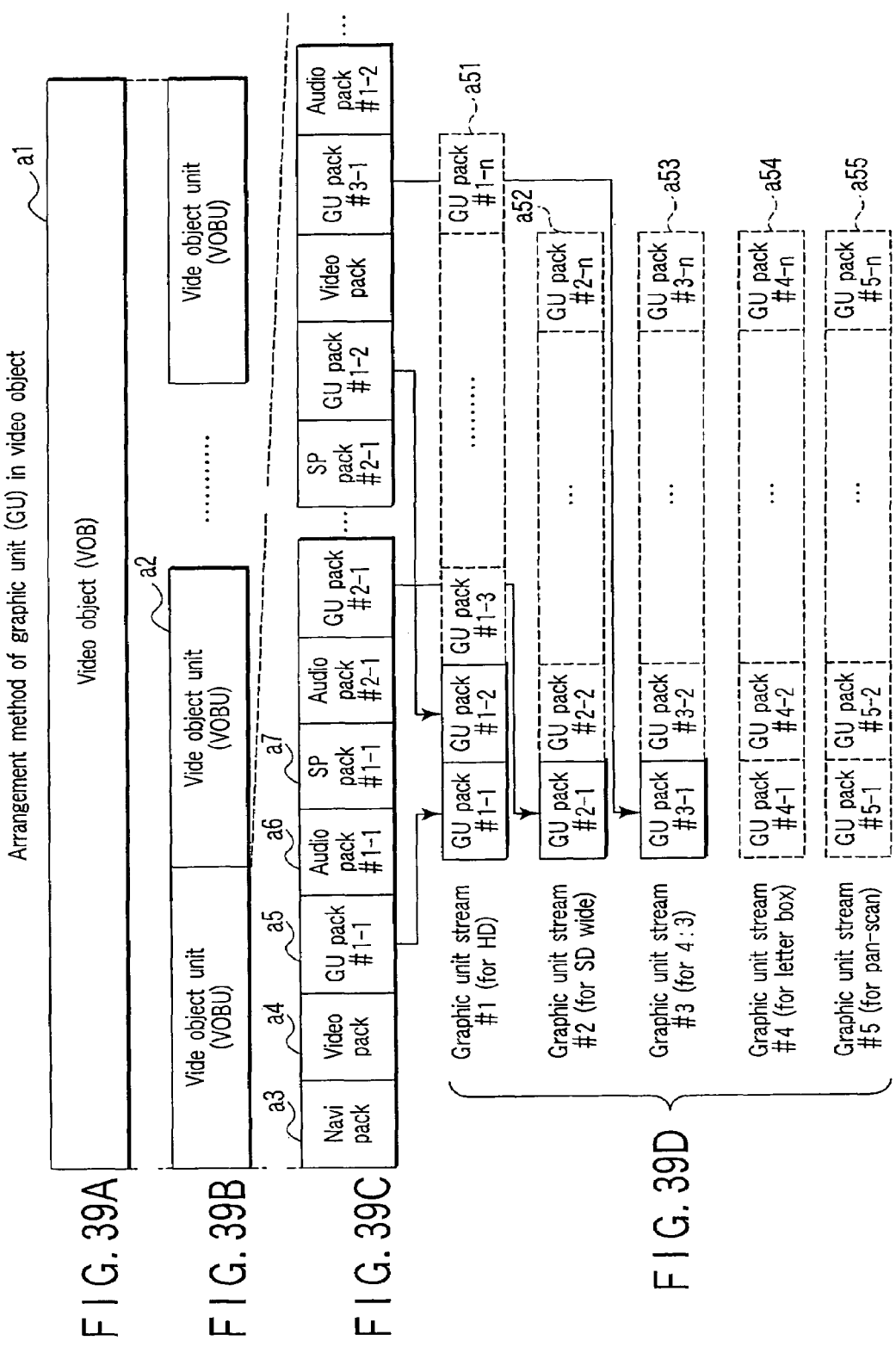
FIGS. 39A, 39B, 39C, and 39D are arrangement diagrams of a graphic unit (GU) in a video object.

As shown in FIG. 39D, five types of streams are separately recorded in accordance with the 16:9 HD image, 16:9 SD image, 4:3 SD image, letterboxed SD image, and pan-scan SD image.

Figure 41:
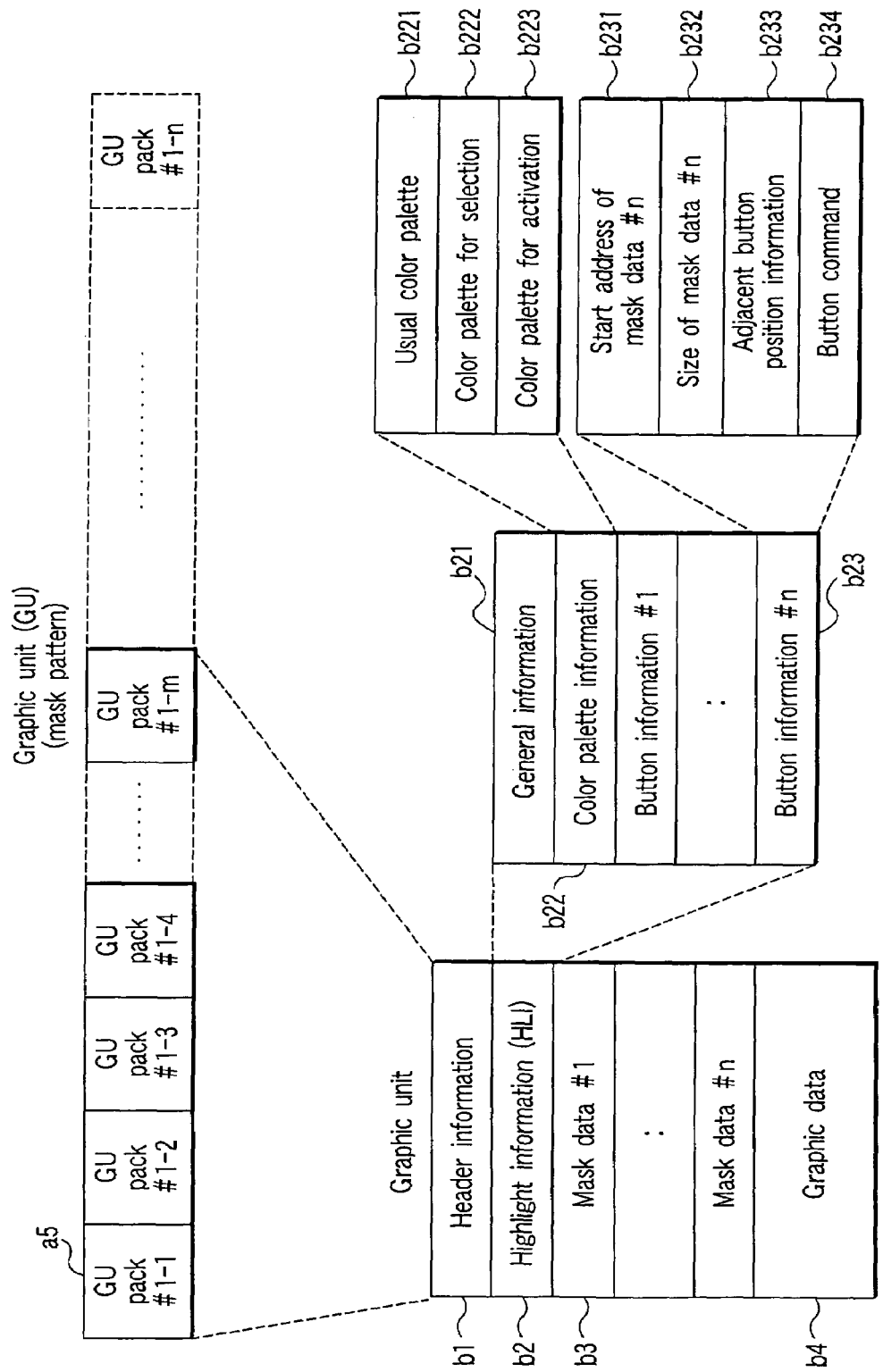
FIG. 41 is a diagram showing one example of a data structure in the graphic unit.
Figure 42:
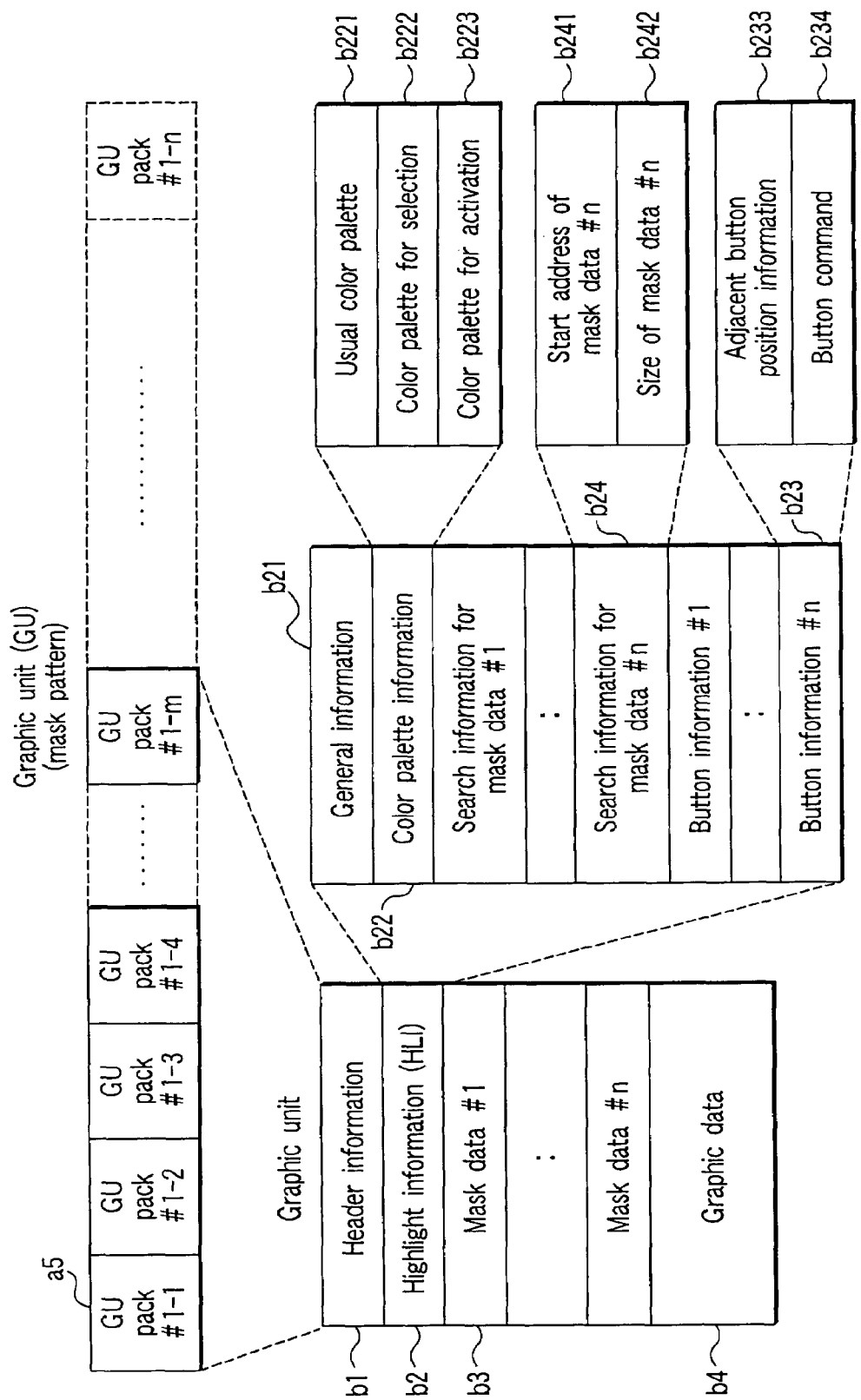
FIG. 42 is a diagram showing another example of a data structure in the graphic unit.

Moreover, as shown in FIGS. 41 and 42, the graphic unit (GU) includes highlight information (HIL) b2, mask data b3, and graphic data b4.

[Management Information Recording Place]

The management information on the structure of the graphic units to be recorded in the PGC is recorded in PGC graphic unit structure control table (PGC_GUST_CTLT) of FIGS. 33 and 34.

[Management Information Contents]

As the management information on the graphic unit included in the menu of the HD video manager, number of HDVMGM graphic unit stream information items (HD-VMGM_GUST_Ns) and HDVMGM graphic unit stream attribute (HDVMGM_GUST_ATR) are recorded in the HD video manager information management table (HDVMGI_MAT) 310 as shown in FIG. 4.

Moreover, as shown in FIG. 21, in the management information on the graphic unit included in the HD video title set (HDVTS), graphic unit stream number information and attribute are divided into the menu screen and title (display video) in HDVTS, and are recorded as information of HDVTSM_GUST_Ns, HDVTSM_GUST_ATR, HDVTS_GUST_Ns, and HDVTS_GUST_ATRT.

The information in a PGC graphic unit stream control table (PGC_GUST_CTLT) in which the management information on the stream of the graphic units to be recorded in the PGC is recorded is recorded in separate regions in accordance with fifth types of images (16:9 HD image, 16:9 SD image, 4:3 SD image, letterboxed SD image, and pan-scan SD image) as shown in FIGS. 33 and 34.

(F) Audio Data Playback at Menu Screen Switching Display Time

[Point 1]

To solve the problem described in (F), a unique audio data storage place is set in accordance with the menu. The playback of the unique audio data is started simultaneously at a presentation start time of the PGC in which the menu is displayed. The playback of the audio data is stopped simultaneously with the start of the presentation of PGC (e.g., of VTS) which does not require the playback of the audio data, for example, with the completion of the display of a series of menu. The audio data is copied in the memory 122 of FIG. 48 before the menu is displayed, and the audio data copied in the memory 122 is continuously and repeatedly played back for a period for which the user shifts and displays the menu. A maximum capacity of the audio data which can be copied in the memory 122 is set to 8 MB. When a transfer rate of compressed audio data is, for example, 384 Kbps, it is possible to store the audio data for 2.5 minutes with the maximum capacity of 8 MB.

[Point 2]

Selection designation information of the audio data is recorded in PGCI which is the management information of PGC so as to make possible selective playback instruction between the audio data recorded in VOBS for video present in the DVD video for the conventional SD and the above-described unique audio data. As a result, the content provider can designate the selection of the audio data continuously displayed even with the switching of the menu or the audio data set to be optimum for each menu, and the representing power of the content provider to the user is enhanced.

[Object Information Recording Place]

Figure 19:
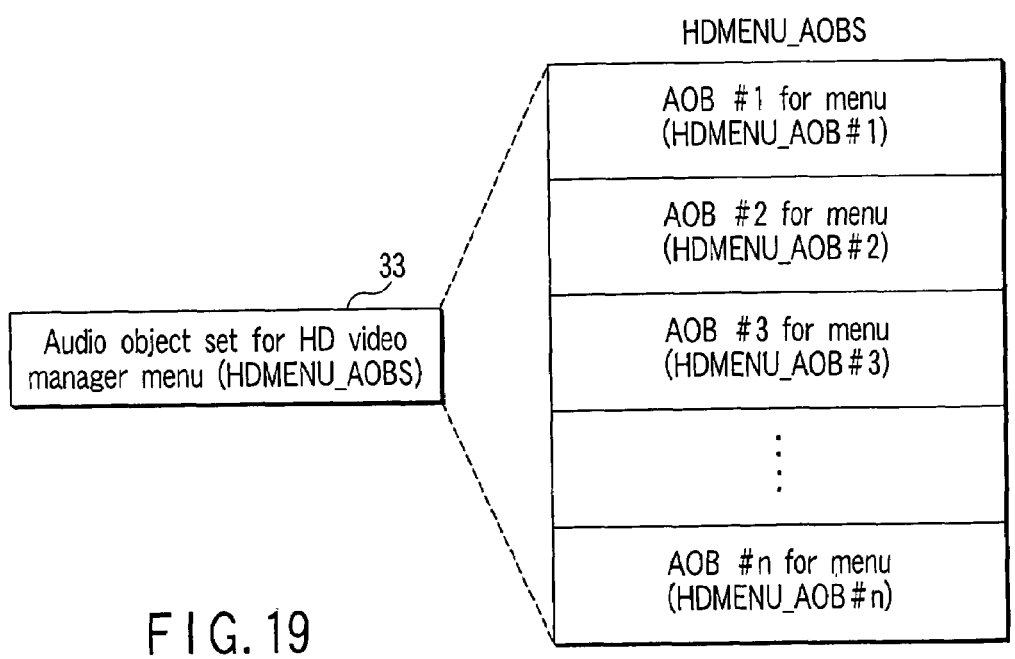
FIG. 19 is a diagram showing a data structure in an audio object set for HD video manager menu (HDMENU_AOBS)

As shown in FIG. 1E, the audio object set for HD menu (HDMENU_AOBS) 33 in which audio information to be output in parallel with menu display is recorded is newly recorded in an HD video manager (HDVMG) 30. A recording place of the audio object set for HD menu (HDMENU_AOBS) 33 in a file structure is an HD_MENU0.HDA file which is a unique file in a common directory (folder) of VIDEO_HD as shown in FIG. 2. In the embodiment of the present invention, it is possible to record a plurality of types of menu audio objects (audio data) in the information storage medium. Audio objects for menu (HDMENU_AOBs) are recorded in order in the audio object set for HD menu (HDMENU_AOBS) 33 as shown in FIG. 19. In the embodiment shown in FIG. 56, the structure includes the only audio object (audio data) for the menu, and an inner structure can be finely divided by a plurality of entries.

[Management Information Recording Place]

Figure 3:
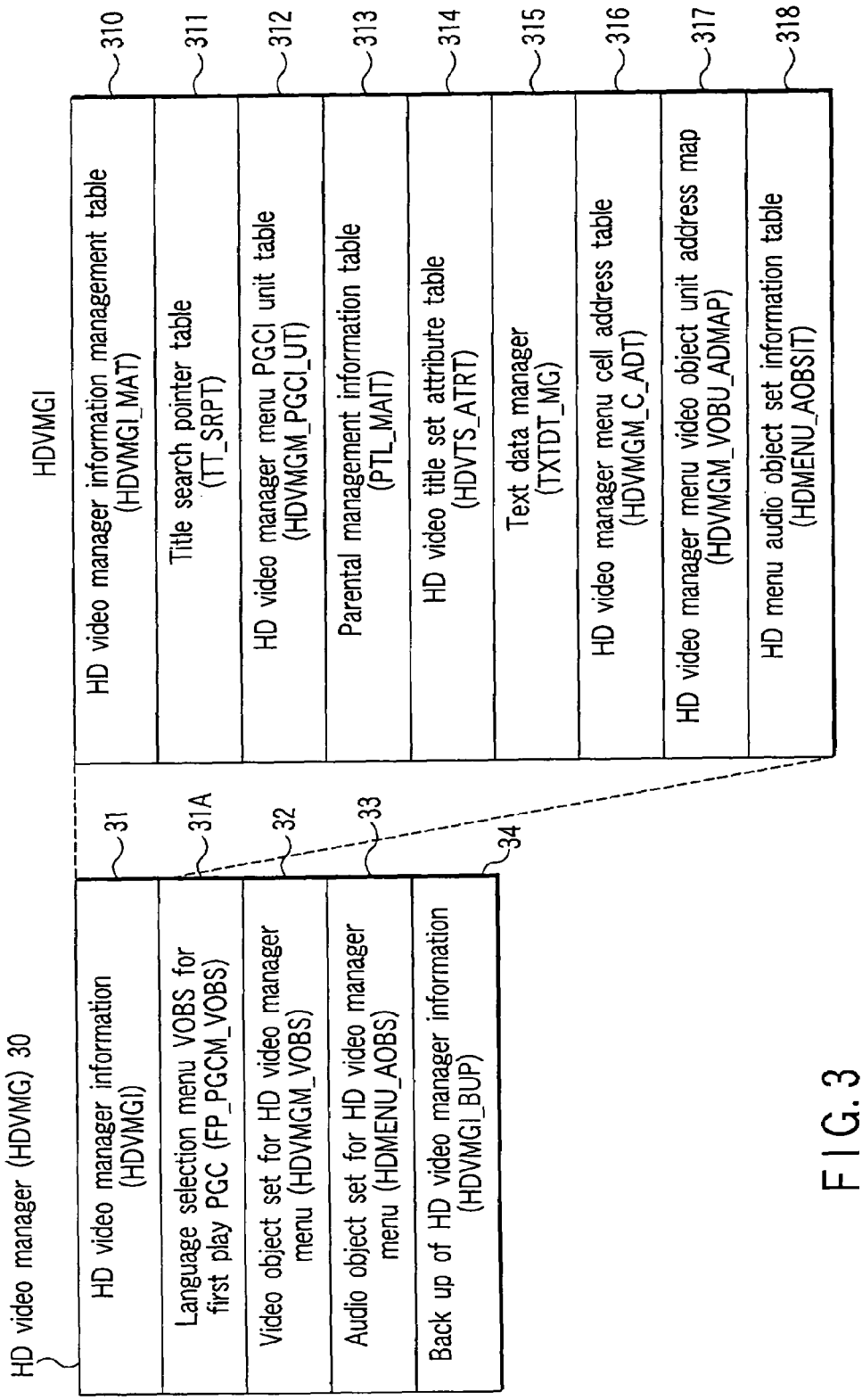
FIG. 3 is a diagram showing a data structure in an HD video manager information (HDVMGI) 31 shown in FIG. 1E.

As shown in FIG. 3, management data with respect to the object of the audio object region for the menu (HDMENU_AOBS) 33 is recorded in an HD menu audio object set information table (HDMENU_AOBSIT) 318 in an HD video manager information (HDVMGI) 31.

Figure 7:
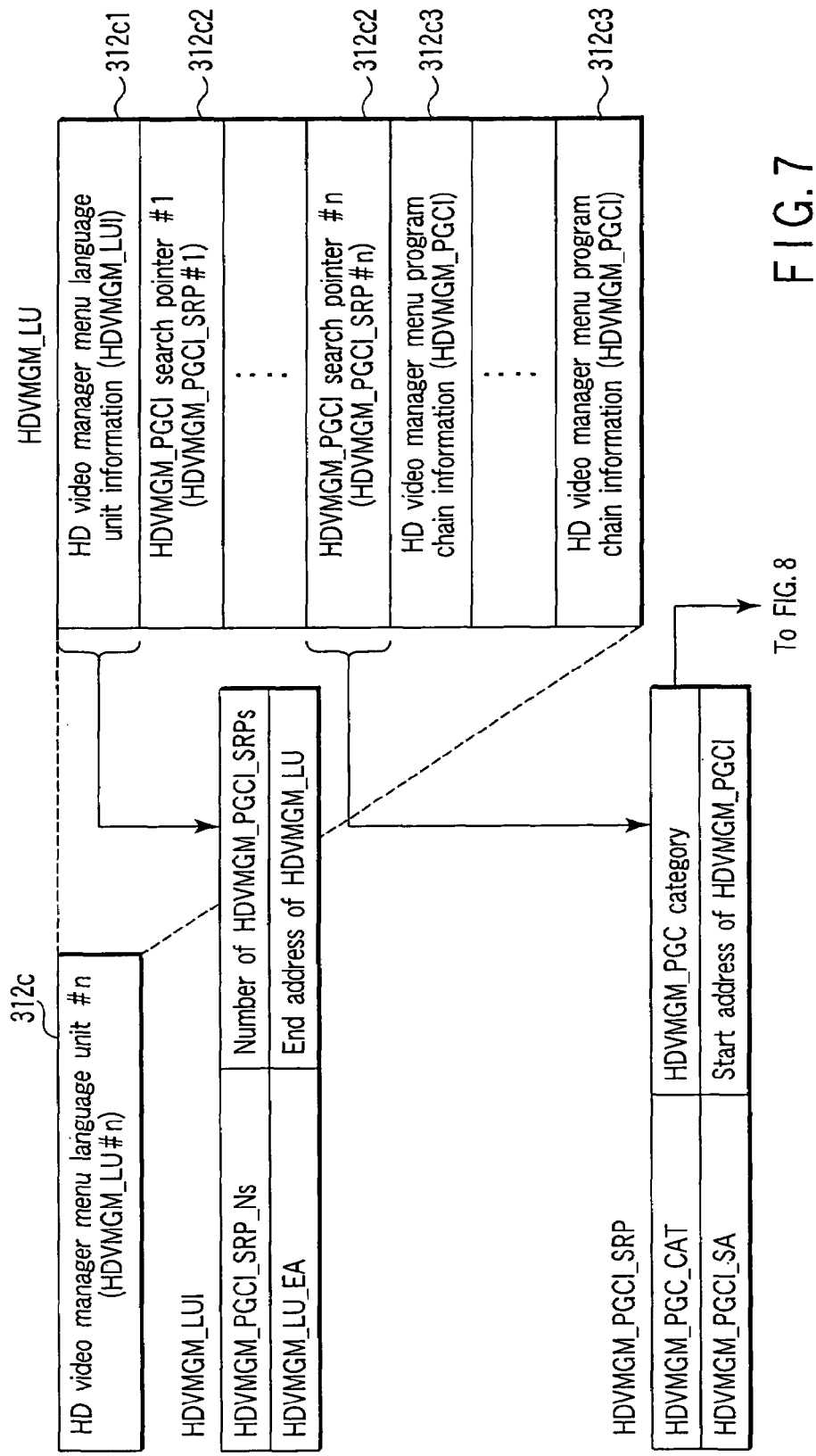
FIG. 7 is a diagram showing a data structure in an HD video manager menu language unit #n (HDVMGM_LU #n) 312c (FIG. 6) recorded in the HD video manager menu PGCI (HDVMGM_PGCI_UT) 312 shown in FIG. 3.
Figure 26:
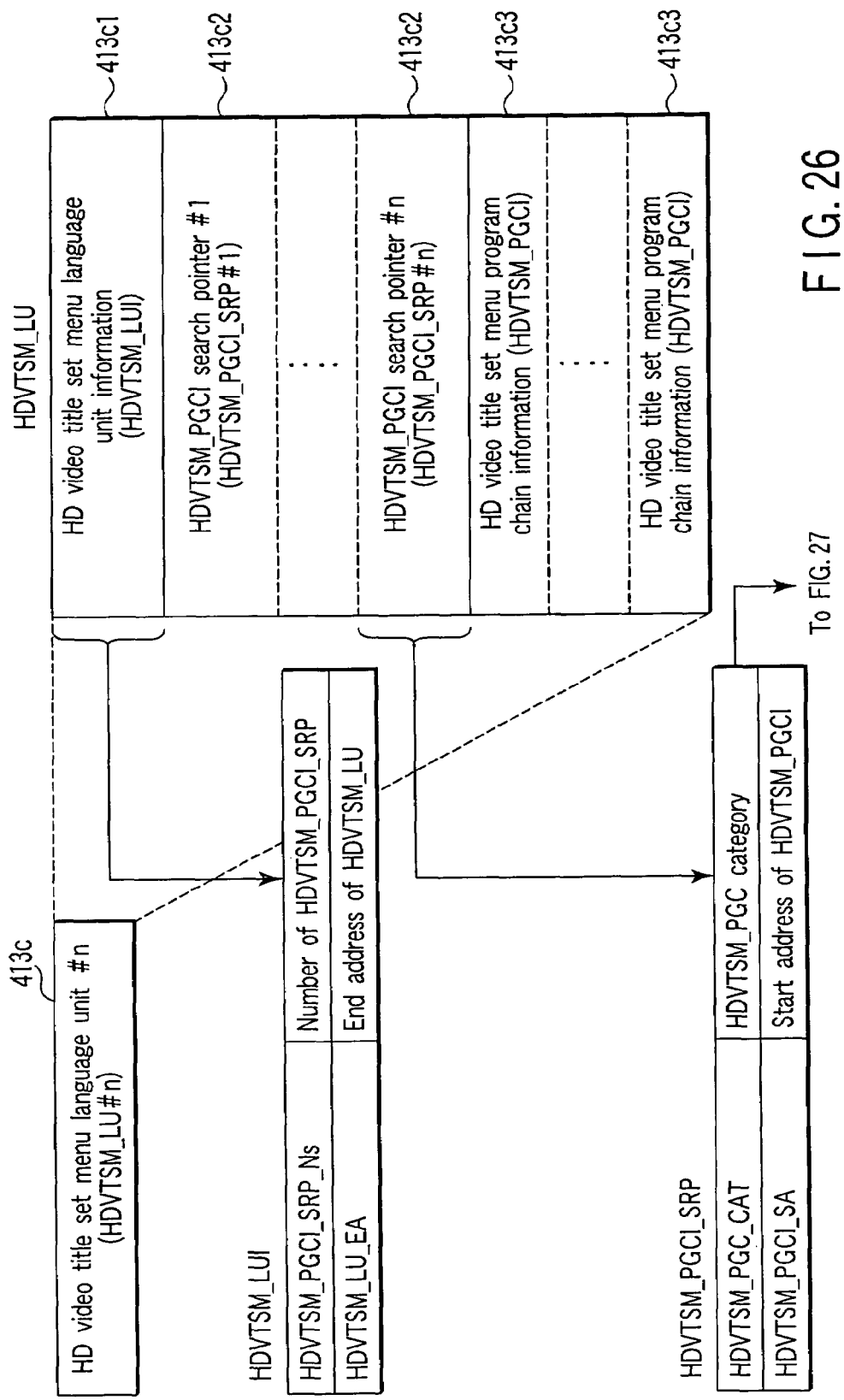
FIG. 26 is a diagram showing a data structure in an HD video title set menu/language unit (HDVTSM_LU) 413c shown in FIG. 25.

Moreover, in a place where information for referring to (designating) HD menu AOB (HDMENU_AOB) is set with respect to the whole menu in the embodiment of the present invention, as shown in FIG. 7, the information is recorded in HDVMGM_PGC category information (HDVMGM_PGC_CAT) in an HDVMGM_PGCI search pointer #n (HDVMGM_PGCI_SRP #n) 312c2 in an HD video manager menu language unit (HDVMGM_LU #n) 312c. Concerning the menu by an HDVTS unit, as shown in FIG. 26, the information is recorded in an HDVTSM_PGC category information (HDVTSM_PGC_CAT) in an HDVTS_PGCI search pointer #n (HDVTSM_PGCI_SRP #n) 413c2.

In another embodiment of the present invention, as shown in FIGS. 33 and 34, the information is recorded in an RSM&AOB category (RSM&AOB_CAT) in the program chain general information (PGC_GI) 50.

[Management Information Content]

Concerning the whole menu, as shown in FIG. 7, the followings are recorded in the HDVMGM_PGC category information (HDVMGM_PGC_CAT) in the HDVMGM_PGCI search pointer #n (HDVMGM_PGCI_SRP #n) 312c2 in the HD video manager menu language unit 312c. Concerning the menu by the HDVTS unit, as shown in FIGS. 26 and 27, the followings are recorded in the HDVTSM_PGC category information (HDVTSM_PGC_CAT) in the HDVTS_PGCI search pointer #n (HDVTSM_PGCI_SRP #n) 413c2:

(1) Audio information number designating AOB number #n to be played back in HDMENU_AOBS (the number of the corresponding AOB in the AOBs for the menu (HDMENU_AOB) recorded as shown in FIG. 19); and (2) Audio information selection flag indicating selected information of audio information to be played back simultaneously with the screen display of the HD content menu, and start/continue/end trigger information of audio information playback.

Figure 17:
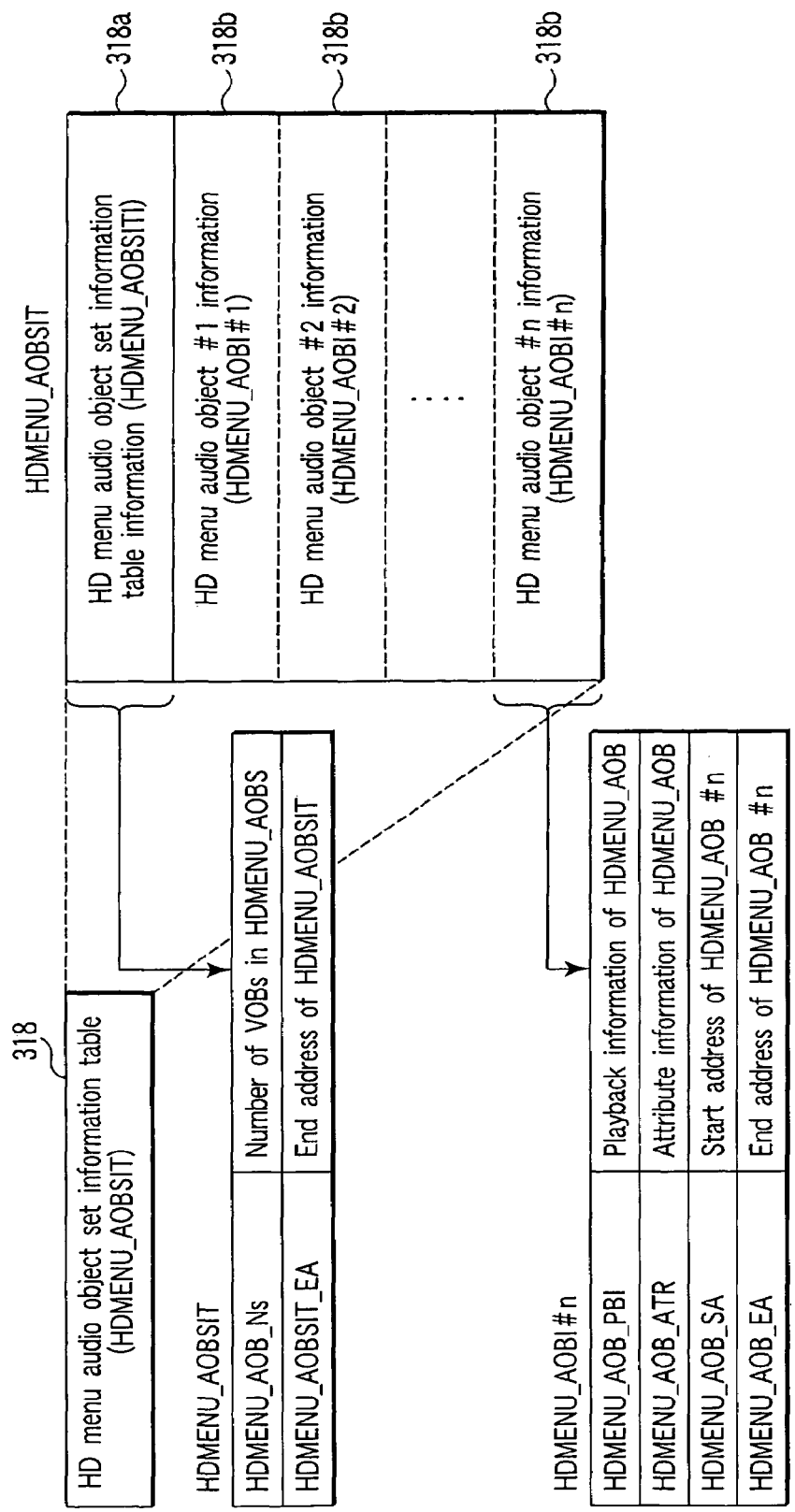
FIG. 17 is a diagram showing contents of management information with respect to AOB for HD video content menu (HDMENU_AOB)

FIGS. 7 and 24 or 33 and 34 show management information which designates the HD menu audio object to be played back simultaneously with the display of the menu screen. Accordingly, as shown in FIG. 17, contents of management information with respect to the menu audio object include HD menu audio object set information table information (HDMENU_AOBSITI) 318a and HD menu audio object information (HDMENU_AOBI) 318 which are individual management information with respect to the AOBs for the menu recorded in the information storage medium.

This HDMENU_AOBI includes HDMENU_AOB_PBI indicating playback information (playback time of music) of HDMENU_AOB; HDMENU_AOB_ATR indicating attributes (LPCM, AC-3, and the like) of the object; and HDMENU_AOB_SA and HDMENU_AOB_EA indicating a start address and an end address of HDMENU_AOB#n. An absolute or relative size of HDMENU_AOB#n is sometimes recorded with respect to the start or end address.

Moreover, the information of (1), (2) may also be represented by RSM&AOB_CAT in FIG. 33.

[Access Information]

As shown in FIG. 4, HDMENU_AOBS start address information HDMENU_AOBS_SA indicating a place where the audio object set for HD menu (HDMENU_AOBS) 33 is recorded, and HDVMGM_AOB information table start address information (HDMENU_AOBSIT_SA) indicating a place where the HD menu audio object set information table (HDMENU_AOBSIT) 318 is recorded are recorded in the HD video manager information management table (HDVMGI_MAT) 310. The audio information to be output simultaneously with the menu display in the information storage medium (optical disk or HD DVD disk) is recorded in the area 33, and the management information for the audio object for the menu is recorded in the table 318.

(G) Data structure in sub-picture stream corresponding to clear HD picture having high resolution

[Point 1]

A sub-picture unit header (SPUH) disposed in a head position of a sub-picture unit (SPU) of a sub-picture stream corresponding to HD content comprises a pre-header (PRE_HEAD) and a post header (POST_HEAD) (FIG. 58). By this structure, expandability of a data structure for HD content is imparted, and compatibility of information (a size (SPU_SZ) and a sub-picture display control sequence table start address (SP_DCSQT_SA) of the sub-picture unit (SPU)) recorded in the sub-picture unit header (SPUH) in the conventional SD content is kept. Accordingly, a part of a control program already built in a conventional DVD player can be diverted, and reduction of a price of the information reproduction apparatus capable of reproducing both the HD and SD contents can be realized. The content producer can also divert the sub-picture unit (SPU) for use in the existing SD content to the HD content, and effective use of content resources can be realized.

Figures 58A, 58B, 58C:
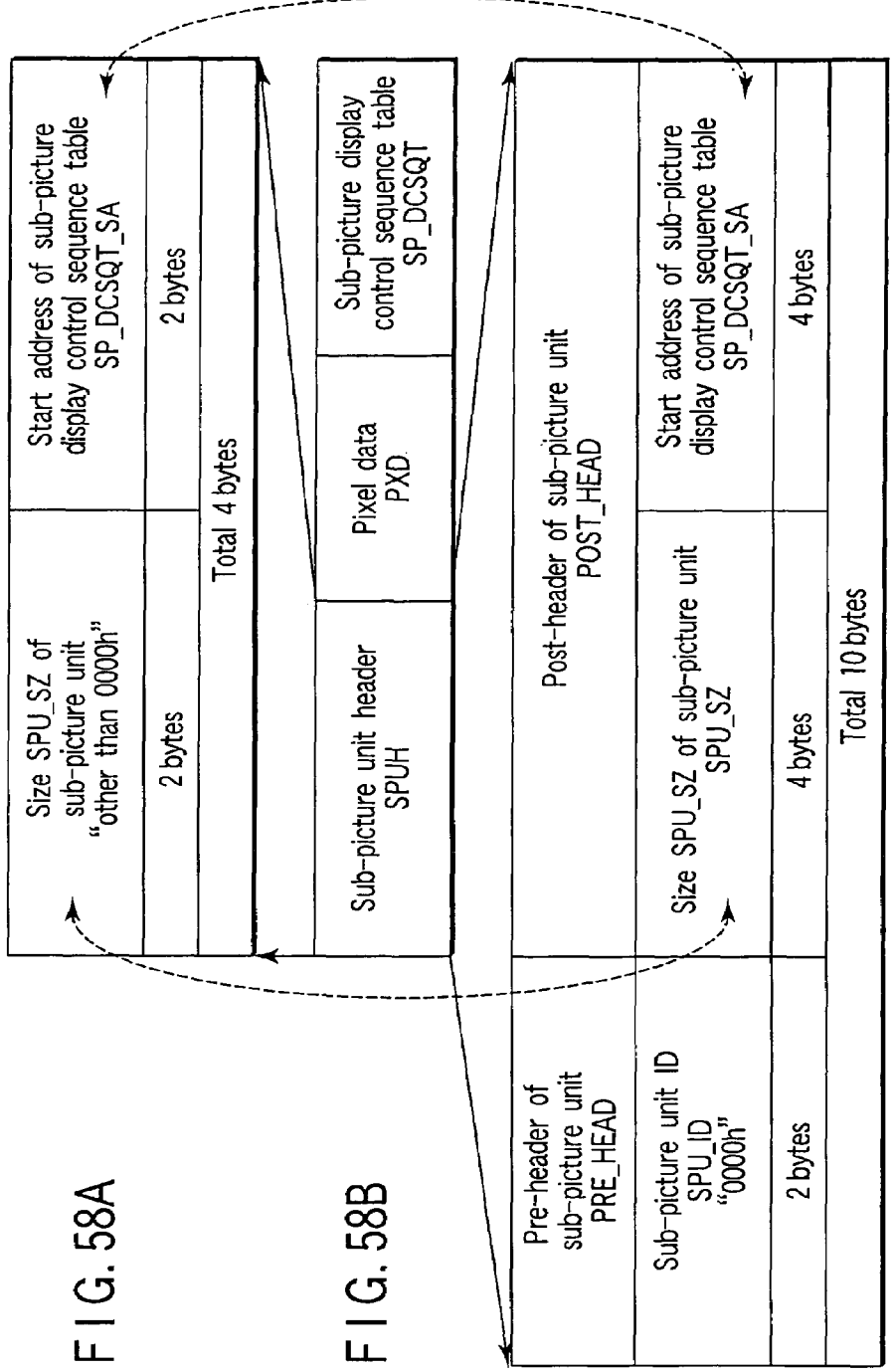
FIGS. 58A, 58B, and 58C are diagrams showing a data structure in a sub-picture unit header for SD and HD.

That is, the size information (SPU_SZ) and sub-picture display control sequence table start address information (SP_DCSQT_SA) recorded in the sub-picture unit header (SPUH) in the conventional SD content as shown in FIG. 58A are recorded as such in the post header (POST_HEAD) in the HD content as shown in FIG. 58C.

[Point 2]

By a data structure capable of simply deciphering first two bytes in the sub-picture unit header (SPUH) to determine whether the relevant sub-picture unit (SPU) corresponds to the conventional SD content or the HD content, the sub-picture decoder unit 112 (FIG. 48) built in the reproduction apparatus can be switched at a high speed at the time of reproduction of picture information (video object).

That is, when the first two bytes in the sub-picture unit header (SPUH) is "0000h", as shown in FIG. 59A, it is determined that the sub-picture stream corresponds to the HD content, and it is interpreted that the first two bytes mean the pre-header (PRE_HEAD). When the first two bytes in the sub-picture unit header (SPUH) is other than "0000h", as shown in FIG. 59A or 58, the stream is regarded as the sub-picture stream for the conventional SD, and it is interpreted that the first two bytes mean the size information (SPU_SZ) of the sub-picture unit (SPU).

[Point 3]

With respect to a list of sub-picture display control commands (SP_DCCMD) which can be recorded in the sub-picture display control sequence table (SP_DCSQT) shown in FIG. 56, as shown in FIG. 60, a display region of pixel data which is a command with respect to a sub-picture having a high resolution for the HD content is added as Setting 2 (SET_DAREA2), a display start address of pixel data is added as Setting 2 (SET_DSPXA2), and changes of color and contrast of the pixel data are added as Setting 2 (CHG_COL-CON2).

[Object Information Recording Place]

Sub-picture streams for the HD are scattered/recorded in picture information (video objects) for the HD content. As concrete recording places, the streams are recorded in a video object set for HD video manager menu (HDVMGM_VOBS) 32 of FIG. 1E, a video object set for HD video title set menu (HDVTSM_VOBS) 42 and a video object set for HD video title set title (HDVTSTT_VOBS) 43 of FIG. 1F and the like.

[Data Structure in Object Information]

As shown in FIG. 56, the sub-picture unit header (SPUH) exists in a head group in the sub-picture unit (SPU), and the inside thereof has a structure shown in FIG. 59. A sub-picture display control command (SP_DCCMD) shown in FIG. 60 is recorded in a sub-picture display control sequence table (SP_DCSQT) of FIG. 56.

(H) The above-described subject matters are provided, and the representing power to the user is further enhanced. Moreover, the content easy to use by the user is managed in a directory (folder) separated from a place where the conventional DVD video content is recorded as shown in FIG. 2. That is, in the conventional DVD video content, video information (video data, sub-picture data, and audio data are generically referred to as the video object) and the management data for managing the video information are grouped, recorded, and managed under the directory (folder) named VIDEO_TS.

On the other hand, in the content having the subject matters (A) to (H), the video and the management data for managing the video information are managed together in another directory (folder) named VIDEO_HD as shown in FIG. 2, and convenience of presentation control of the information reproduction device is enhanced.

In the HD content of the present embodiment, the HD_MENU0.HDA file exists in which the audio information to be output simultaneously with the menu display is recorded, but the file does not exist in the conventional DVD video content.

Moreover, the information reproduction device according to the present embodiment includes a graphic decoder unit 113 as shown in FIG. 48, but the information reproduction device for reproducing the conventional DVD video content does not include the graphic decoder unit 113. Therefore, when the conventional DVD video content and the HD content are mixed/played back, a circuit and control program for use in each content need to be switched on an information reproduction device side. When the directory (folder) is divided for each content as shown in FIG. 2, it is easy to identify the content on the information reproduction device side. By the process of switching the circuit and control program at the time of access to the file, a switching process is smoothly performed at a high rate, when the HD and SD contents are mixed/played back.

<<Relation among Subject Matters>>

In the present embodiment, the content easy to use by the user by simple authoring is provided by a combination of subject matters (A), (B), the content representing power to the user is further improved by a combination of subject matters (C) to (F), and the appeal of the DVD video to the user is further enhanced.

An effect of the combination of the subject matters (A) to (F) will be concretely described in accordance with two examples.

[I] Example of a case where the user selects an optimum language from the menu and thereafter searches for a place to see using another menu After the HD DVD video disk (information storage medium) is attached to the information reproduction device, a screen for selecting the language by the user is displayed in a first displayed screen (FP_PGC) (subject matter B). At this time, a unique shape different from a conventional rectangular shape is displayed with respect to the highlight information indicating the language to be selected by the user in the screen (subject matter E), and accordingly the user can easily select the language. For example, when the language of each country is displayed in the screen, the shape of the corresponding country on the geographical map is displayed in a display range of the highlight information, and the user can only identify the shape of the display range of the highlight information without reading the language to be selected to designate the desired language. Japan is marked in red on the terrestrial globe or global map in many cases. Therefore, 256 display colors of the graphic units are recorded (subject matter E), each language is displayed in the corresponding color (Japanese is displayed in red), and the user can only identify the color to identify the corresponding language.

Moreover, after selecting the language, the user shifts to a thumbnail (reduced image indicating a top screen designating a presentation start position) list of titles, and searches for a video place to see in many cases. Even in the conventional DVD video menu, a text indicating the presentation start position is displayed under the thumbnail in many cases. At this time, the user can further easily search for the place to see using the graphic unit (subject matter E). That is, the display range of the highlight information is displayed in the "star shape" in a place indicating a large pause such as a large change of scene in a video title, the inside of the star is represented in conspicuous colors such as red. A place which belongs a lower class and which indicates a skip destination is displayed by a "round mark" and is represented in light yellow or blue and can be graphically displayed so that a large pause is eliminated.

Furthermore, when the subject matter described in (F) is used, the audio information can be output continuously without being interrupted in a period of a series of operation in which "the user shifts to the thumbnail list of the titles, after selecting the language, to search for the video to see" (even when the menu screen for the language selection switches to the title thumbnail list screen). The user can readily switch the menu. Accordingly, when a small number of audio objects are only recorded in the information storage medium, these objects can be used among a plurality of menus. Moreover, audio object ranges repeatedly played back among different menus can be subtly adjusted. In a case where the user switches the menu screen corresponding to PGC #B to that corresponding to PGC #C, for a while after ending the switching of the menu screen, (1) the background sound (background music) of the menu screen corresponding to the PGC #B is played back, (2) the background sound (background music) of the menu screen corresponding to the PGC #B ends to the last, (3) thereafter the background sound (background music) of the menu screen corresponding to the PGC #C is continuously played back from the beginning, and (4) thereafter the background sound (background music) of the menu screen corresponding to the PGC #C is repeatedly played back in a designated range. A direction of an effective background sound (background music) can be presented to the user in this manner.

A concrete process method for enabling the above-described process will be described in an information reproduction apparatus shown in FIG. 48. When a DVD video disk (information storage medium 1) of HD is attached to the information reproduction apparatus, a disk drive 101 reads an HD video manager information (HDVMGI) 31 and an HD video title set information (HDVTSI) 41 which are management information shown in FIG. 1E to store the information in the memory 122. For example, next an MPU 121 analyzes contents temporarily stored in the memory 122 to confirm presence/absence of audio data AOB which is a preload reproduction object. On judging the presence of the audio data AOB which is the preload reproduction object, the MPU 121 controls the disk drive 101 to read audio object set for menu HD video manager (HDMENU_AOBS) 33 shown in FIG. 1E. The information is temporarily stored in the memory 122. Next, the menu screen for selecting the language is displayed to the user in accordance with information of first play PGCI (FP_PGCI) shown in FIG. 4, and simultaneously the playback of the audio data AOB temporarily stored in the memory 122 is started. Next, when the user switches the screen to a screen showing the thumbnail list of the titles, an audio information number in HDVTSM_PGC_CAT shown in FIG. 27 matches the AOB number played back at the time of the display of the menu for selecting the language. When the audio information selection flag is set to '10b' (HDMENU_AOBS is continuously played back), the audio data is continuously output without being influenced by the switching of the menu screen.

[II] Example of the returning to the video title display after displaying the menu screen and bonus content halfway in the video title presentation The presentation of the multi-angle comprising a plurality of types of slide shows for continuously reproducing the still pictures by the definition of the imaginary VAU (IVAU), or the presentation of the multi-angle comprising the slide show of the still pictures and the moving pictures is seamlessly performed (subject matter C). The presentation between the cells in which the cell command is executed can be seamlessly performed (subject matter D). By a method of setting an RSM permission flag in HDVTS_PGC_CAT (setting of "0b: permission") shown, for example, in FIG. 24 which is the management information for managing the seamless play, the user calls the menu screen halfway in the seamless play of the above-described multi-angle or halfway in the seamless play between the cells in which the cell command is executed. Thereafter, for example, when returning from the display of the bonus content such as a movie preview and a shooting spot (additionally, in a case where the RSM permission flag in HDVTS_PGC_CAT corresponding to the bonus content is set to "1b: prohibition"), it is possible to continue the seamless play of the multi-angle or the seamless play between the cells to execute the cell command (subject matter A). Especially, the seamless play is not assured with respect to the multi-angle comprising the slide show of still pictures and the moving picture in the conventional SD DVD video specifications. However, by the combination of the subject matters (A) and (C) or (A) and (D), after the screen jumps from "menu screen"→"bonus content presentation" halfway in the multi-angle video presentation, the screen returns to the original multi-angle video comprising the slide show of still pictures and the moving picture, and subsequently the seamless play is continued. This and versatile presentation modes can be realized.

Furthermore, a combination effect of these subject matters will be described in a case where the following process is performed as an example indicating versatile presentation modes by a combination of these subject matters.

(1) Halfway in the display of painters' names (in sub-pictures) and continuously switching paintings with sound explanations, (2) sound language for the explanation is switched at the menu screen. Furthermore, (3) the menu screen is instructed so as to delete the painters' names simultaneously displayed in the sub-pictures.

(4) After the presentation of bonus video in which a specific painting is explained in detail, (5) the presentation is continued from the painting immediately before the shifting to the menu screen.

In the conventional SD DVD video specifications, when returning to the operation of (5), it is not easy to "continue the presentation from the painting immediately before the shifting to the menu screen". When returning to the operation of (5), the user needs to turn over the paintings from the beginning. A complicated authoring process is required in a case where the forcible continuing of the presentation from the painting just before is programmed. When (2) and (3) are performed, the continuous playback without interrupting the audio data is impossible in the conventional DVD video, and this is not possible until the subject matter (F) is achieved. A data structure in which the subject matters (A), (C), (D), and (F) can be simultaneously achieved is defined in the specifications, accordingly the memory capacity of the memory 122 of the information reproduction device shown in FIG. 48 is set, the management method in a memory region is set, and it is possible to simultaneously achieve the subject matters (A), (C), (D), and (F). Moreover, a region in the memory 122 is reserved in which the corresponding cell number information, address information of the navigation pack recorded first in the corresponding cell, and information of the number of VTS are recorded, and the information is managed based on the RSM permission flag information of FIG. 24. A place where the data for the interleave unit ILVU corresponding to the imaginary video access unit IVAU can be recorded is reserved in the memory 122 in order to execute subject matter (C) in parallel. A storage area of (preload) audio data to be temporarily stored beforehand is allocated into the memory 122 in such a manner that subject matter (F) can be achieved, and the allocated region is managed based on audio information selection and audio information number shown in FIGS. 8 and 27. In the information reproduction device in the embodiment, the memory 122 is managed in this manner, and simultaneous achievement of the subject matters (A), (C), (D), and (F) is made possible.

Moreover, the subject matter (E) is used in the stage of the operation of the subject matters (2) and (3), 256 colors are represented, and the display contour of the highlight information is set to a unique shape (other than the rectangular shape), so that the user can easily see and select the selection menu (this has been impossible in the conventional DVD video specifications). By combining the subject matters (E) and (F), further comfort can be presented to the user.

Moreover, in the embodiment of the present invention, FP_PGC is prohibited from including the sub-picture stream, and instead FP_PGC is defined to include the graphic unit. The 256 color presentation in which the language selection menu screen to the user is defined by the graphic unit and the contour shape (not limited to the rectangular shape) of the screen region in which the highlight information is shown can be variously set. Therefore, the language selection menu screen to the user is further easily selected. For example, the user can select the language code by the shape or the color without reading characters by the following presentation.

(a) "Japanese" is described, a screen region is formed in "a shape of Japanese map", and the inside is marked in "red" often used in the terrestrial globe or the global map in a place where Japanese is selected.

(b) "English" is described, and the screen region is formed in "a star shape" while conscious of Stars and Stripes where English (American language) is selected.

(c) Furthermore, the inside of the star shape is marked in "blue" using the color of a part including the stars in Stars and Stripes.

Especially, as shown in FIG. 4, first play PGCI (FP_PGCI) exhibiting the subject matter (B); start address information (HDMENU_AOBS_SA) of HDMENU_AOBS and start address information (HDMENU_AOBSIT_SA) of HDMENU_AOBS information table exhibiting the subject matter (F); and HDVMGM graphic unit stream number information (HDVMGM_GUST_Ns) and HDVMGM graphic unit stream attribute (HDVMGM_GUST_ATR) exhibiting the subject matter (E) are recorded in the common HD video manager information management table (HDVMGI_MAT) 310 so that they are easily managed. The first play PGCI (FP_PGCI) records the management information with respect to the menu for the language selection to the user. As a result, in the information reproduction apparatus of the present embodiment, the process program in a case where the main subjects (A) to (G) are simultaneously or continuously represented to the user is simplified, reliability and stability of the information reproduction apparatus are enhanced, and further the reduction of the price of the information reproduction apparatus attributed to the simplification of the program can be achieved.

Similarly, as shown in FIGS. 33 and 34, RSM permission flag information exhibiting the subject matter (A), PGC graphic unit stream control table information (PGC_GUST_CTLT) exhibiting the subject matter (E), and the audio information selection flag and audio information number exhibiting the subject matter (F) are recorded in the common program chain general information (PGC_GI) 50 to facilitate the management. In the simultaneous or continuous presentation of the subject matters (A) to (G) to the user in the information reproduction device, the process program is simplified, the reliability and stability of the information reproduction device are enhanced, and the price reduction of the information reproduction device can be achieved by the simplification of the program.

Contents of information to be recorded in a disc-shaped information storage medium 1 will be described with reference to FIGS. 1A, 1B, 1C, 1D, 1E, and 1F. The information storage medium 1 includes a lead-in area 10, data area 12, and lead-out area 13 from an inner peripheral side.

In the information storage medium 1, a bridge structure of ISO9660 and UDF, and a part of the data area 12 has a volume/file structure information region 11 of ISO9660 and UDF. Mixed arrangement of a video data recording area 20 and general computer information recording area 22 is permitted in the data area 12. The video data recording area 20 records an HD video manager (HDVMG) 30 in which management information on the whole HD DVD video content recorded in the video data recording area 20 is recorded; and HD video title sets (HDVTS) 40 which are grouped for titles and in which the management information and video information (video object) are grouped/recorded for each title.

The HD video manager (HDVMG) 30 includes an HD video manager information (HDVMGI) 31 indicating the management information on the whole video data recording area 20; a back up of HD video manager information (HDVMGI_BUP) 34, in which the same information as that of the HD video manager information (HDVMGI) 31 is recorded; and a video object set for HD video manager menu (HDVMGM_VOBS) 32 in which a top menu screen indicating the whole video data recording area 20 is recorded. Furthermore, an audio object set for HD menu (HDMENU_AOBS) 33 in which the audio information to be output in parallel at the menu display time is recorded is newly recorded in the HD video manager 30. In the embodiment, a screen capable of setting the menu description language code is recorded in the region of the language selection menu VOBS for first play PGC (FP_PGCM_VOBS) 35.

The HD video title set (HDVTS) 40 in which the management information and video information (video object) for each title are grouped and recorded includes an HD video title set information (HDVTSI) 41 in which the management information on all the contents in the HD video title set (HDVTS) 40 is recorded; a back up of HD video title set (HDVTSI_BUP) 44 in which the same information as that of the HD video title set information (HDVTSI) 41 is recorded as the backup data; a video object set for HD video title set title (HDVTSM_VOBS) 42 in which the information of the menu screen is recorded by a video title set unit; and a video object set for HD video title set title (HDVTSTT_VOBS) 43 in which video object (video information of title) data in the video title set is recorded.

Each region constitutes a separate file in a file system including the bridge structure of ISO9660 and UDF. As shown in FIG. 2, the conventional SD DVD video contents are grouped and recorded under the directory named "VIDEO_TS". On the other hand, in the embodiment of the present invention, the directory is divided, and the HD DVD video contents are grouped and recorded under the directory named "VIDEO_HD".

That is, the recording place in the file structure of the audio object set for HD video manager menu 33 is a unique file which is an HD_MENU0.HDA file in the common directory (folder) of VIDEO_HD shown in FIG. 2. Screen data (video data) for setting the menu description language code is independent as a single file first in the region of the language selection menu VOBS for first play PGC (FP_PGCM_VOBS) 35, and the file name is HD_FP-PGC.HDV. The HD video manager information (HDVMGI) 31 is stored in an HD_VMG00.HDI file. The back up of HD video manager information (HDVMGI_BUP) 34 is stored in an HD_VMG00.BUP file. The video object set for HD video manager (HDVMGM_VOBS) 32 is stored in an HD_VMG01.HDV file. The HD video title set information (HDVTSI) 41 is stored in a VTS00100.IFO file. The back up of HD video title set information (HDVTSI_BUP) 44 is stored in a VTS00100.BUP file. The video object set for HD video title set menu (HDVTSM_VOBS) 42 is stored in a VTS00100.HDV file. The video object set for HD video title set title (HDVTSTT_VOBS) 43 is stored in a VTS00101.HDV file or VTS00102.HDV file. The information are stored in the individual files in this manner.

A detailed data structure in the HD video manager information (HDVMGI) 31 shown in FIG. 1E is shown in FIG. 3.

The management data with respect to the audio object set for HD video manager menu (HDMENU_AOBS) 33 is recorded in an HD menu audio object set information table (HDMENU_AOBSIT) 318 in the HD video manager information (HDVMGI) 31 as shown in FIG. 3. A data structure from the HD video manager information management table (HDVMGI_MAT) 310 to the HD video manager menu video object unit address map (HDVMGM_VOBU_ADMA) 317 matches the management information of the conventional SD DVD video specifications. In the embodiment of the present invention, the newly added HD menu audio object set information table (HDMENU_AOBSIT) 318 is recorded separately from and behind a part matching the management information of the conventional DVD video specifications. Accordingly, the conventional control program using the management information of the conventional SD DVD video can also be used, and the control program of the information reproduction device for the embodiment of the present invention can be simplified.

The HD video manager information (HDVMGI) 31 further includes HD video manager information management table (HDVMGI_MAT) 310 in which the management information common to the whole HD DVD video content recorded in the video data recording area 20 is grouped and recorded; title search pointer table (TT_SRPT) 311 in which information useful for searching for each title present in the HD DVD video content (presentation start position detection) is recorded; HD video manager menu PGCI unit table (HDVMGM_PGCI_UT) 312 in which the management information of the menu screen grouped and recorded for each menu description language code displaying the menu is recorded; parental management information table (PTL_MAIT) 313 in which information for managing video which can be shown or cannot be shown to children as parental information is recorded; HD video title set attribute table (HDVTS_ATRT) 314 in which attributes of the title set are grouped and recorded; text data manager (TXTDT_MG) 315 in which text information displayed to the user is grouped and recorded; HD video manager menu cell address table (HDVMGM_C_ADT) 316 in which information useful for searching for the start address of the cell constituting the menu screen is recorded; and HD video manager menu video object unit address map (HDVMGM_VOBU_ADMAP) 317 in which address information of VOBU indicating a minimum unit of the video object constituting the menu screen is recorded.

A detailed data structure in the HD video manager information management table (HDVMGI_MAT) 310 of FIG. 3 is shown in FIG. 4.

As shown in FIG. 4, the information of the first play PGCI (FP_PGCI) in which the management information on the menu for the language selection by the user, exhibiting the subject matter (B); the start address information (HDMENU_AOBS_SA) of HDMENU_AOBS and the start address information (HDMENU_AOBSIT_SA) of HDVMGM_AOBS information table, exhibiting the subject matter (F); and graphic unit stream number information (HDVMGM_GUST_Ns) of HDVMGM and graphic unit stream attribute (HDVMGM_GUST_ATR) of HDVMGM, exhibiting the subject matter (E) are recorded in the common HD video manager information management table (HDVMGI_MAT) 310.

Further, the HD video manager information management table (HDVMGI_MAT) 310 records various information such as an HD video manager identifier (HDVMG_ID); end address (HDVMG_EA) of HD video manager; end address (HDVMGI_EA) of HD video manager information; version number (VERN) of HD-DVD video specifications; HD video manager category (HDVMG_CAT); volume set identifier (VLMS_ID); adaptation identifier (ADP_ID); number of HD video title sets (HDVTS_Ns); identifier (PVR_ID) unique to provider; POS code (POS_CD); end address (HDVMGI_MAT_EA) of HD video manager information management table; start address (FP_PGCI_SA) of first play program chain information; start address (HDVMGM_VOBS_SA) of HDVMGM_VOBS; start address (TT_SRPT_SA) of TT_SRPT; start address (HDVMGM_PGCI_UT_SA) of HDVMGM_PGCI_UT; start address (PTL_MAIT_SA) of PTL_MAIT; start address (HDVTS_ATRT_SA) of HDVTS_ATRT; start address (TXTDT_MG_SA) of TXTDT_MG; start address (HDVMGM_C_ADT_SA) of HDVMGM_C_ADT; start address (HDVMGM_VOBU_ADMAP__SA) of HDVMGM_VOBU_ADMAP; video attribute of HDVMGM_(HDVMGM_V_ATR); number of HDVMGM audio streams (HDVMGM_AST_Ns); attribute of HDVMGM audio stream (HDVMGM_AST_ATR); number of HDVMGM sub-picture streams (HDVMGM_SPST_Ns); attribute of HDVMGM sub-picture stream (HDVMGM_SPST_ATR); number of HDVMGM graphic unit streams (HDVMGM_GUST_Ns); attribute of HDVMGM graphic unit stream (HDVMGM_GUST_ATR).

The graphic stream attribute (HDVMGM_GUST_ATRT) for VMGM_EVOBS shown in FIG. 4 is 16-bit information, b15 to b14 denote a graphic compression mode, b13 denotes a GR_EXST flag, and the others are reserved. When the graphic compression mode is non-compressed, '00b' is set, and the others are reserved. The GR_EXST flag indicates whether or not the graphic stream exists. When the graphic stream does not exist, '0b' is set. When the graphic stream exists, '1b' is set, and the others are reserved.

Figure 5:
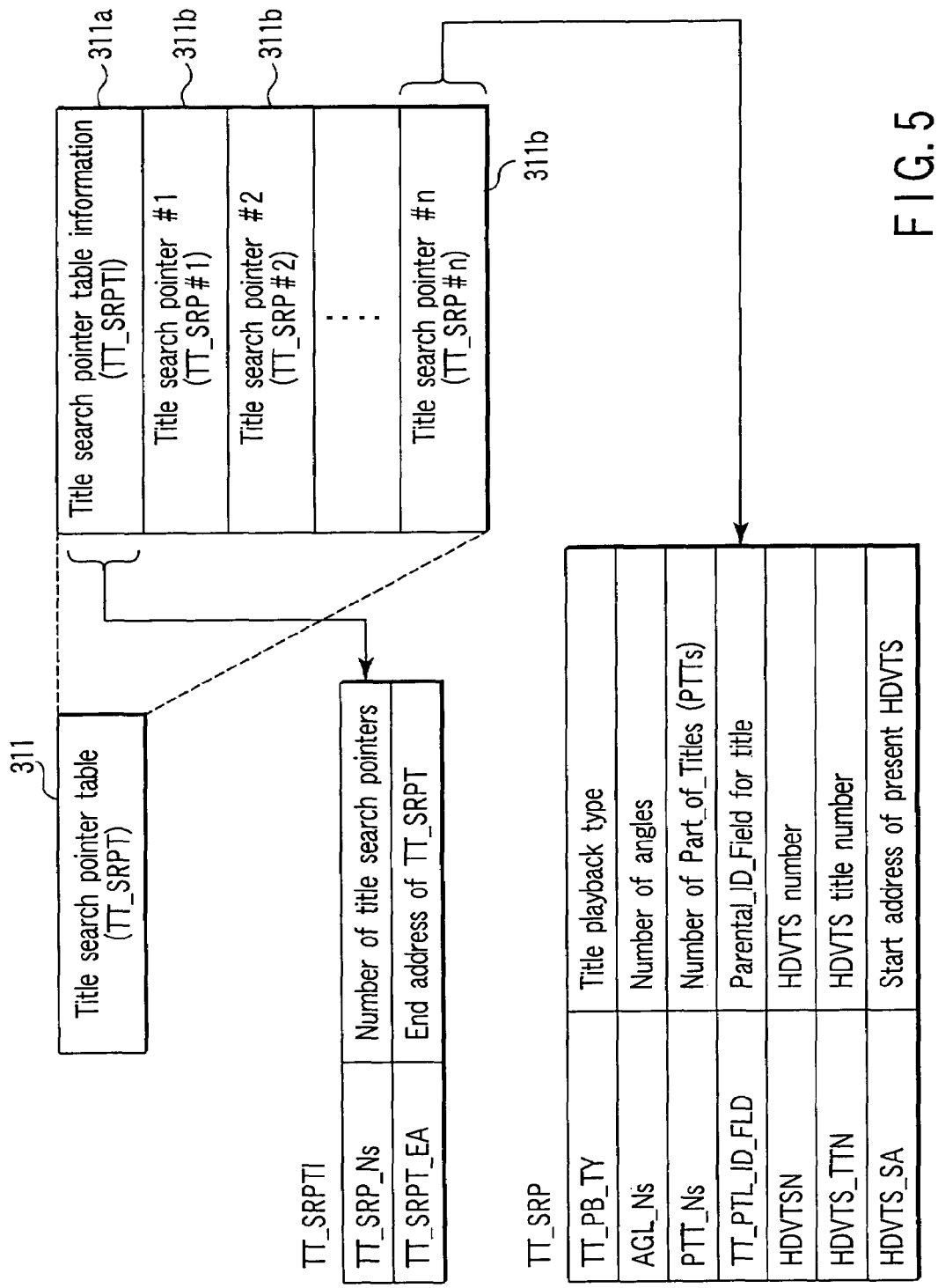
FIG. 5 is a diagram showing a data structure in a title search pointer table (TT_SRPT) 311 shown in FIG. 3.

A data structure in the title search pointer table (TT_SRPT) 311 shown in FIG. 3 is shown in FIG. 5. The title search pointer table (TT_SRPT) 311 includes title search pointer table information (TT_SRPTI) 311a and title search pointer (TT_SRP) 311b. An optional number of pieces of title search pointers (TT_SRPs) 311b in the title search pointer table (TT_SRPT) 311 can be set in accordance with the title number in the HD DVD video content. Common management information of the title search pointer table (TT_SRPT) 311 is recorded in the title search pointer table information (TT_SRPTI) 311a. The common management information includes the number of title search pointers (TT_SRP_Ns) included in the title search pointer table (TT_SRPT) 311 and end address (TT_SRPT_EA) of the title search pointer table (TT_SRPT) 311 in the file (HD_VMG00.HDI) of HD video manager information region (HDVMGMI).

Moreover, in one piece of title search pointer (TT_SRP) information 311b, various information are recorded such as title playback type (TT_PB_TY) concerning the title indicated by this search pointer; number (AGL_Ns) of angles; number (PTT_Ns) of Part_of_Title (PTT); parental_ID_Field (TT_PTL_ID_FLD) for title; HDVTS number (HDVTSN); HDVTS title number (HDVTS_TTN); and start address (HDVTS_SA) of present HDVTS.

Figure 6:
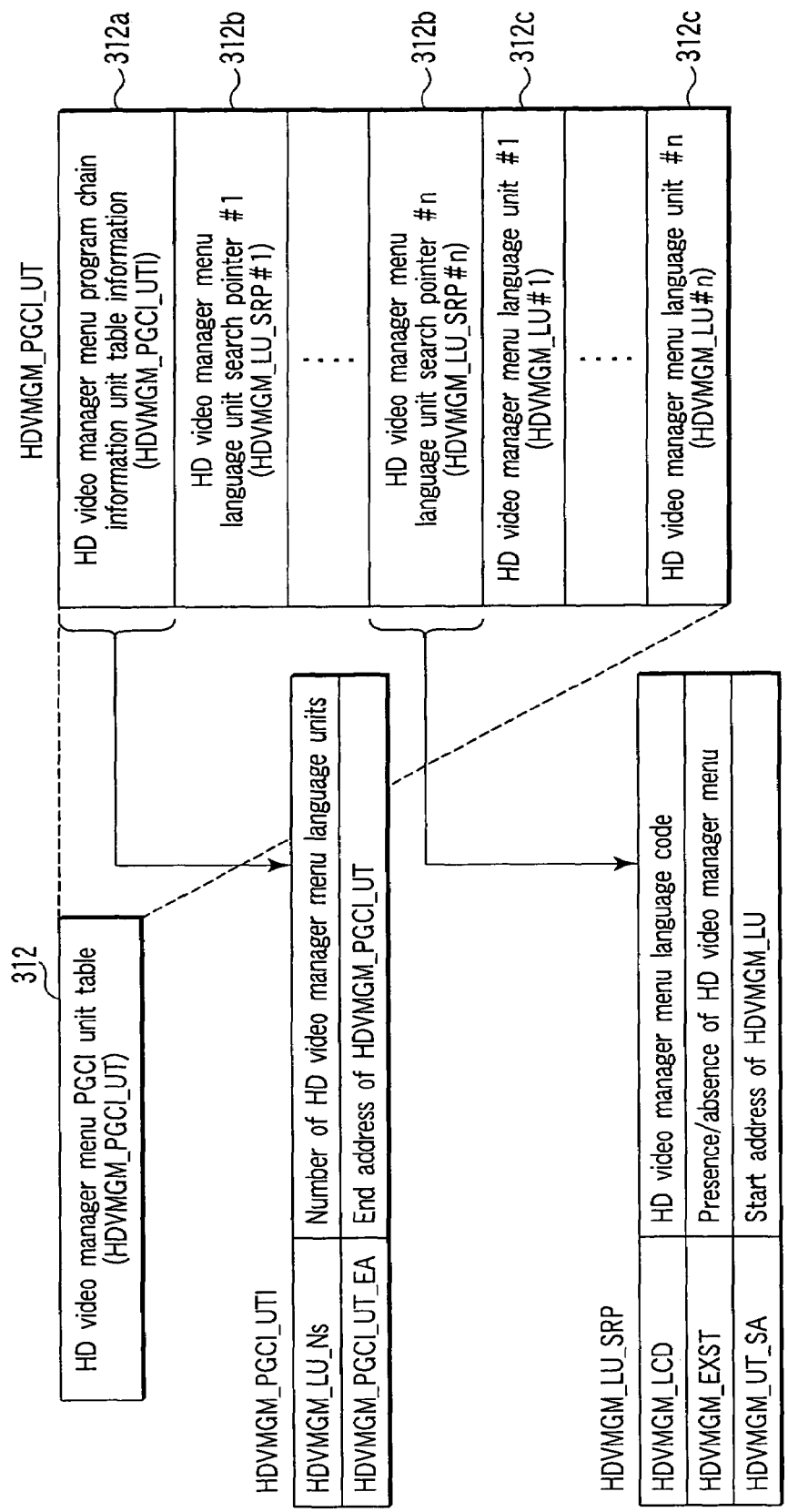
FIG. 6 is a diagram showing a data structure in an HD video manager menu PGCI unit table (HDVMGM_PGCI_UT) 312 shown in FIG. 3.

Next, a data structure in the HD video manager menu PGCI unit table (HDVMGM_PGCI_UT) 312 shown in FIG. 3 is shown in FIG. 6. The HD video manager menu PGCI unit table (HDVMGM_PGCI_UT) 312 includes an HD video manager menu program chain information unit table information (HDVMGM_PGCI_UTI) 312a in which common management information in the HD video manager menu PGCI unit table (HDVMGM_PGCI_UT) 312, and an HD video manager menu language units (HDVMGM_LUs) 312c which are grouped for each menu description language code to display the menu and in which the management information on the menu information is recorded. The HD video manager menu language units (HDVMGM_LUs) 312c are recorded by the number of menu description language codes supported by the HD DVD video content. In order to facilitate the access to the HD video manager menu language units (HDVMGM_LUs) 312c for each menu description language code, the HD video manager menu PGCI unit table (HDVMGM PGCI_UT) 312 includes the number of pieces of HD video manager menu language unit search pointers (HDVMGM_LU_SRPs) 312b including a start address of each HD video manager menu language unit (HDVMGM_LU) 312c. The number of pieces of the HD video manager menu language unit search pointers (HDVMGM_LU_SRPs) 312b is equal to that of HD video manager menu language units (HDVMGM_LU) 312c.

The HD video manager menu PGCI unit table (HDVMGM_PGCI_UT) 312 includes information on the number (HDVMGM_LU_Ns) of HD video manager menu language units, and end address (HDVMGM_PGCI_UT_EA) of the HD video manager menu PGCI unit table (HDVMGM_PGCI_UT) 312 in the file (HD_VMG00.HDI in FIG. 2) of HD video manager information (HDVMGI).

Moreover, the HD video manager menu language unit search pointer (HDVMGM_LU_SRP) 312b includes not only difference address information (HDVMGM_UT_SA) of the start position of the HD video manager menu PGCI unit table (HDVMGM_PGCI_UT) 312 to the start position of the corresponding HD video manager menu language unit (HDVMGM_LU) 312c in the file (HD_VMG00.HDI of FIG. 2) of the HD video manager information (HDVMGI) described above; but also an HD video manager menu language code (HDVMGM_LCD) indicating the menu description language code of the corresponding HD video manager menu language unit (HDVMGM_LU) 312c; and HD video manager presence/absence (HDVMGM_EXST) information indicating whether or not the corresponding HD video manager menu language unit (HDVMGM_LU) 312c includes the menu screen displayed to the user as VOB.

A detailed data structure in the HD video manager menu language unit #n (HDVMGM_LU #n) 312c (FIG. 6) recorded in the HD video manager menu PGCI (HDVMGM_PGCI_UT) 312 shown in FIG. 3 is shown in FIG. 7.

The HD video manager menu language unit (HDVMGM_LU) 312c includes various information such as HD video manager menu language unit information (HDVMGM_LUI) 312c 1 in which common management information on the menu in the HD video manager menu language unit (HDVMGM_LU) 312c is recorded; HD video manager menu program chain information (HDVMGM_PGCI) 312c 3 including the structure shown in FIG. 7; and HDVMGM_PGCI search pointer (HDVMGM_PGCI_SRP #1) information 312c 2 indicating the difference address of the start position of the HD video manager menu language unit (HDVMGM_LU) 312c to the start position of each HD video manager menu program chain information (HDVMGM_PGCI) 312c 3 in the file (HD_VMG00.HDI of FIG. 2) of the HD video manager information (HDVMGI).

The HD video manager menu language unit information (HDVMGM_LUI) 312c 1 recorded in the first portion in the HD video manager menu language unit #n (HDVMGM_LU #n) 312c stores the number (HDVMGM_PGCI_SRP_Ns) of HDVMGM_PGCI_SRPs, and end address (HDVMGM_LU_EA) of HDVMGM_LU. The HDVMGM_PGCI search pointer (HDVMGM_PGCI_SRP #1) 312c 2 stores a start address (HDVMGM_PGCI_SA) of HDVMGM_PGCI, and HDVMGM_PGC category (HDVMGM_PGC_CAT).

In the HDVMGM_PGC category (HDVMGM_PGC_CAT) in the HDVMGM_PGCI search pointer #n (HDVMGM_PGCI_SRP #n) 312c 2, selection information of audio information produced simultaneously with the screen display of the menu of HD content, and an audio information selection flag (audio information selection) indicating the start/end trigger of audio information playback are recorded. Either of the following can be selected as the audio data played back simultaneously with the screen display of the menu of the HD content:

(1) audio data recorded in the video object set for HD menu (HDVMGM_VOBS) 32 shown in FIG. 1E (scattered/recorded in the audio pack although not shown); and (2) audio data which exists in the audio object set for HD menu (HDMENU_AOBS) 33 shown in FIG. 1E and in which one or more HD menu AOBs (HDMENU_AOBs) are recorded in order as shown in FIG. 19.

Here, when "00b" of the audio information selection flag is selected, the audio data of (1) is played back, and sound playback is interrupted at the switching time of the menu. When "10b" of "11b" of the audio information selection flag is selected, the audio data of the HD menu AOB (HDMENU_AOB) present in the audio object set for HD menu (HDMENU_AOBS) 33 shown in (2) is played back. To reproduce the audio data shown in (2), when "11b" is designated, the playback of the audio data is started from the beginning every change of the menu screen. When "10b" is designated, the playback of the audio data is continued regardless of the switching of the menu screen. As shown in FIG. 19, a plurality of types of HD menu AOBs (HDMENU_AOBs) are stored beforehand in the audio object set for HD menu (HDMENU_AOBS) 33. The audio information number shown in FIG. 8 shows the selection information of the HD menu AOB (HDMENU_AOB) played back simultaneously with the display of the corresponding PGC for menu display. The AOB is selected from the HD menu AOBs as shown in FIG. 19 by number information indicating "the number of AOBs to be selected from above" which is the selection information of the HD menu AOB.

As shown in FIG. 8, in the HDVMGM_PGC category (HDVMGM_PGC_CAT), entry type for determining whether or not the PGC is an entry PGC, menu ID indicating identification of the menu (e.g., the menu of the title or the like), block mode, block type, and PTL_ID_FLD are recorded.

Figure 9:
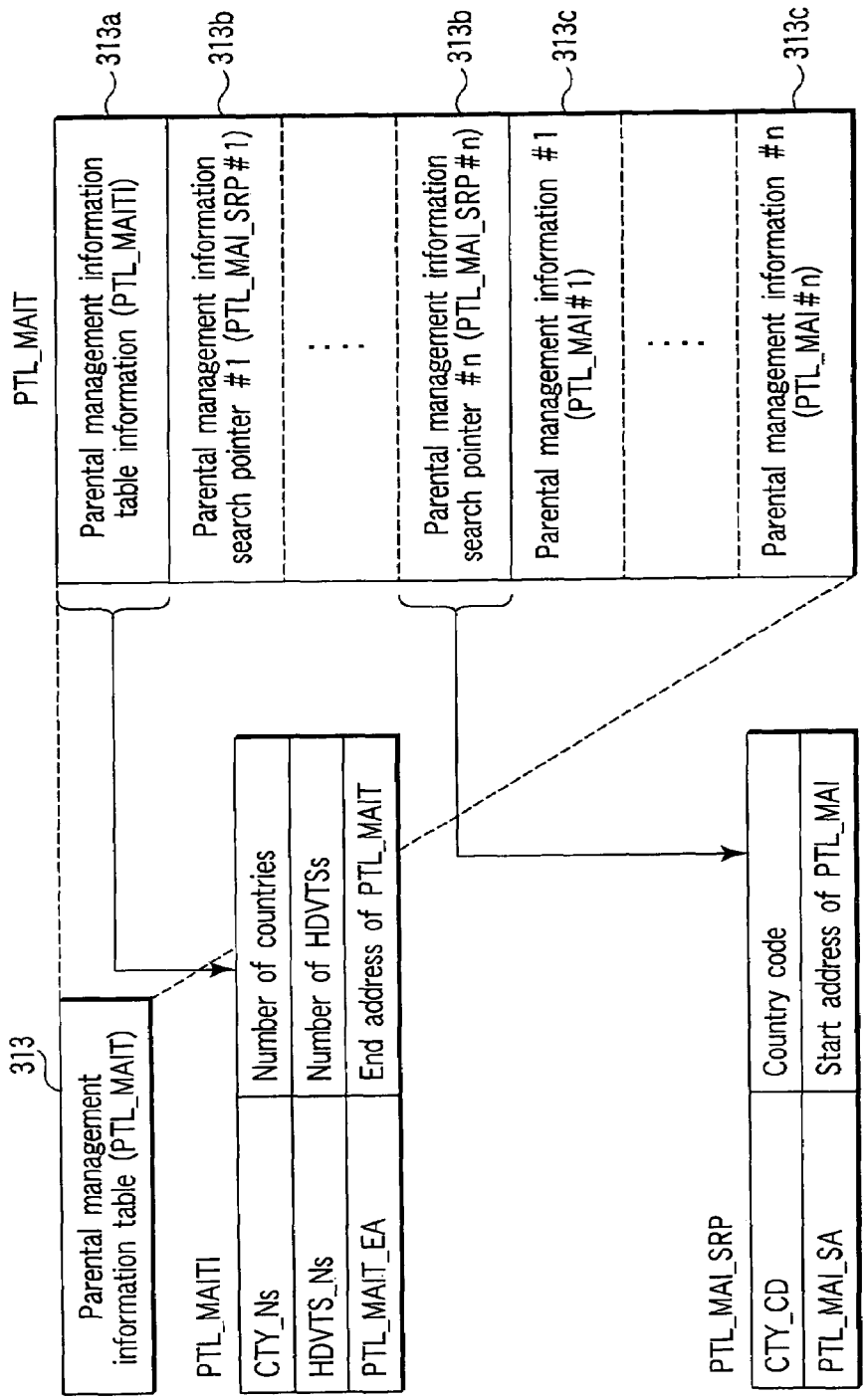
FIG. 9 is a diagram showing a data structure in a parental management information table (PTL_MAIT) 313 shown in FIG. 3.

A data structure in the parental management information table (PTL_MAIT) 313 shown in FIG. 3 is shown in FIG. 9. In parental management information table information (PTL_MAITI) 313a, various information are recorded such as the number of countries (CTY_Ns), the number of HDVTS (HDVTS_Ns), and an end address (PTL_MAIT_EA) of PTL_MAIT. A parental management information search pointer (PTL_MAI_SRP) 313b records a country code (CTY_CD) and start address (PTL_MAI_SA) of PTL_MAI.

Moreover, the data structure in the parental management information (PTL_MAI) 313c shown in FIG. 9 includes parental level information (PTL_LVLI) 313c1 as shown in FIG. 10. The parental level information (PTL_LVLI) 313c1 records Parental_ID_Field (PTL_ID_FLD_HDVMG) 313c11 for HDVMG and Parental_ID_Field (PTL_ID_FLD_HDVTS) 313c12 for HDVTS. Furthermore, Parental_ID_Field (PTL_ID_FLD) exists in the Parental_ID_Field (PTL_ID_FLD_HDVTS) 313c12 for HDVTS.

Figure 11:
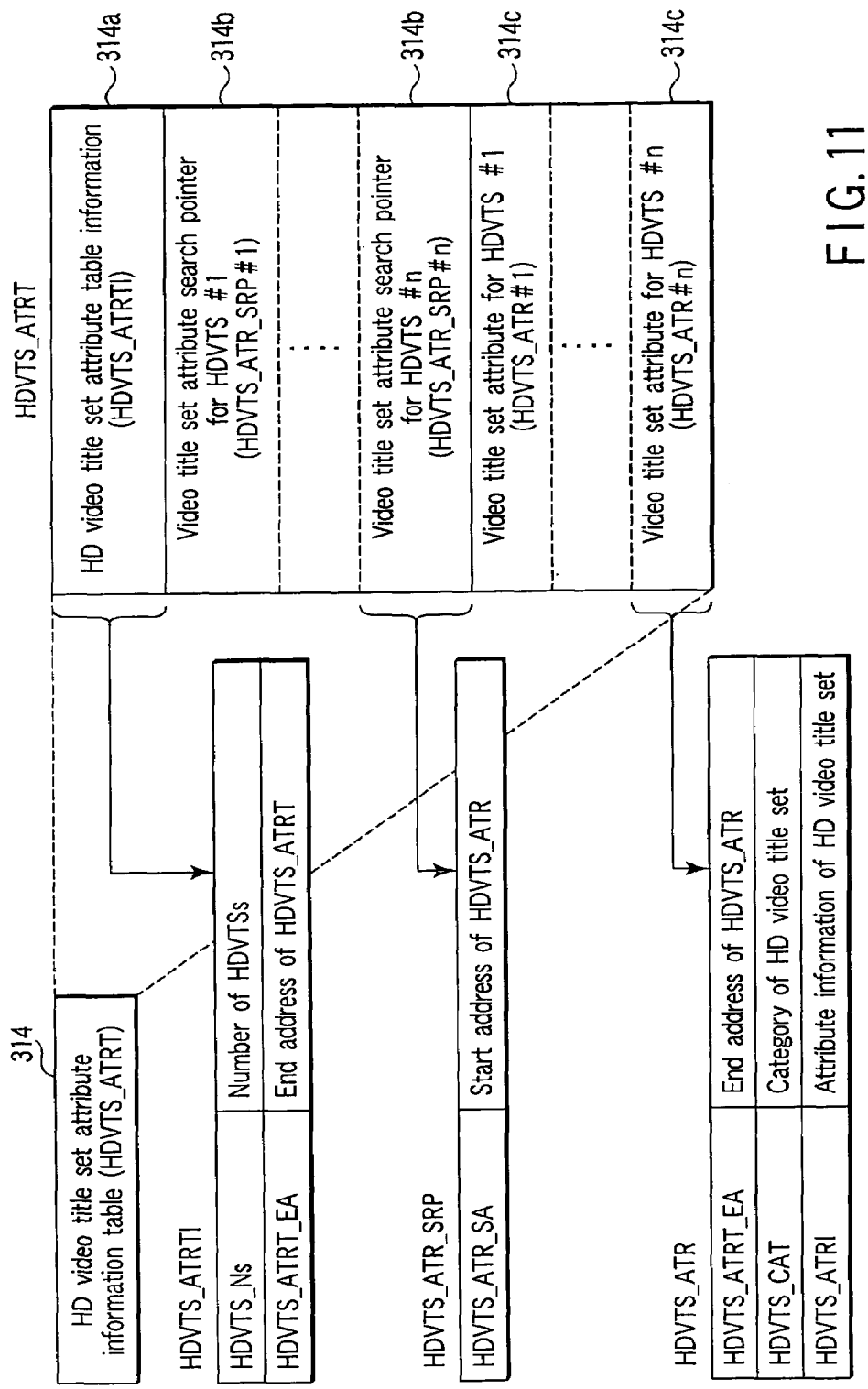
FIG. 11 is a diagram showing a data structure in an HD video title set attribute table (HDVTS_ATRT) 314 shown in FIG. 3.

As shown in FIG. 11, the HD video title set attribute table (HDVTS_ATRT) 314 shown in FIG. 3 records:

(a) HD video title set attribute table information (HDVTS_ATRTI) 314a recording the number of HDVTS (HDVTS_Ns) and an end address (HDVTS ATRT_EA) of HDVTS_ATRT;

(b) HD video title set attribute search pointers (HDVTS_A-TR_SRPs) 314*b* in which a start address (HDVTS_ATR_SA) of HDVTS_ATR is recorded; and (c) HD video title set attributes (HDVTS_ATRs) 314*c* recording an end address (HDVTS ATRT_EA) of HDVTS_ATR, category of the HD video title set (HD-VTS_CAT), and attribute of the HD video title set (HDVTS_ATRI).

Figure 12:
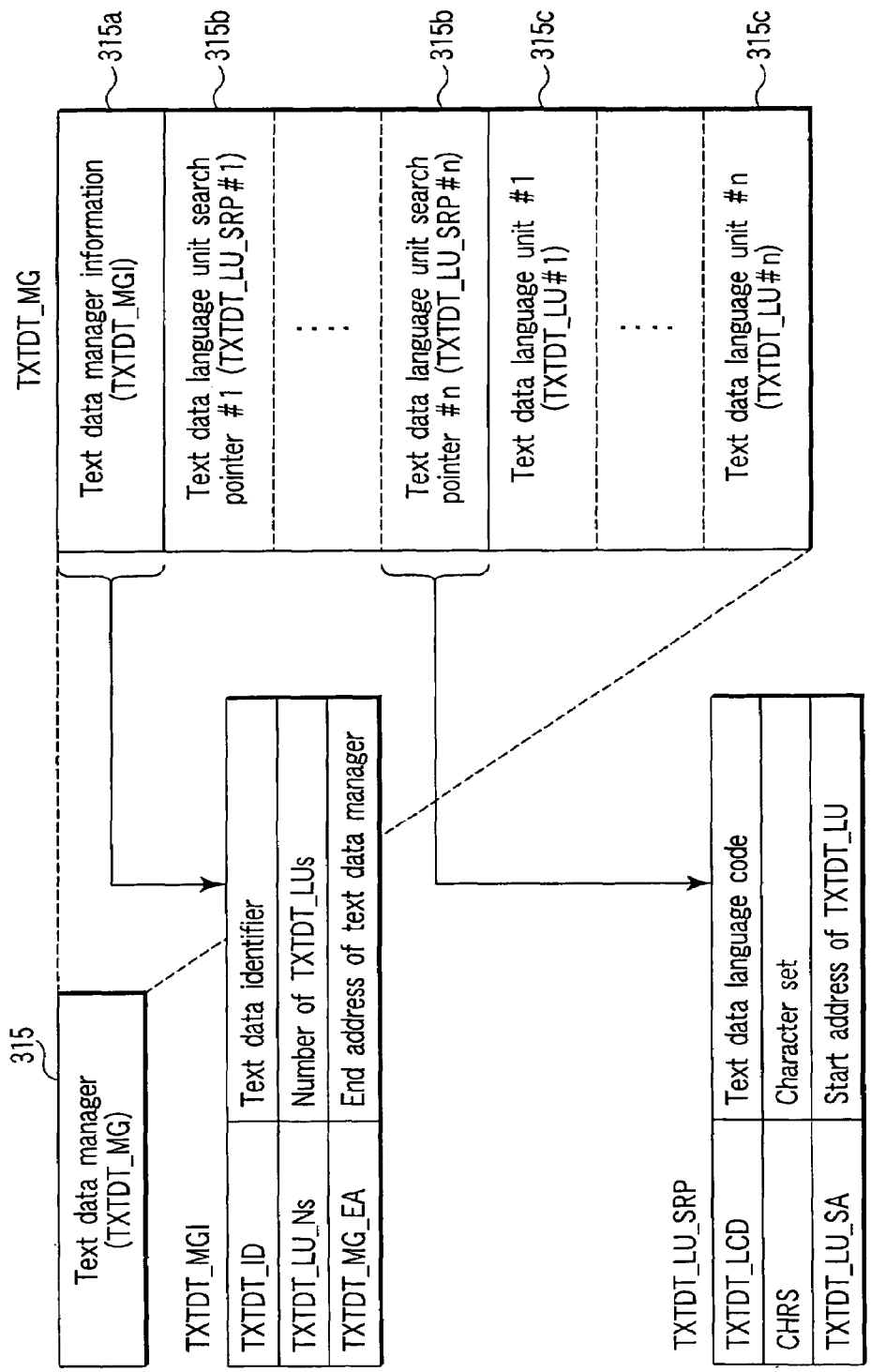
FIG. 12 is a diagram showing a data structure in a text data manager (TXTDT_MG) 315 shown in FIG. 3.

As shown in FIG. 12, the text data manager (TXTDT_MG) 315 shown in FIG. 3 records:

(a) text data manager information (TXTDT_MGI) 315*a* recording a text data identifier (TXTDT_ID), the number (TXTDT_LU_Ns) of TXTDT_LUs, and an end address (TXTDT_MG_EA) of the text data manager;

(b) text data language unit search pointers (TXT-DT_LU_SRPs) 315*b* in which a text data language code (TXTDT_LCD), character set (CHRS) and start address (TXTDT_LU_SA) of TXTDT_LU are recorded; and (c) text data language units (TXTDT_LUs) 315*c*.

Figure 13:
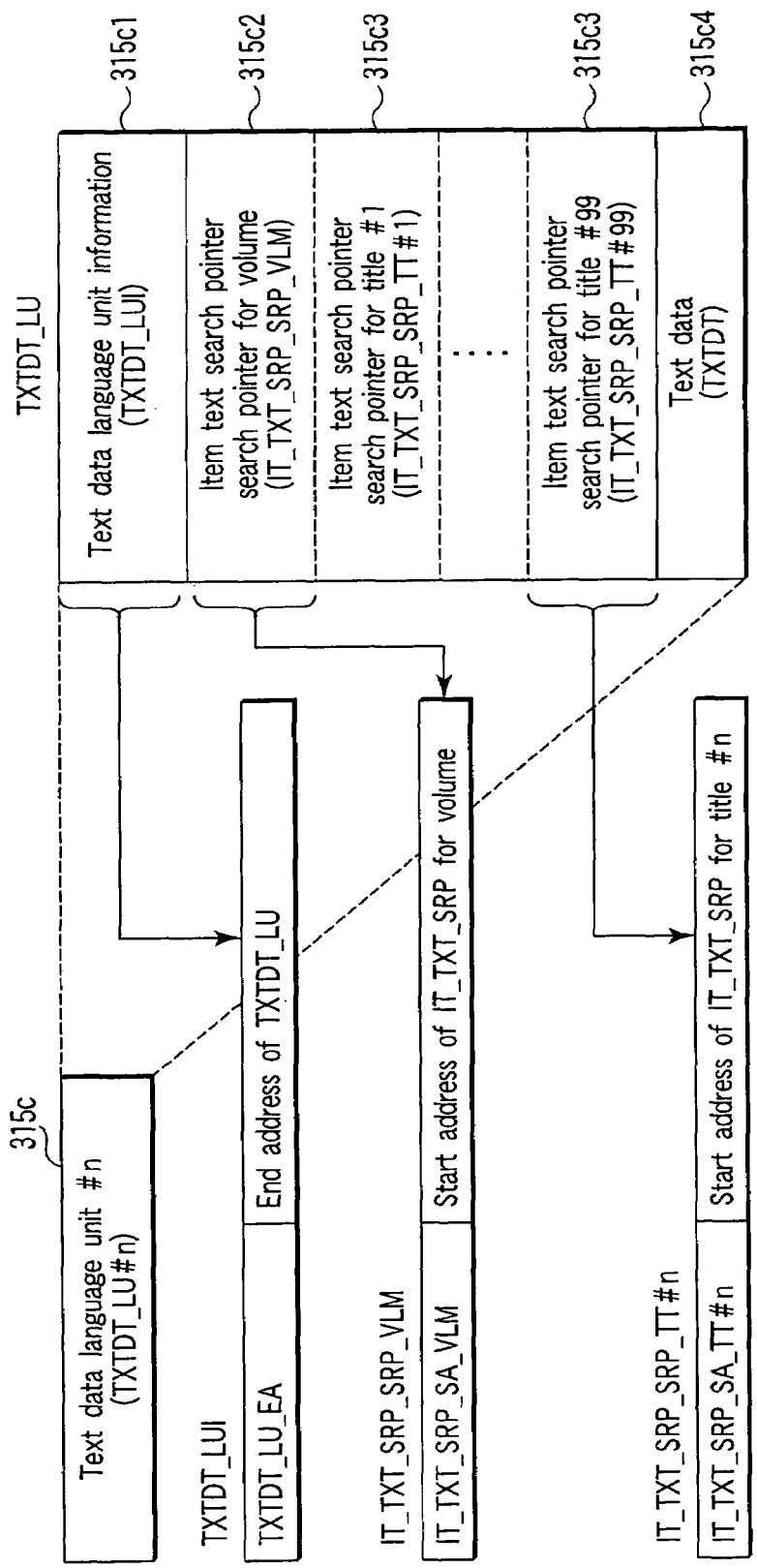
FIG. 13 is a diagram showing a data structure in a text data language unit (TXTDT_LU) 315c in the text data manager (TXTDT_MG) 315 shown in FIG. 12.

Furthermore, as shown in FIG. 13, the text data language unit (TXTDT_LU) 315*c* records:

(a) text data language units (TXTDT_LUIs) 315*c*1 in which end address information (TXTDT_LU_EA) of TXT-DT_LU is recorded;

(b) an item text search pointer search pointer for volume (IT_TXT_SRP_SRP_VLM) 315*c*2 in which a start address (IT_TXT_SRP_SA_VLM) of IT_TXT_SRP for volume is recorded;

(c) item text search pointer search pointers for title (IT_TXT_SRP_SRP_TTs) 315*c*3 in which a start address (IT_TXT_SRP_SA_TT) of IT_TXT_SRP for title is recorded; and (d) text data (TXTDT) 315*c*4.

Figure 14:
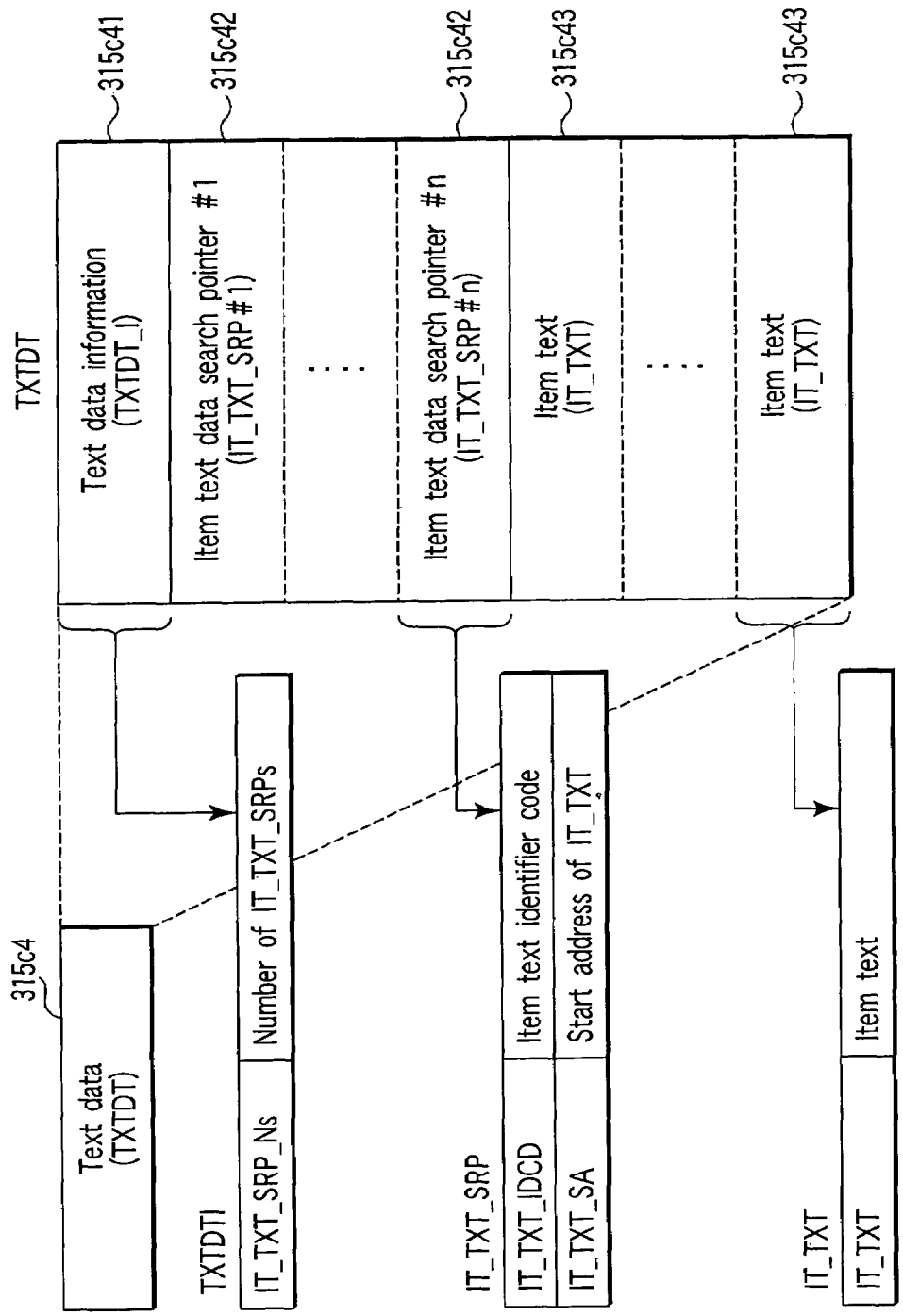
FIG. 14 is a diagram showing a data structure in text data (TXTDT) 315c4 in the text data language unit (TXTDT_LU) 315c shown in FIG. 13.

As shown in FIG. 14, in the text data (TXTDT) 315*c*4, various information is recorded:

(a) text data information (TXTDTI) 315*c*41 recording the number (IT_TXT_SRP_Ns) of IT_TXT_SRP;

(b) item text data search pointers (IT_TXT_SRPs) 315*c*42 in which an item text identifier code (IT_TXT_IDCD) and a start address (IT_TXT_SA) of IT_TXT are recorded; and (c) item texts (IT_TXTs) 315*c*43.

As shown in FIG. 15, in the HD video manager menu cell address table (HDVMGM_C_ADT) 316 shown in FIG. 3, various information is recorded such as:

(a) HD video manager menu cell address table information (HDVMGM_C_ADTI) 316*a* recording various information such as the number (HDVMGM_VOB_Ns) of VOBs in HDVMGM_VOBS and an end address (HDVMGM_C_ADT_EA) of HDVMGM_C_ADT; and (b) HD video manager menu cell piece information (HD-VMGM_CPI) 316*b* in which various information is recorded such as VOB_ID number (HDVMGM_VOB_IDN) of HDVMGM_CP, Cell_ID number (HDVMGM_C_IDN) of HDVMGM_CP, a start address (HDVMGM_CP_SA) of HDVMGM_CP, and an end address (HDVMGM_CP_EA) of HDVMGM_CP.

Figure 16:
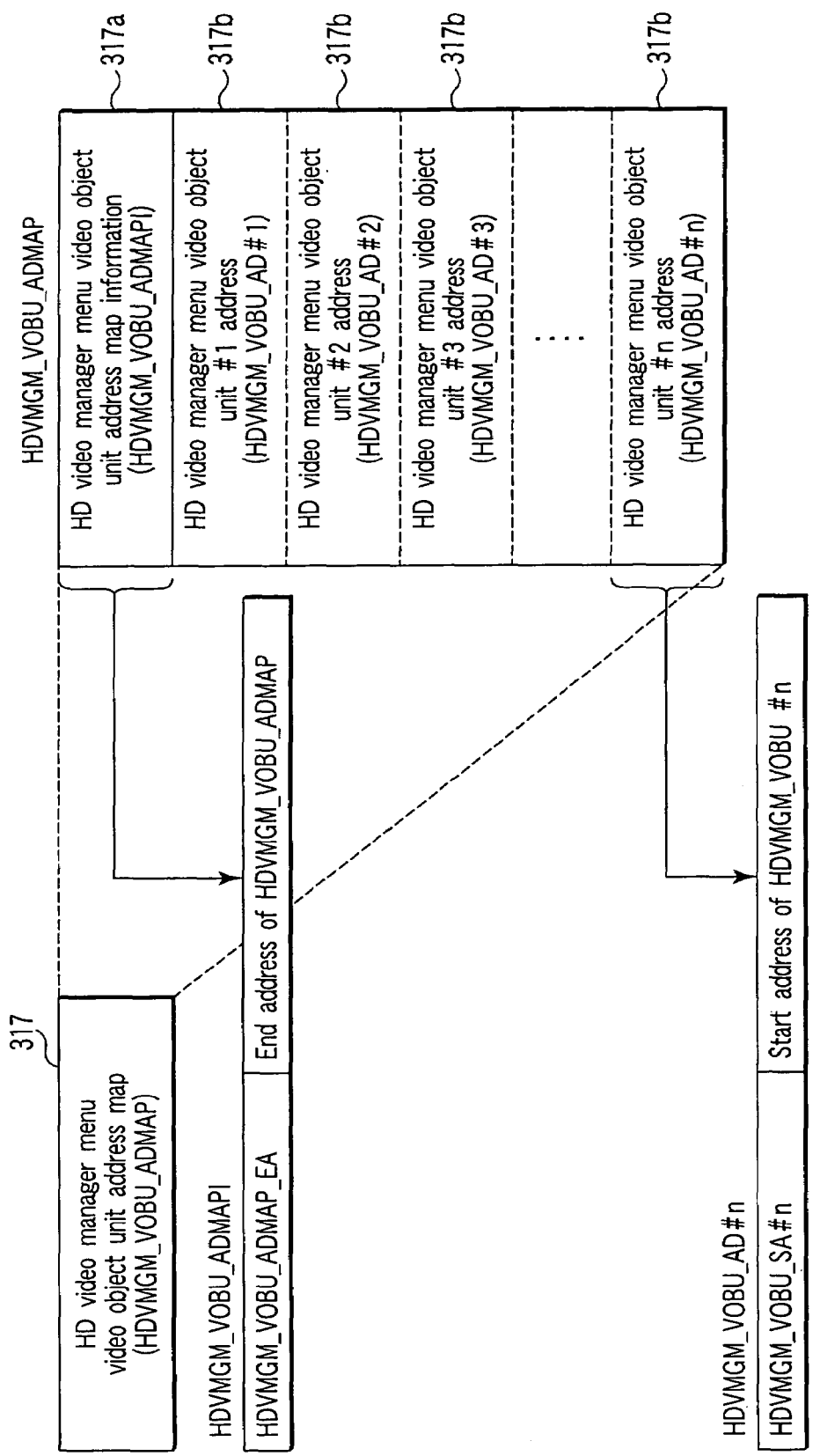
FIG. 16 is a diagram showing a data structure in an HD video manager menu video object unit address map (HDVMGM_VOBU_ADMAP) 317 shown in FIG. 3.

As shown in FIG. 16, in the HD video manager menu video object unit address map (HDVMGM_VOBU_ADMAP) 317 shown in FIG. 3, various information is recorded such as:

(a) HD video manager menu video object unit address map information (HDVMGM_VOBU_ADMAPI) 317*a* recording an end address (HDVMGM_VOBU_ADMAP_EA) of HDVMGM_VOBU_ADMAP; and (b) HD video manager menu video object unit address (HDVMGM_VOBU_AD #n) 317*b* recording a start address (HDVMGM_VOBU_SA #n) of HDVMGM_VOBU #n.

FIG. 17 shows a management information content with respect to the HD menu AOB (HDMENU_AOB), and shows the inner data structure of the HD menu audio object set information table (HDMENU_AOBSIT) 318 shown in FIG. 3, which exists in the HD video manager information (HD-VMGI) 31 shown in FIG. 1E. In the HD menu audio object set information table information (HDMENU_AOBSITI) 318*a* recorded in the first portion of the HD menu audio object set information table (HDMENU_AOBSIT) 318, the number (HDMENU_AOB_Ns) of VOBs in HDMENU_AOBS, and an end address (HDMENU_AOBSIT_EA) of HDMENU_AOBSIT are recorded. A plurality of types of audio objects (audio data) for the menu can be recorded in the information storage medium.

In FIG. 17, HD menu audio object information (HD-MENU_AOBI) 318*b* indicates the management information on the audio object (audio data) for each menu, and records playback information (HDMENU_AOB_PBI) of HDMENU_AOB; attribute (HDMENU_AOB_ATR) of HDMENU_AOB; a start address (HDMENU_AOB_SA) of HDMENU_AOB #n (corresponding HDMENU_AOB); and an end address information (HDMENU_AOB_EA) of HDMENU_AOB #n (corresponding HDMENU_AOB).

Figure 18:
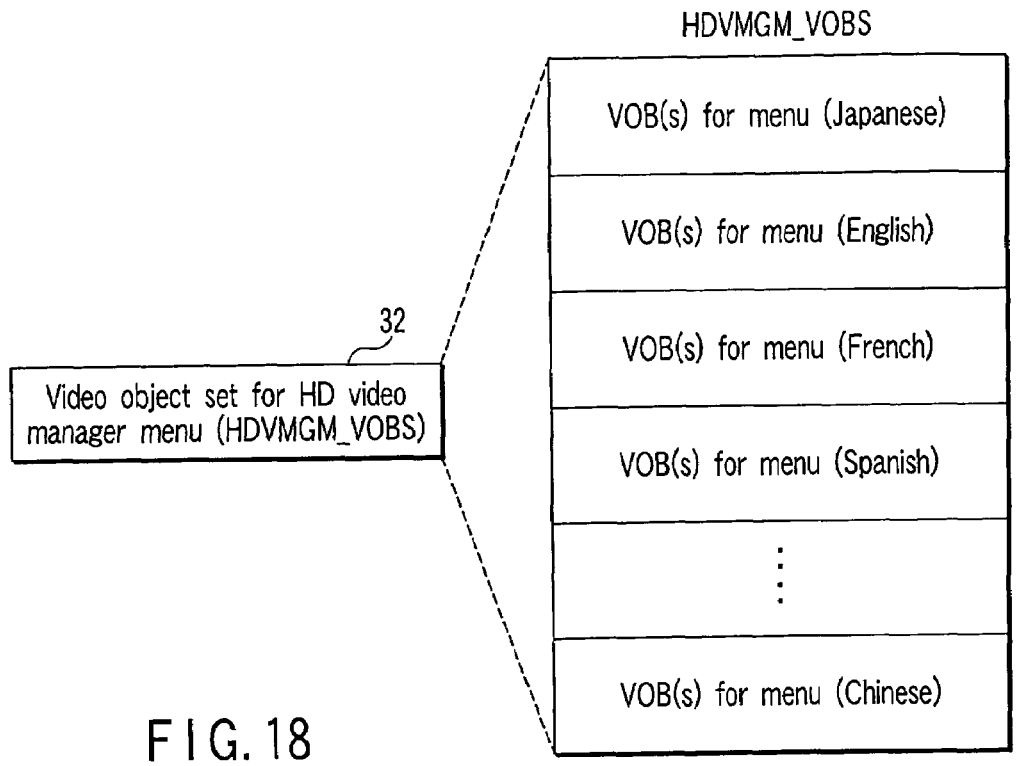
FIG. 18 is a diagram showing a data structure in a video object set for HD video manager menu (HDVMGM_VOBS) 32 shown in FIG. 1E grouped and stored in an HD_VMG01.HDV file of FIG. 2.

In a data structure in the video object set for HD menu (HDVMGM_VOBS) 32 shown in FIG. 1E, grouped and stored in the HD_VMG01.HDV file of FIG. 2, as shown in FIG. 18, menu screens (video objects) in which the same menu screen is recorded in different menu description language codes are recorded.

In the embodiment of the present invention, a plurality of types of audio objects (audio data) for the menu can be recorded in the information storage medium. As described above, the recording place of the audio object (AOB) for the menu is the audio object set for HD menu (HDMENU_AOBS) 33 in the HD video manager (HD-VMGI) 30 as shown in FIG. 1D. This audio object set for HD menu (HDMENU_AOBS) 33 includes one file named HD_MENU0.HDA as shown in FIG. 2. The respective audio objects (AOB) for the menu are recorded/recorded in order in the audio object set for HD menu (HDMENU_AOBS) 33 forming one file named HD_MENU0.HDA as shown in FIG. 19.

Figure 20:
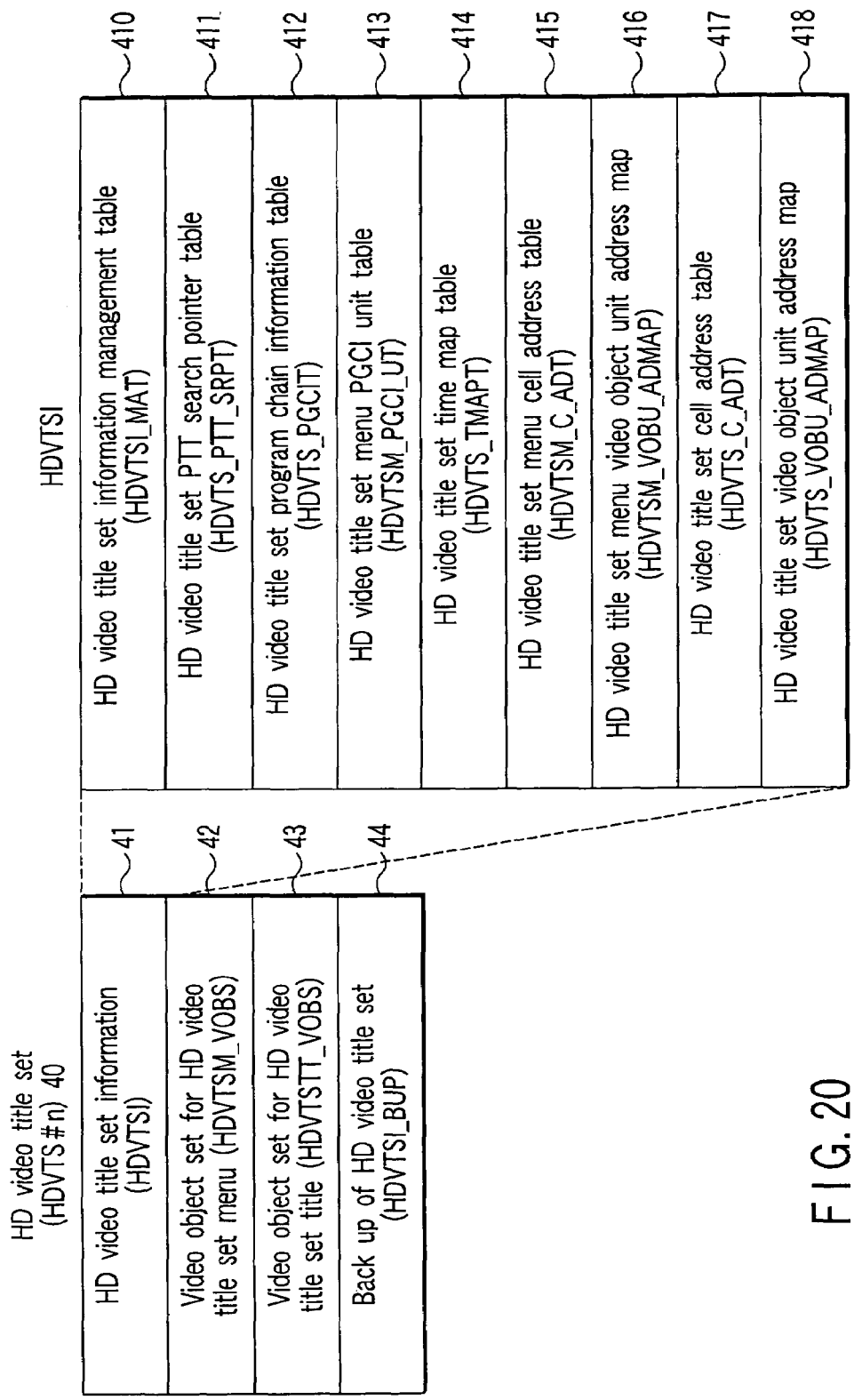
FIG. 20 is a diagram showing a data structure in an HD video title set (HDVTSI) 41 shown in FIGS. 1F.

The HD video title set information region (HDVTSI) 41 shown in FIG. 1F is grouped and recorded in the VTS00100.IFO file shown in FIG. 2, and is, as shown in FIG. 20, divided into regions (management information groups) such as an HD video title set information management table (HDVTSI_MAT) 410; HD video title set PTT search pointer table (HDVTS_PPT_SRPT) 411; HD video title set program chain information table (HDVTS_PGCIT) 412; HD video title set menu PGCI unit table (HDVTSM_PGCI_UT) 413; HD video title set time map table (HDVTS_TMAPT) 414; HD video title set menu cell address table (HDVTSM_C_ADT) 415; HD video title set menu video object unit address map (HDVTSM_VOBU_ADMAP) 416; HD video title set cell address table (HDVTS_C_ADT) 417; and HD video title set video object unit address map (HD-VTS_VOBU_ADMAP) 418.

The management information common to the corresponding video title set is recorded in the HD video title set information management table (HDVTSI_MAT) 410. The common management information is recorded in the first region (management information group) of the HD video title set information region (HDVTSI) 41, therefore, the common management information in the video title set is immediately read. A presentation control process of the information reproduction device is simplified, and a control process time is shortened.

The management information on the graphic unit included in HDVTS (HD video title set of the present invention) is recorded in the HD video title set information management table (HDVTSI_MAT) 410 (see FIG. 20) recorded in the first region (group) in the HD video title set information region (HDVTSI) 41 shown in FIG. 1E. As shown in FIG. 21, in a concrete management information content of the HD video title set information management table (HDVTSI_MAT) 410, graphic unit stream number information and attribute are divided into a menu screen and title (display video) in HDVTS. The information is recorded as the number of HDVTSM graphic unit streams (HDVTSM_GUST_Ns), HDVTSM graphic unit stream attribute (HDVTSM_GUST_ATR), the number of HDVTS graphic unit streams (HDVTS_GUST_Ns), and HDVTS graphic unit stream attribute table information (HDVTS_GUST_ATRT).

Moreover, in addition to the common management information in the video title set, as shown in FIG. 21, various information are recorded in the HD video title set information management table (HDVTSI_MAT) 410 such as an HD video title set identifier (HDVTS_ID); end address (HDVTS_EA) of HDVTS;

end address (HDVTSI_EA) of HDVTSI; version number (VERN) of HD-DVD video specifications; HDVTS category (HDVTS_CAT); end address (HDVTSI_MAT_EA) of HDVTSI_MAT; start address (HDVTSM_VOBS_SA) of HDVTSM_VOBS; start address (HDVTSTT_VOBS_SA) of HDVTSTT_VOBS; start address (HDVTS_PTT_SRPT_SA) of HDVTS_PTT_SRPT; start address (HDVTS_PGCIT_SA) of HDVTS_PGCIT; start address (HDVTSM_PGCI_UT_SA) of HDVTSM_PGCI_UT; start address (HDVTS_TMAP_SA) of HDVTS_TMAP; start address (HDVTSM_C_ADT_SA) of HDVTSM_C_ADT; start address (HDVTSM_VOBU_ADMAP_SA) of HDVTSM_VOBU_ADMAP; start address (HDVTS_C_ADT_SA) of HDVTS_C_ADT; start address (HDVTS_VOBU_ADMAP_SA) of HDVTS_VOBU_ADMAP; video attribute (HDVTSM_V_ATR) of HDVTSM; number of HDVTSM audio streams (HDVTSM_AST_Ns); audio stream attribute (HDVTSM_AST_ATR) of HDVTSM; number (HDVTSM_SPST_Ns) of HDVTSM sub-picture streams; HDVTSM sub-picture stream attribute (HDVTSM_SPST_ATR); video attribute (HDVTS_V_ATR) of HDVTS; number (HDVTS_AST_Ns) of HDVTS audio streams; HDVTS audio stream attribute table (HDVTS_AST_ATRT); number (HDVTS_SPST_Ns) of HDVTS sub-picture streams; HDVTS sub-picture stream attribute table (HDVTS_SPST_ATRT); HDVTS multi-channel audio stream attribute table (HDVTS_MU_AST_ATRT); number (HDVTSM_GUST_Ns) of HDVTSM graphic unit streams; HDVTSM graphic unit stream attribute (HDVTSM_GUST_ATR); number (HDVTS_GUST_Ns) of HDVTS graphic unit streams; and HDVTS graphic unit stream attribute (HDVTS_GUST_ATRT).

The graphic stream attribute (HDVTSM_GUST_ATRT) for VTSM_EVOBS shown in FIG. 21 includes a plurality of graphic stream attribute (HDVTSM_GUST_ATR). The graphic stream attribute (HDVTSM_GUST_ATR) is 16-bit information, b15 to b14 denote graphic compression modes, b13 denotes a GR_EXST flag, and the others are reserved. When the graphic compression mode is non-compressed, '00b' is set, and the others are reserved. The GR_EXST flag indicates whether or not the graphic stream exists. When the graphic stream does not exist in VTSM_EVOBS, '0b' is set. When the graphic stream exists in VTSM_EVOB, '1b' is set, and the others are reserved.

The graphic stream attribute (HDVTS_GUST_ATRT) for VTSTT_EVOBS shown in FIG. 21 includes a plurality of graphic stream attribute (HDVTS_GUST_ATR). Each graphic stream attribute (HDVTS_GUST_ATRT) for VTSTT_EVOBS is 16-bit information, b15 to b14 denote graphic compression modes, b13 denotes a GR_EXST flag, and the others are reserved. When the graphic compression mode is non-compressed, '00b' is set, and the others are reserved. The GR_EXST flag indicates whether or not the graphic stream exists. When the graphic stream does not exist in VTSTT_EVOBS, '0b' is set. When the graphic stream exists in VTSTT_EVOBS, '1b' is set, and the others are reserved.

Figure 22:
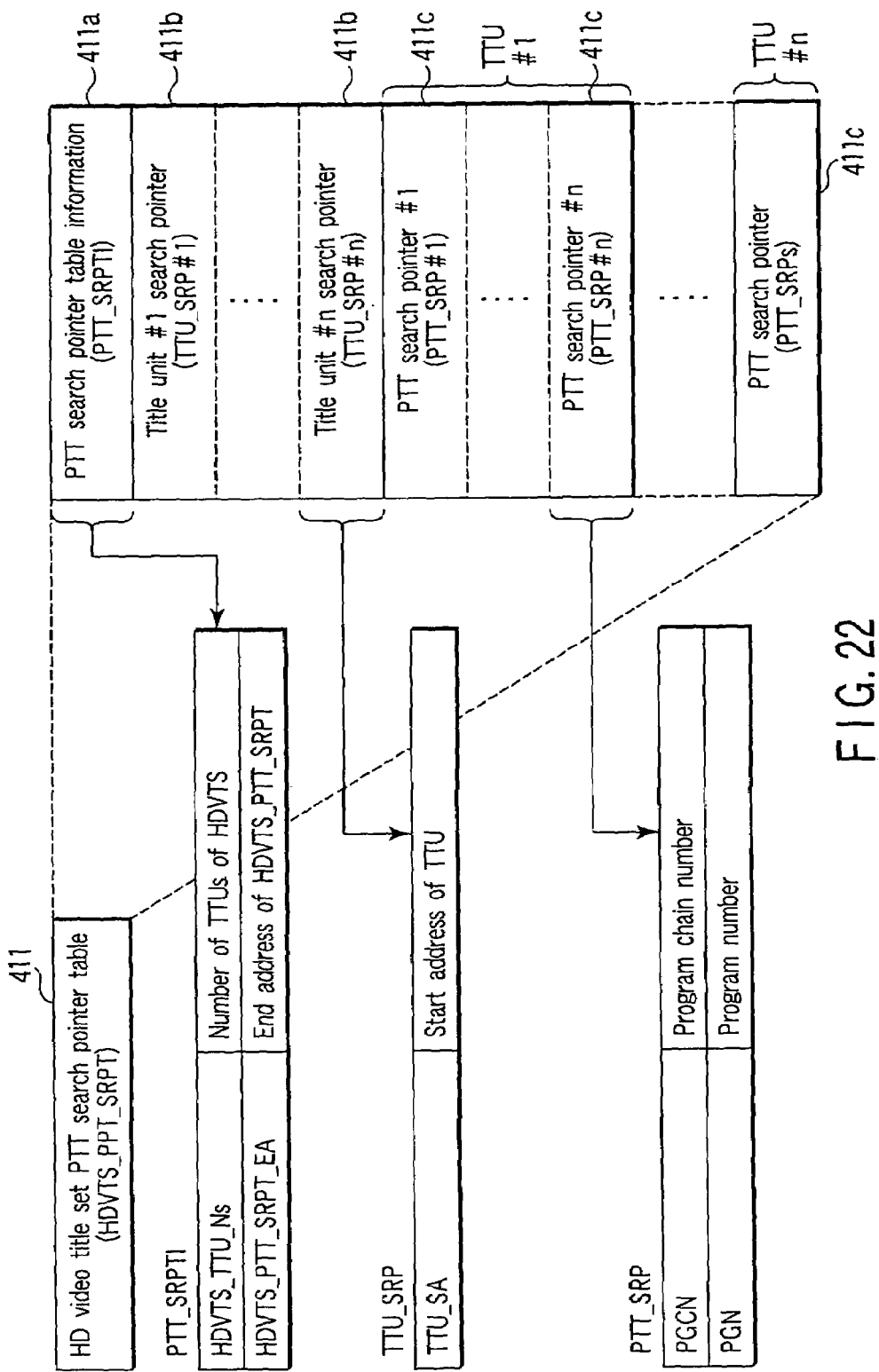
FIG. 22 is a diagram showing a data structure in an HD video title set PTT search pointer table (HDVTS_PPT_SRPT) 411 shown in FIG. 20.

The data structure in the HD video title set PTT search pointer table (HDVTS_PPT_SRPT) 411 shown in FIG. 20 is shown in FIG. 22. The HD video title set PTT search pointer table (HDVTS_PPT_SRPT) 411 includes various information such as:

(a) PTT search pointer table information (PTT_SPRTI) 411a including the number (HDVTS_TTU_Ns) of HDVTS_TTUs of HDVTS and an end address (HDVTS_PTT_SRPT_EA) of HDVTS_PTT_SRPT;

(b) title unit search pointers (TTU_SRPs) 411b in which a start address (TTU_SA) of TTU is recorded; and (c) PTT search pointers (PTT_SRPs) 411c including a program chain number (PGCN) and program number (PGN).

According to the first embodiment of the present invention, the RSM permission flag (update permission flag of resume information) is recorded in the HDVTS_PGC category in the HDVTS_PGCI search pointer 412b, as shown in FIGS. 23 and 24. The HDVTS_PGCI search pointer 412b is recorded in the HD video title set program chain information table (HDVTS_PGCIT) 412 shown in FIG. 20, included in the HD video title set information (HDVTSI) 41 shown in FIG. 1F. Further, the HD video title set program chain information table (HDVTS_PGCIT) 412, as shown in FIG. 23, records an HD video title set PGCI information table (HDVTS_PGCITI) 412a including the number (HDVTS_PGCI_SRP_Ns) of HDVTS_PGCI_SRPs and an end address (HDVTS_PGCIT_EA) of HDVTS_PGCIT. Moreover, a start address (HDVTS_PGCI_SA) of HDVTS_PGCI is also recorded in the HDVTS_PGCI search pointer (HDVTS_PGCI_SRP) 412b together with the above-described HDVTS_PGC category (HDVTS_PGC_CAT).

The RSM permission flag shown in FIG. 24 (update permission flag of the resume information) designates whether or not the contents of the resume information are updated (resume information is successively updated in accordance with a presentation situation of the corresponding PGC) in a stage in which the presentation of the corresponding HDVTS_PGC is started. That is, when the flag is "0b", the resume information is updated. When the flag is "1b", the resume information is not updated, and the presentation interrupted information of HDVTS_PGC played back before (the corresponding program chain in the HD video title set of the present invention) is stored. Further, the HDVTS_PGC category (HDVTS_PGC_CAT) includes entry type information for determining whether or not the PGC is an entry PGC, title number information (VTS_TTN) in the video title set (VTS) indicated by the corresponding PGC, block mode information, block type information, and PTL_ID_FLD information.

Figure 25:
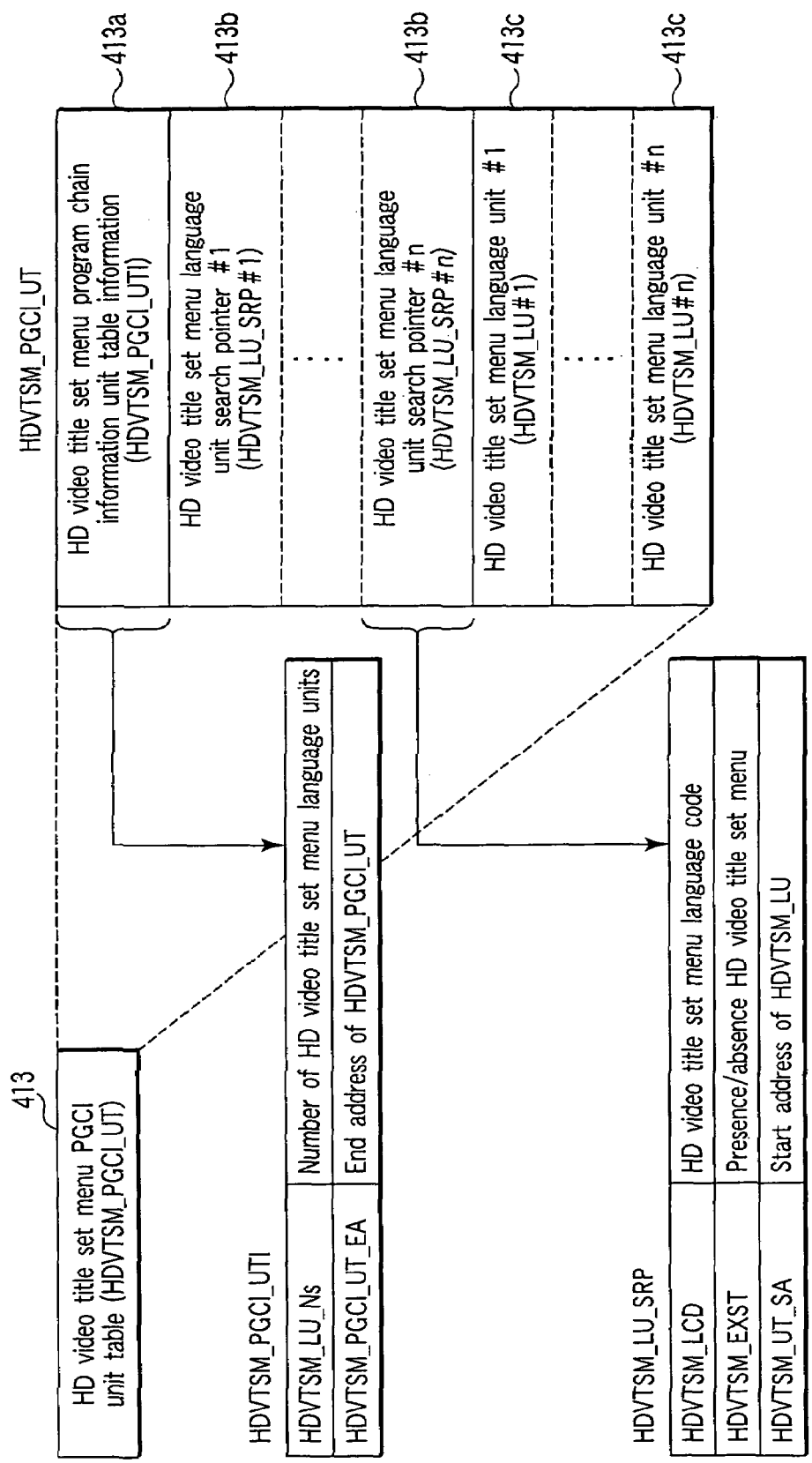
FIG. 25 is a diagram showing a data structure in an HD video title set menu/PGCI/unit table (HDVTSM_PGCI_UT) 413 shown in FIG. 20.

The data structure in the HD video title set menu PGCI unit table (HDVTSM_PGCI_UT) 413 shown in FIG. 20 is shown in FIG. 25. The HD video title set menu PGCI unit table (HDVTSM_PGCI_UT) 413 includes various information such as:

(a) HD video title set menu program chain information unit table information (HDVTSM_PGCI_UTI) 413a including information such as the number (HDVTSM_LU_Ns) of HD video title set menu language units and an end address (HDVTSM_PGCI_UT_EA) of HDVTSM_PGCI_UT;

(b) HD video title set menu language unit search pointers (HDVTSM_LU_SRPs) 413b in which an HD video title set menu language code (HDVTSM_LCD), presence/absence of HD video title set menu (HDVTSM_EXST), and a start address (HDVTSM_UT_SA) of HDVTSM_LU are recorded; and (c) HD video title set menu language units (HDVTSM_LUs) 413c.

Moreover, as shown in FIG. 26, the data structure in the HD video title set menu language unit (HDVTSM_LU) 413c includes:

(a) HD video title set menu language unit information (HDVTSM_LUI) 413c1 including the number (HDVTSM_PGCI SRP_Ns) of HDVTSM_PGCI_SRPs and an end address (HDVTSM_LU_EA) of HDVTSM_LU;

(b) HD video title set menu program chain information (HDVTSM_PGCIs) 413c3 including the same data structure as that of FIGS. 33 and 34; and (c) HDVTSM_PGCI search pointers (HDVTSM_PGCI_SRPs) 413c2 in which an HDVTSM_PGC category (HDVTSM_PGC_CAT) and a start address (HDVTSM_PGCI_SA) of HDVTSM_PGCI are recorded.

According to the first embodiment of the invention, information for referring to (or designating) the HD menu AOB (HDMENU_AOB) with respect to the menu by an HDVTS unit is recorded in the HDVTSM_PGC category information (HDVTSM_PGC_CAT) in the HDVTS_PGCI search pointer #n (HDVTSM_PGCI_SRP #n) 413c2 as shown in FIG. 26.

The audio information number in the HDVTSM_PGC category information (HDVTSM_PGC_CAT) shown in FIG. 27 means an audio information number (AOB number) which designates AOB number #n to be played back in HDMENU_AOBS (the corresponding AOB number in AOBs (HDMENU_AOB) for the menu recorded in FIG. 19). The audio information selection means the selection information of the audio information to be played back simultaneously with the screen display of the menu of the HD content in the present embodiment, and the audio information selection flag (audio information selection) indicating the start/end trigger information of the audio information playback.

Here, when the audio information selection flag (audio information selection) "00b" is selected, the audio data recorded in each video object for the menu is played back, and the sound playback is interrupted at the switching time of the menu. When the audio information selection flag (audio information selection) "10b" or "11b" is selected, the audio data of the HD menu AOB (HDMENU_AOB) existing in the audio object set for HD menu (HDMENU_AOBS) 33 is played back. To reproduce the audio data (AOB) for the menu, when "11b" is designated, the playback of the audio data is started from the beginning every change of the menu screen. When "10b" is designated, the playback of the audio data is continued regardless of the switching of the menu screen. In the embodiment of the present invention, as shown in FIG. 19, a plurality of types of AOBs (HDMENU_AOB) for the menu are recorded beforehand in the audio object set for HD menu (HDMENU_AOBS) 33. The audio information number shown in FIG. 27 indicates the selection information of the HD menu AOB (HDMENU_AOB) to be played back simultaneously with the display of the corresponding PGC for the menu display. The AOB is selected from the AOBs for the menu shown in FIG. 19 by number information indicating "the number of AOBs to be selected from above" which is selection information of the HD menu AOB. Further, the HDVTSM_PGC category (HDVTSM_PGC_CAT) records the entry type information for determining whether or not the PGC is an entry PGC, menu ID information indicating the identification of the menu (e.g., the menu of the title or the like), block mode information, block type information, and PTL_ID_FLD information.

Figure 28:
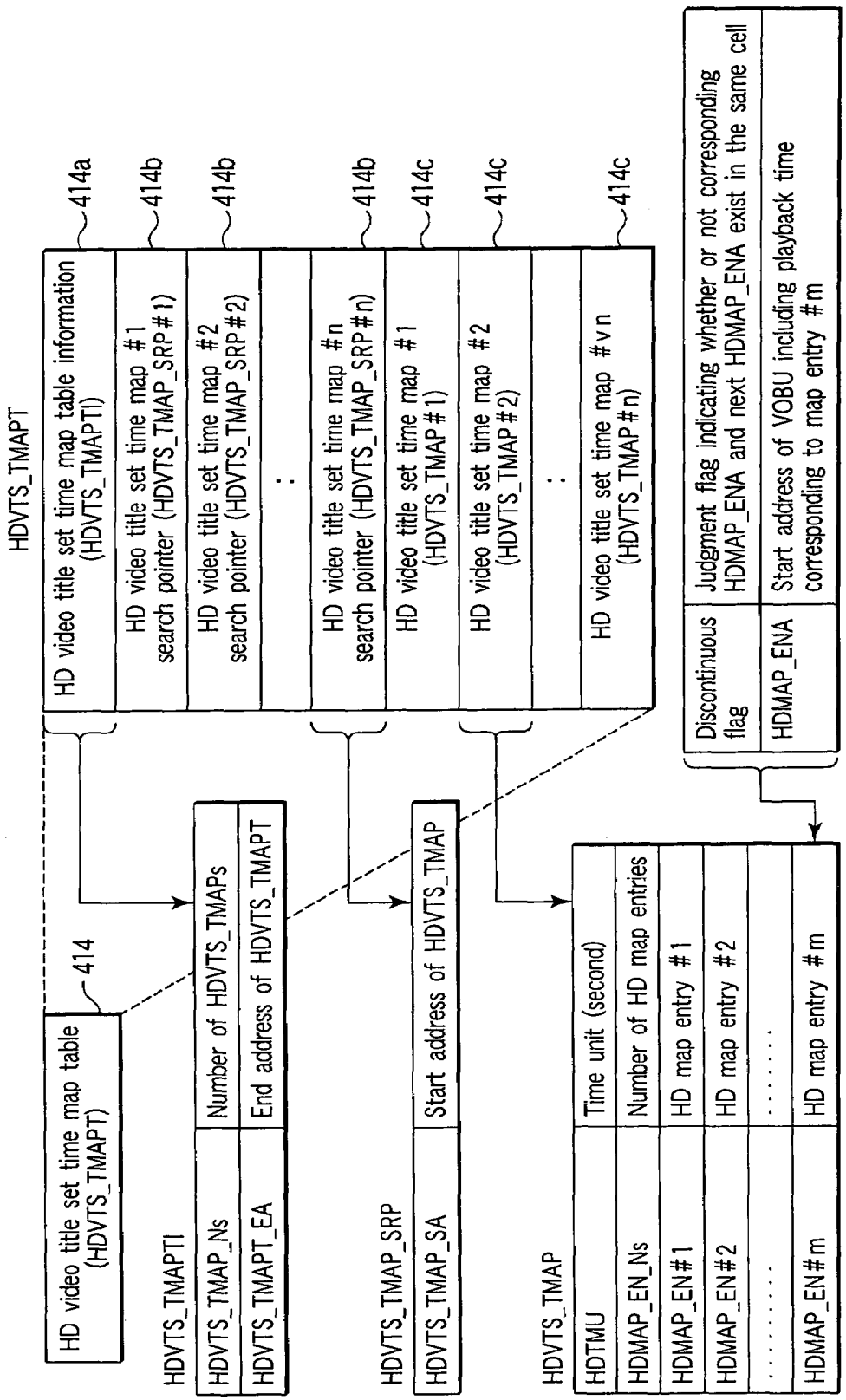
FIG. 28 is a diagram showing a data structure in an HD video title set time map table (HDVTS_TMAPT) 414 shown in FIG. 20.

The data structure in the HD video title set time map table (HDVTS_TMAPT) 414 shown in FIG. 20 is shown in FIG. 28. The HD video title set time map table (HDVTS_TMAPT) 414 includes:

(a) HD video title set time map table information (HDVTS_TMAPTI) 414a in which the number (HDVTS_TMAP_Ns) of HDVTS_TMAPs and an end address (HDVTS_TMAPT_EA) of HDVTS_TMAPT are recorded;

(b) HD video title set time map search pointers (HDVTS_TMAP_SRPs) 414b including a start address (HDVTS_TMAP_SA) of HDVTS_TMAP; and (c) HD video title set time maps (HDVTS_TMAPs) 414c in which a length (HDTMU) of a time unit (second) constituting a reference in map entry, the number (MAP_EN_Ns) of HD map entries, and map entries (MAP_ENs).

The HD map entry (HDMAP_EN) includes a "discontinuous flag" indicating a flag for determining whether or not the corresponding HDMAP_ENA and the next HDMAP_ENA exist in the same cell; and a start address (HDMAP_ENA) of VOBU including a presentation time corresponding to the corresponding HD map entry (HDMAP_EN).

Figure 29:
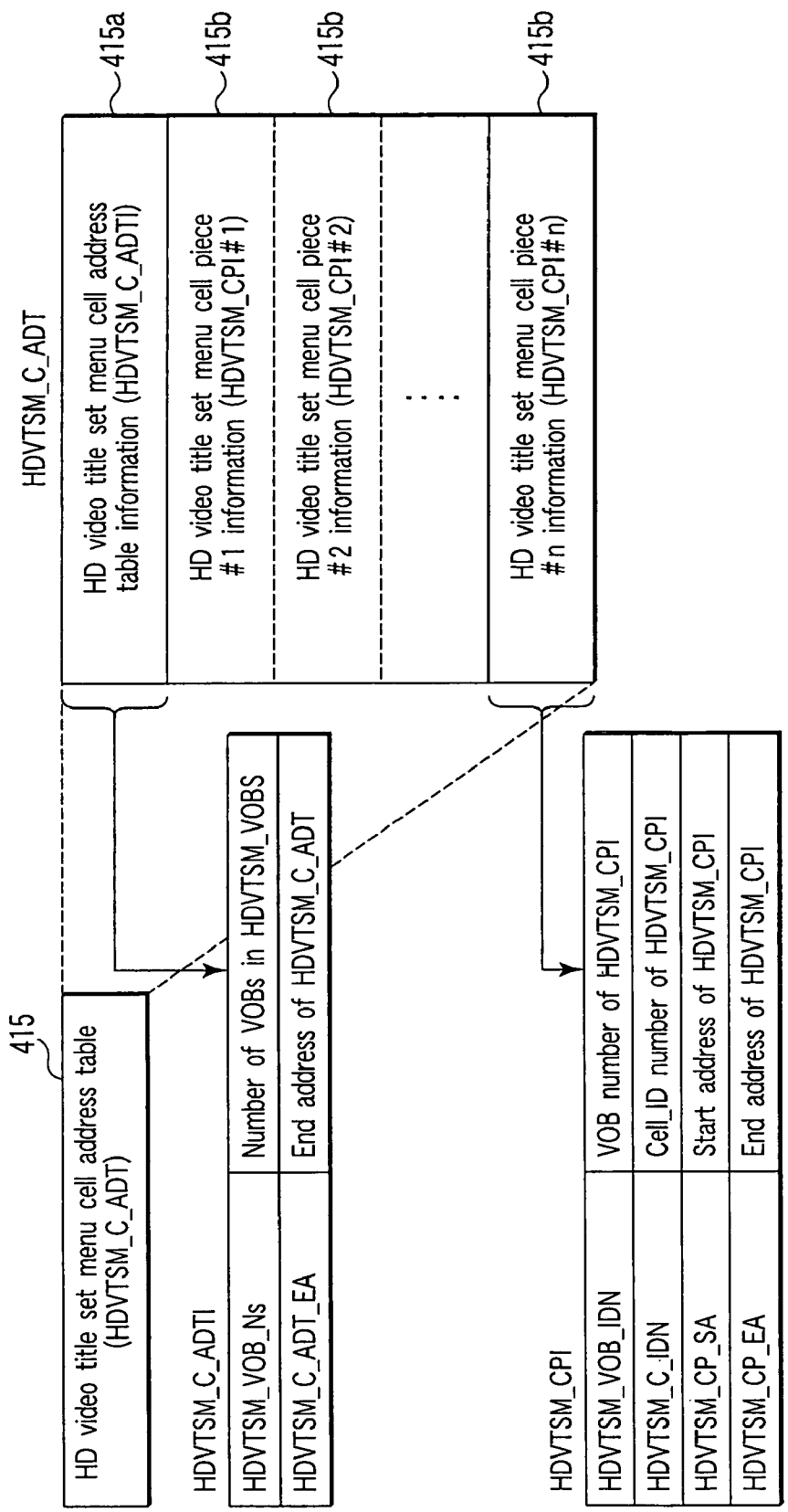
FIG. 29 is a diagram showing a data structure in an HD video title set menu cell address table (HDVTSM_C_ADT) 415 shown in FIG. 20.

Moreover, as shown in FIG. 29, the data structure in the HD video title set menu cell address table (HDVTSM_C_ADT) 415 shown in FIG. 20 includes:

(a) HD video title set menu cell address table information (HDVTSM_C_ADTI) 415a including the number (HDVTSM_VOB_Ns) of VOBs in HDVTSM_VOBS and an end address (HDVTSM_C_ADT_EA) of HDVTSM_C_ADT; and (b) HD video title set menu cell piece information (HDVTSM_CPIs) 415b in which VOB_ID number (HDVTSM_VOB_IDN) of HDVTSM_CP, Cell_ID number (HDVTSM_C_IDN) of HDVTSM_CP, a start address (HDVTSM_CP_SA) of HDVTSM_CP, and an end address (HDVTSM_CP_EA) of HDVTSM_CP are recorded.

As shown in FIG. 30, the HD video title set menu video object unit address map (HDVTSM_VOBU_ADMAP) 416 shown in FIG. 20 includes information such as:

(a) HD video title set menu video object unit address map information (HDVTSM_VOBU_ADMAPI) 416a in which an end address (HDVTSM_VOBU_ADMAP_EA) of HDVTSM_VOBU_ADMAP is recorded; and (b) HD video title set menu video object unit addresses (HDVTSM_VOBU_ADs) 416b including a start address (HDVTSM_VOBU_SA) of HDVTSM_VOBU.

Figure 31:
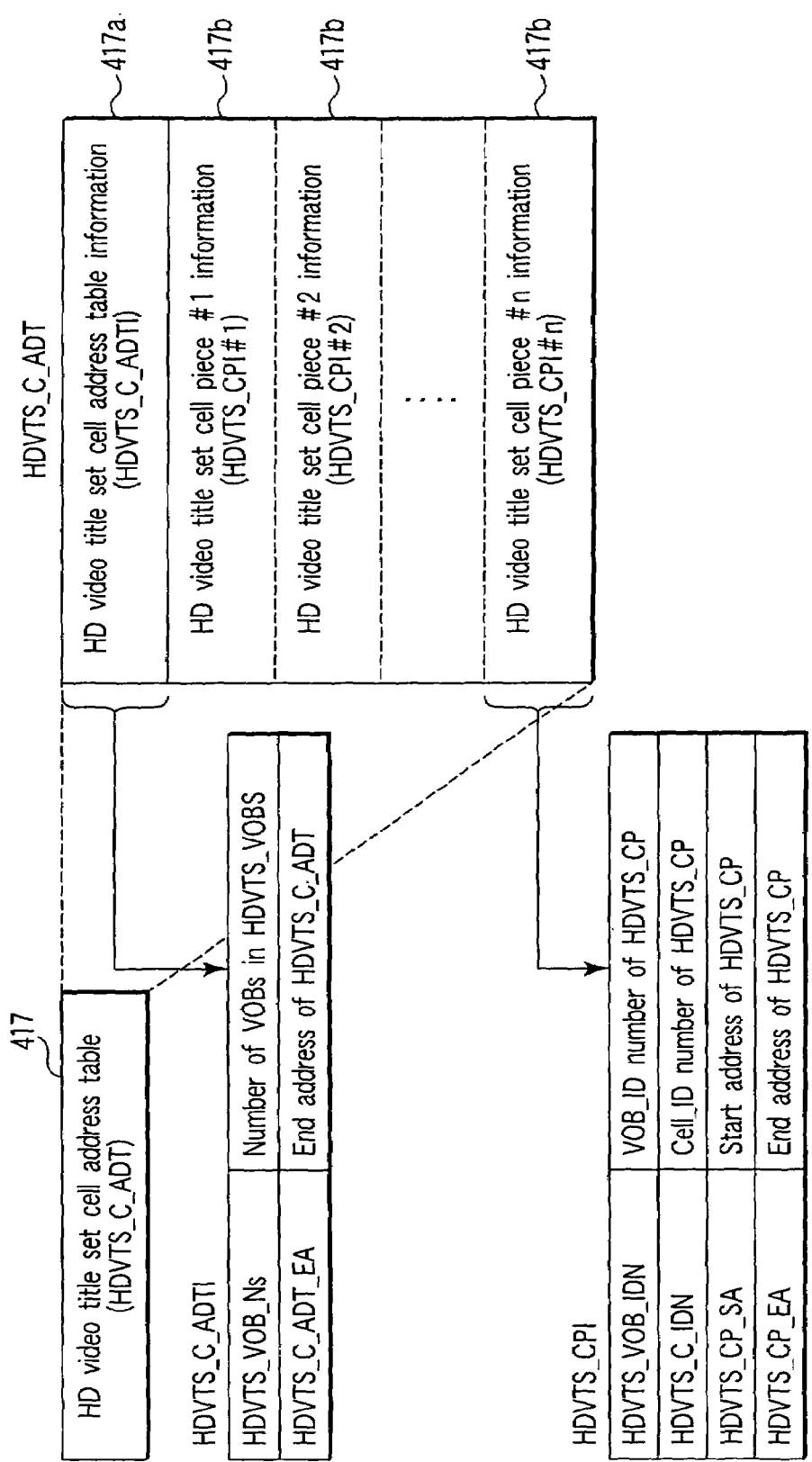
FIG. 31 is a diagram showing a data structure in an HD video title set cell address table (HDVTS_C_ADT) 417 shown in FIG. 20.

Moreover, the data structure in the HD video title set cell address table (HDVTS_C_ADT) 417 shown in FIG. 20 is shown in FIG. 31. The HD video title set cell address table (HDVTS_C_ADT) 417 includes various information such as:

(a) HD video title set cell address table information (HDVTS_C_ADTI) 417a including the number (HDVTS_VOB_Ns) of VOBs in HDVTS_VOBS and an end address (HDVTS_C_ADT_EA) of HDVTS_C_ADT; and (b) HD video title set cell piece information (HDVTS_CPIs) 417b including a VOB_ID number (HDVTS_VOB_IDN) of HDVTS_CP, Cell_ID number (HD- VTS_C_IDN) of HDVTS_CP, start address (HDVTS_CP_SA) of HDVTS_CP, and end address (HDVTS_CP_EA) of HDVTS_CP.

Figure 32:
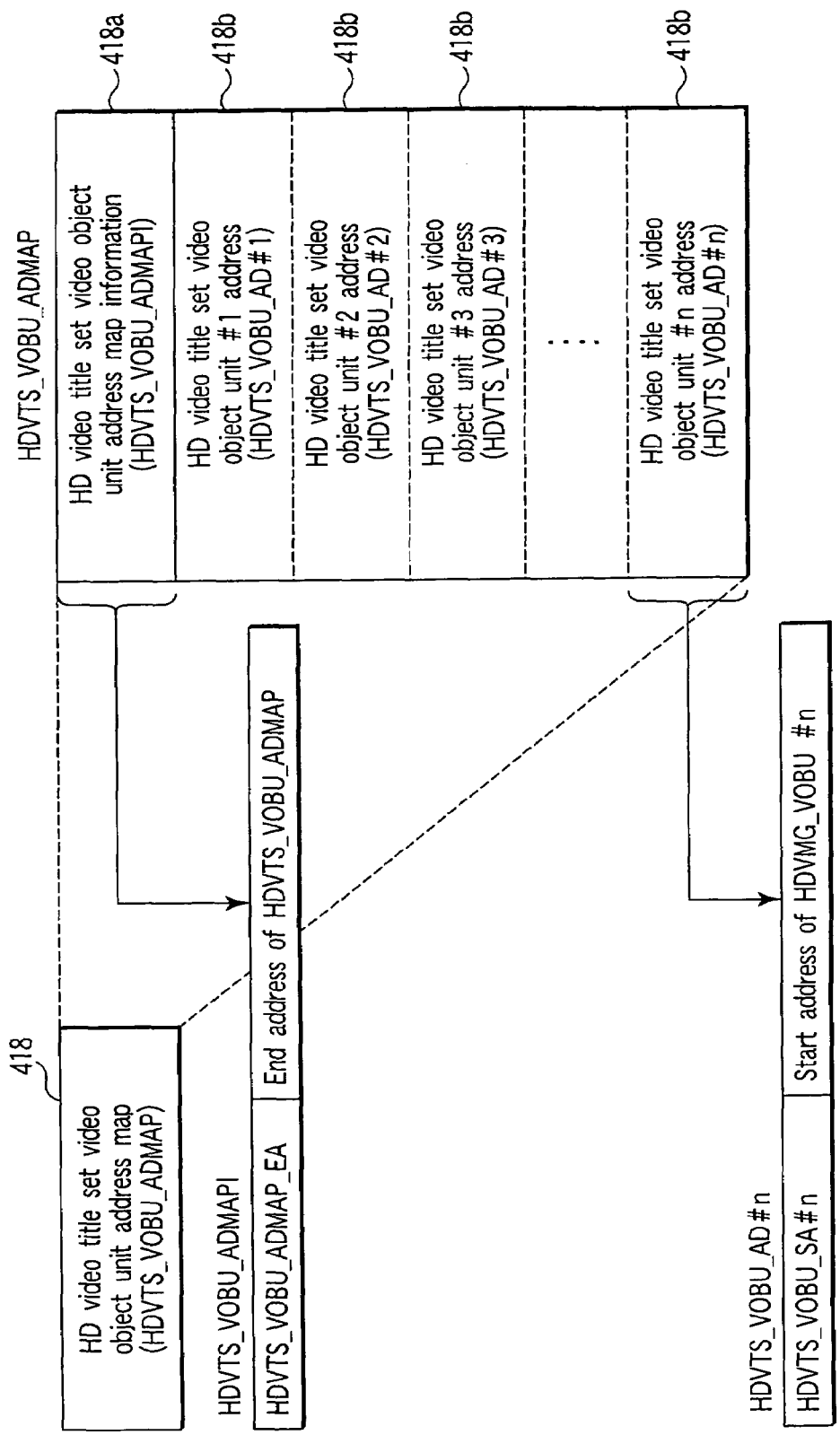
FIG. 32 is a diagram showing a data structure in the HD video title set/cell/address table (HDVTS_C_ADT) 417 shown in FIG. 20.

Furthermore, the data structure in the HD video title set video object unit address map (HDVTS_VOBU_ADMAP) 418 shown in FIG. 20 is shown in FIG. 32. The HD video title set video object unit address map (HDVTS_VOBU_ADMAP) 418 includes various information such as:

(a) HD video title set video object unit address map information (HDVTS_VOBU_ADMAPI) 418*a* including an end address (HDVTS_VOBU_ADMAP_EA) of HDVTS_VOBU_ADMAP; and (b) HD video title set video object unit addresses (HDVTS_VOBU_ADs) 418*b* in which a start address (HDVTS_VOBU_SA) for an HDVTS_VOBU is recorded.

RSM permission flag information which realizes the subject matter (A) and the audio information selection flag/audio information number which realize the subject matter (F) are recorded in the search pointer information of program chain information (PGCI) as shown in FIGS. 22, 7, and 24 in the first embodiment of the present invention. The present invention is not limited to this embodiment, and they may also be recorded in PGCI itself. Another embodiment (second embodiment) of the present invention is shown in FIGS. 33 and 34. The PGCI information shown in FIGS. 33 and 34 correspond to:

[a] the HD video manager menu program chain information (HDVMGM_PGCI) 312*c* 3 shown in FIG. 7 and concerning the HD video manager menu language unit (HDVMGM_LU) 312 of FIG. 6 existing in the HD video manager menu PGCI unit table (HDVMGM_PGCI_UT) 312 (FIG. 3) in the HD video manager information (HDVMGI) 31 of FIG. 1E;

[b] the HD video title set menu program chain information (HDVTSM_PGCI) 413*c*3 shown in FIG. 26 and recorded in the HD video title set menu language unit (HDVTSM_LU) 413*c* in FIG. 25 in the HD video title set menu PGCI unit table (HDVTSM_PGCI_UT) 413 in FIG. 20 showing the data structure in the HD video title set information (HDVTSI) 41 of FIG. 1F; and

[c] the HDVTS_PGCI 412*c* (FIG. 23) in the HD video title set program chain information table (HDVTS_PGCIT) 412 in FIG. 20 showing the data structure in the HD video title set information (HDVTSI) 41 of FIG. 1F.

The PGCI information shown in FIGS. 33 and 34 may be recorded in three places [a] to [c].

As shown in FIGS. 33 and 34, the program chain information (PGCI) includes five regions (five management information groups) including program chain general information (PGC_GI) 50; program chain command table (PGC_CMDT) 51; program chain program map (PGC_PGMAP) 52; cell playback information table (C_PBIT) 53; and cell position information table (C_POSIT) 54.

As shown in FIGS. 33 and 34, RSM&AOB category information (RSM&AOB_CAT) is recorded in the last of the program chain general information (PGC_GI) 50 recorded in the first region (management information group) in PGCI. RSM permission flag information, audio information selection flag, and audio information number are recorded in RSM&AOB category information (RSM&AOB_CAT). This RSM permission flag information means the same content as that described in FIG. 24. The contents of the audio information selection flag and audio information number match those described in FIG. 8 or 27. Further, the RSM&AOB category information (RSM&AOB_CAT) records the entry type information for determining whether or not the PGC is an entry PGC, block mode information, block type information, and PTL_ID_FLD information.

As shown in FIGS. 33 and 34, the information in the PGC graphic unit stream control table (PGC_GUST_CTLT) in which the management information on the stream of the graphic units to be recorded in the PGC is recorded is individually recorded in separate regions in accordance with five types of images (16:9 HD image, 16:9 SD image, 4:3 SD image, letterboxed SD image, and pan-scanned SD image). The separate regions are PGC_GUST_CTL region (PGC_GUST #0) of an HD graphic unit stream #0; PGC_GUST_CTL region (PGC_GUST #1) of an SD wide graphic unit stream #1; PGC_GUST_CTL region (PGC_GUST #2) of a 4:3 graphic unit stream #2; PGC_GUST_CTL region (PGC_GUST #3) of a letterboxed SD graphic unit stream #3; and PGC_GUST_CTL region (PGC_GUST #4) of a pan-scanned SD graphic unit stream #4.

In addition to the above-described information, the program chain general information (PGC_GI) 50 further records various information such as a PGC content (PGC_CNT); PGC playback time (PGC_PB_TM); PGC user operation control (PGC_UOP_CTL); PGC audio stream control table (PGC_AST_CTLT); PGC sub-picture stream control table (PGC_SPST_CTLT); PGC graphic unit stream control table (PGC_GUST_CTLT); PGC navigation control (PGC_NV_CTL); PGC sub-picture palette (PGC_SP_PLT); start address (PGC_CMDT_SA) of PGC_CMDT; start address (PGC_PGMAP_SA) of PGC_PGMAP; start address (C_PBIT_SA) of C_PBIT; and start address (C_POSIT_SA) of C_POSIT.

The command information adapted for each PGC is grouped and recorded in the program chain command table (PGC_CMDT) 51 as shown in FIG. 35. The PGCI information may be recorded at least one of the three places [a] to [c] as described with reference to FIGS. 33 and 34. The resume sequence information described in [Point 4] described in the subject matter (A) is recorded in the program chain command table (PGC_CMDT) 51 as shown in FIG. 35. The information content of the resume sequence information in the embodiment of the present invention (resume (RSM) command sequence clearly described with reference to FIG. 35) is described in a form in which the RSM commands (RSM_CMDs) 514 are successively recorded in this region. The RSM command (RSM_CMD) 514 described in one region in FIG. 35 means a command which can be designated in the HD DVD video content, and the RSM commands (RSM_CMDs) 514 recorded in the resume (RSM) command sequence region are continuously (sequentially) executed in order from above.

In the embodiment of the present invention, the arrangement of cell commands (C_CMDs) 513 described in FIG. 35 also means a sequential command series. That is, it is meant that the command processes are successively executed from above in accordance with the arrangement order of the cell commands (C_CMDs) 513 shown in FIG. 35. As described with reference to FIG. 36, in a series of cell command process procedure designated from the cell command #1 (C_CMD #1) 513 to the cell command #k (C_CMD #k) 513, a part (a first cell command number to start the sequential process of the cell commands for each cell, and an execution range of the sequential process of the cell commands) of the cell command process procedure can be designated for each cell.

The RSM command (RSM_CMD) 514 indicates a part of the command procedure to be executed "immediately before the presentation from halfway in PGC" whose presentation is interrupted before, after returning to the corresponding PGC (e.g., from the menu screen). On the other hand, a pre-command (PRE_CMD) 511 means a command to be executed "immediately before reproducing the corresponding PGC from the beginning". The command executed after presentation of the corresponding PGC is a post-command (POST_CMD) 512. In FIG. 35, the numbers of pre-commands (PRE_CMDs) 511, post-commands (POST_CMDs) 512, cell commands (C_CMDs) 513, and RSM commands (RSM_CMD) 514 which can be recorded in one program chain command table (PGC_CMDT) 51 can be freely set (any of the numbers of commands described above may also be "0"). Additionally, in the embodiment of the present invention, an upper limit of a total value of added numbers of pre-commands (PRE_CMDs) 511, post-commands (POST_CMDs) 512, cell commands (C_CMDs) 513, and RSM commands (RSM_CMDs) 514 which can be recorded in one program chain command table (PGC_CMDT) 51 is defined as 1,023. Therefore, for example, when all the numbers of pre-commands (PRE_CMDs) 511, post-commands (POST_CMDs) 512, and RSM commands (RSM_CMDs) 514 are 0, the number of cell commands (C_CMDs) 513 may be set to 1,023 at maximum.

As shown in FIG. 36, the number PRE_CMD_Ns of pre-commands (PRE_CMDs) 511, the number POST_CMD_Ns of post-commands (POST_CMDs) 512, the number C_CMD_Ns of cell commands (C_CMDs) 513, and the number RSM_CMD_Ns of RSM commands (RSM_CMDs) 514 which can be recorded in one program chain command table (PGC_CMDT) 51 are recorded in the program chain command table information (PGC_CMDTI) 510.

A concrete data structure in the RSM command (RSM_CMD) 514 recorded in the program chain command table (PGC_CMDT) 51 will be described hereinafter. Here, the concrete data structure in the RSM command (RSM_CMD) 514 will be described. The data structures in the pre-command (PRE_CMD) 511, post-command (POST_CMD) 512, and cell command (C_CMD) 513 are also the same as the concrete data structure in the RSM command (RSM_CMD) 514. In the concrete data structure in the RSM command (RSM_CMD) 514, as shown in FIG. 36, a region for eight bytes is allocated to each command. The contents of command are recorded in the region for eight bytes. In any command, three bits from the MSB of eight bytes stores data of "command ID-1". The contents of data of and after the three bits from the MSB differs based on the value of the "command type", but the contents have information such as "I-flag for comparison" and "Compare Field" in common regardless of the command type.

Figure 37:
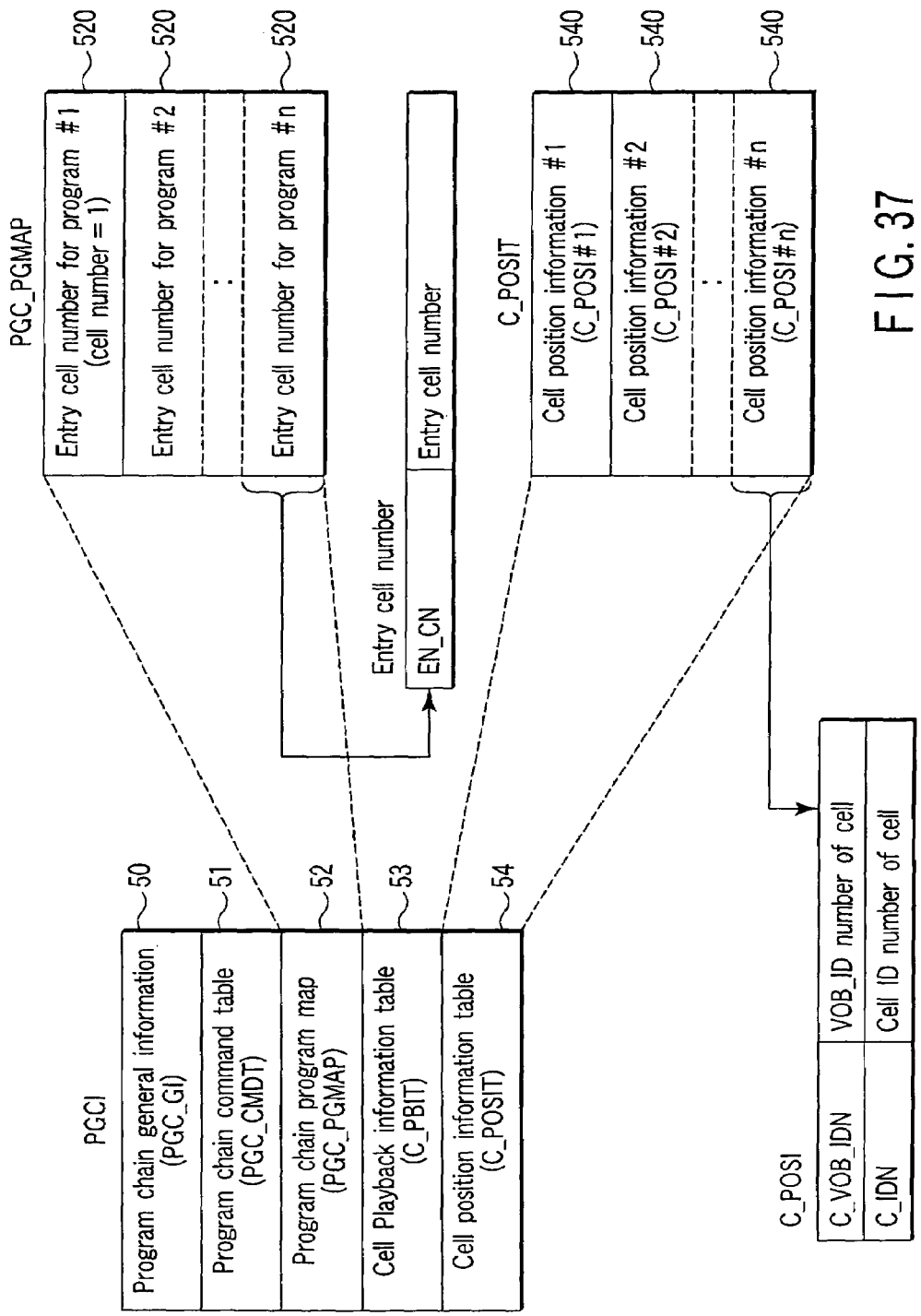
FIG. 37 is a diagram showing a data structure in program chain/program map (PGC_PGMAP) and cell/position information table (C_POSIT) 54 arranged in the program chain information (PGCI)

Detailed structures of the program chain program map (PGC_PGMAP) 52 and cell position information table (C_POSIT) 54 recorded in the program chain information (PGCI) are shown in FIG. 37.

Entry cell number 520 for program information in which an entry cell number (EN_CN) is recorded in accordance with each entry is recorded in the program chain program map (PGC_PGMAP) 52, and the number of pieces of entry cell numbers 520 corresponding to the number of entry numbers are recorded. The cell position information table (C_POSIT) 54 has a structure in which cell position information (C_POSI) 540 comprising a set of VOB ID number (C_VOB_IDN) and cell ID number (C_IDN) of the cell is arranged in order.

It has been described with reference to FIG. 35 that a part of the cell command process procedure (the first cell command number to start the sequential process of the cell command and an execution range of the sequential process of the cell command for each cell) can be designated for each cell in a series of cell command process procedure designated to the cell command #k (C_CMD #k) 513 from the cell command #1 (C_CMD #1) 513. Execution range information of the sequential process of the cell command which can be set for each cell is shown in FIG. 38. The PGCI information can be recorded in at least one of three places [a] to [c] as described with reference to FIGS. 33 and 34. As shown in FIG. 38, the management information on the individual cells constituting the PGC is recorded in cell playback information (C_PBIs) 530 in the cell playback information table (C_PBIT) 53 in the PGCI which is the management information of the corresponding PGC.

Information on the first cell command number to start the sequential process of the cell command specified for each cell in a series cell command process procedure designated to the cell command #k (C_CMD #k) 513 from the cell command #1 (C_CMD #1) 513 shown in FIG. 35 is recorded in cell command start number information (C_CMD_SN) in the cell playback information (C_PBI) 530 as shown in FIG. 38. Moreover, the number (C_CMD_C_Ns) of continuous cell commands indicating the number of commands to execute the command process continuously is recorded in the cell playback information (C_PBI) 530, including the cell command (C_CMD) 513 designated by the cell command start number information (C_CMD_SN). The execution range of the sequential process of the cell command executed by the corresponding cell is specified from both information. In the embodiment of the present invention, after ending the presentation of the corresponding cell, a series of command procedures (command sequence) is executed in a range designated by the cell command start number information (C_CMD_SN) and the number (C_CMD_C_Ns) of continuous cell commands of FIG. 38.

Moreover, the cell playback information (C_PBI) 530 includes various information such as a cell category (C_CAT) indicating whether the corresponding cell constitutes the interleaved block corresponding to the multi-angle or constitutes a part of a general continuous block, or corresponds to the first or last cell of the interleaved block in a case where the cell constitutes a part of the interleaved block for the multi-angle; a cell playback time (C_PBTM) indicating a presentation time required at the time of the presentation of the corresponding whole cell; start address of first VOBU of cell (C_FVOBU_SA); end address of first ILVU of cell (C_FILVU_EA); start address of last VOBU of cell (C_LVOBU_SA); end address of last VOBU of cell (C_LVOBU_EA); cell command start number (C_CMND_SN); and the number (C_CMD_C_Ns) of continuous cell commands.

FIGS. 39A to 39D show a structure in which the graphic unit (GU) of the present embodiment is stored as an MPEG program stream. A video object (VOB) a1 shown in FIG. 39A includes a plurality of video object units (VOBUs) a2 as shown in FIG. 39B. As shown in FIG. 39C, one VOBU includes an MPEG program stream having a plurality of different data packs such as a navigation pack a3; a video pack a4; a graphic unit (GU) pack a5; an audio pack a6; a subpicture (SP) pack a7; and the like. As shown in FIG. 39D, by differences of five display types (HD, SD wide, 4:3, letterbox, pan-scan), the GU pack a5 is stored as streams including graphic unit stream #1 (a51) for HD; graphic unit stream #2 (a52) for SD 16:9 wide; graphic unit stream #3 (a53) for SD 4:3; graphic unit stream #4 (a54) for SD 4:3 letterbox; and graphic unit stream #5 (a55) for SD pan-scan. These streams are appropriately selected/switched in accordance with a display type of a main picture or display conversion with respect to a display unit of an output target, and the user does not directly switch the stream.

Next, a graphic pack (GR_PCK) will be described. The graphic pack (GR_PCK) includes a pack header, and a graphic packet (GR_PKT). The graphic data is aligned in a boundary of a logic block (LB) in the graphic unit (GRU). The GR_PCK may include a padding packet or a stuffing byte only in the last packet of GRU. The GR_PKT includes a packet header, a graphic stream number, and graphic data.

FIG. 40 shows substream ID and graphic stream number assigned to the stream of the graphic unit (GU). Each stream has a stream ID of private stream 1 (1011 1101b), and has a substream ID (0101 0xxxb) such that the stream is distinguished as a graphic unit stream. Furthermore, to distinguish the display types, (0101 0001b) for HD, (0101 0010b) for SD 16:9 wide, (0101 0011b) for SD 4:3, (0101 0100b) for SD letterbox, and (0101 010b) for SD pan-scan are defined.

FIG. 41 shows an example of the data structure of the graphic unit (GU) having mask data. As shown in the figure, payload data of a plurality of GU packs a5 are connected to one another to constitute one graphic unit (GU). In FIG. 41, additional data such as a pack header and a padding packet are not illustrated. The graphic unit (GU) is roughly constituted of header information b1, highlight information (HLI) b2, one or more mask data b3 corresponding to one or more pieces of button information b23 described later, and graphic data b4. Here, detailed contents of the highlight information (HLI) b2 will be described (the remaining will be described later). The highlight information (HLI) b2 includes general information b21, color pallet information b22, and one or more pieces of button information b23. The color pallet information b22 gives a button color on the menu, and has a usual color pallet b221 designated in a non-highlighted button color; color pallet b222 for selection designated in a highlighted/selected button color by user's input selection of an arrow key or the like; and a color pallet b223 for activation designated in a determined color from a selected color, when the user determines the highlighted/selected button. The button information b23 has a start address b231 of mask data which simulates a button shape, a size b232 of mask data, adjacent button position information b233, and button command b234 executed when the button is activated, which are information for moving the button to front/back/left/right adjacent buttons. A command sequence in which one or more commands are continuously recorded can be constituted in the button command, and eight commands at maximum can be recorded in the present embodiment. When the button is activated, one to eight commands are continuously executed, and accordingly a compound process such as setting and branching can be executed at once.

FIG. 42 shows another example of the data structure of the graphic unit having the mask data of FIG. 41. As shown in FIG. 42, the highlight information (HLI) b2 is different from that of FIG. 41, and includes the general information b21; the color pallet information b22; one or more pieces of search information b24 for mask data corresponding to one or more pieces of button information described later; and one or more pieces of button information b23. The color pallet information b22 controls the button color on the menu, and includes the usual color pallet b221 designated in the non-highlighted button color; the color pallet b222 for selection designated in the highlighted/selected button color by the user's input selection of the arrow key or the like; and the color pallet b223 for activation designated in the determined color from the selected color, when the user determines the highlighted/selected button. The mask data search information b24 includes a start address b241 of mask data, and a size b242 of mask data. Furthermore, the button information b23 includes the adjacent button position information b233 and the button command b234 executed when the button is activated as the information for moving the button to the front/back/left/right adjacent buttons by the user input. A command sequence in which one or more commands are continuously arranged can be constituted in the button command, and eight commands at maximum can be recorded in the present embodiment. When the button is activated, one to eight commands are continuously executed, and accordingly a compound process such as setting and branching can be executed at once.

FIGS. 43A and 43B show the contents of the header information b1 and the general information b21. The header information b1 includes a graphic unit size (GU_SZ) indicating a size of the whole graphic unit; graphic data stored in the graphic unit; graphic unit attribute information (GU_ATRI), such as resolutions (1,920×1,080; 1,440×1,080; 1,280×720) of the mask pattern, aspect ratios (16:9; 4:3), and display types (HD, SD wide, SD 4:3, SD letterbox, SD pan-scan); start address (HLI_SA) of the highlight information (HLI); and start address (GD_SA) of the graphic data.

Moreover, the general information b21 includes a graphic unit presentation start time (GU_PB_S_PTM) having a value equal to that of a presentation time stamp (PTS) included in the header of the graphic unit (GU) pack a5, and graphic unit playback end time (GU_PB_E_PTM). A display time of the graphic unit, and a valid time of the graphic unit (start/end times of both completely match each other) capable of executing the command are set using these PTS information, or the playback start time (GU_PB_S_PTM) of the graphic unit, and the playback end time (GU_PB_E_PTM) of the graphic unit. In the start/end time information, PTS/PTM is used, and therefore it is possible to set a time range with very high precision. The general information b21 also includes a button offset number (BTN_OFN) which gives a start number of the button in the menu screen in a case where the menu extends over a plurality of screens; the number (BTN_Ns) of the buttons in the menu screen; the number (NSL_BTN_Ns) of number selection buttons indicating the number of the buttons selectable by number input; a forced selection button number (FOSL_BTNN) for intentionally bringing the arbitrary button number into a selected state in a case where the menu screen is displayed; and a forced activation button number (FOAC_BTNN) indicating the button number forcibly activated in a case where a time zone selectable by the user has passed.

Figure 44:
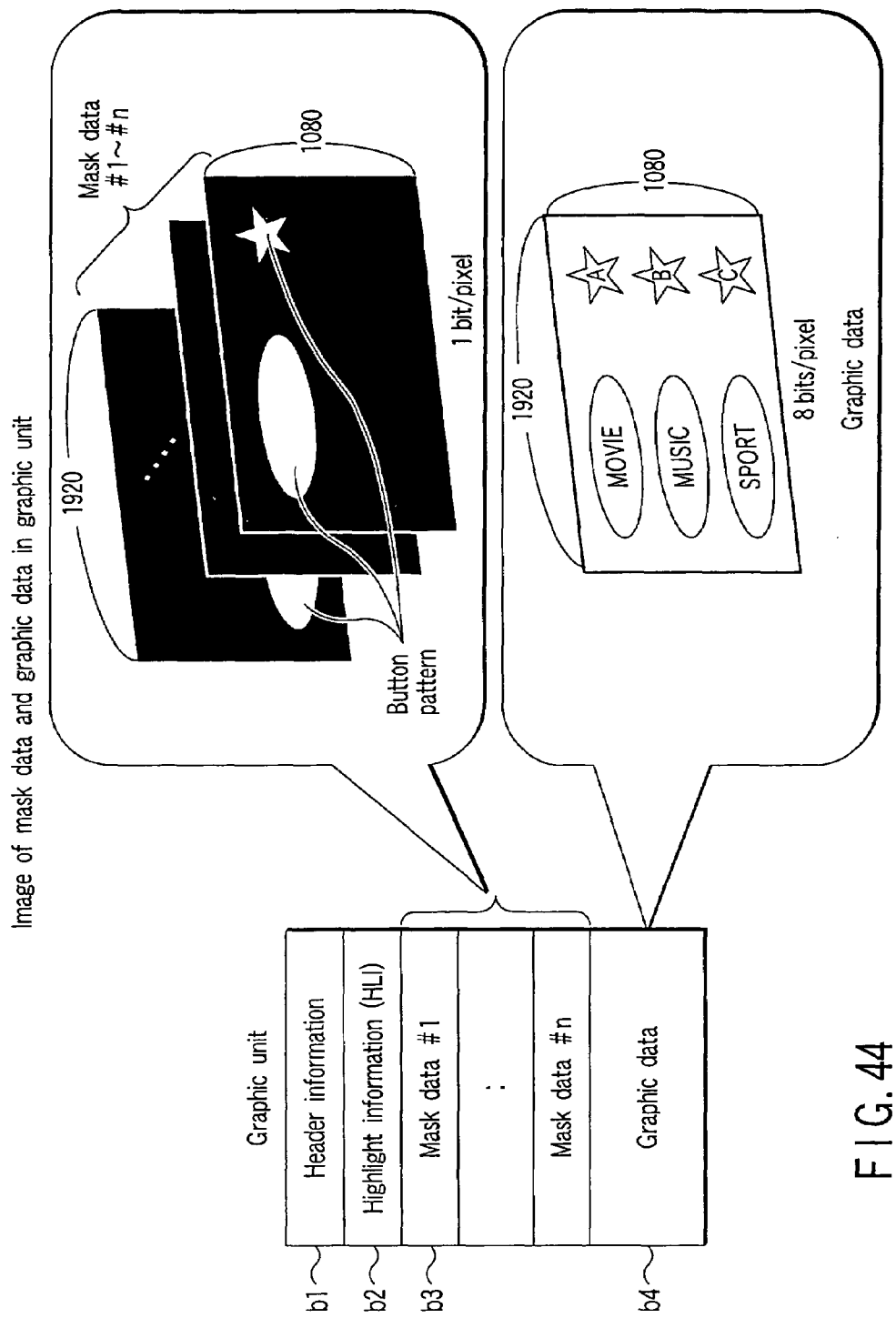
FIG. 44 is an explanatory view of an image of mask data and graphic data in the graphic unit.

FIG. 44 shows a data image stored in the graphic unit. On the upper right, an image stored in the mask data b3 is shown, and the mask data is a mask (button) pattern constituted of one bit/pixel. Each mask data corresponds to the button on the menu screen. On the lower right, the data stored in the graphic data b4 is shown, and the graphic data is 256-color graphic patterns constituted of eight bits/pixel.

FIG. 45 shows one example of video synthesis including the mask pattern. In FIG. 45, a video synthesis output comprises three planes of a main picture, graphic pattern (for buttons, etc.), and mask pattern (for buttons, etc.), and data of the main picture+graphic pattern+mask pattern is superimposed on one another to synthesize video. In the mask plane, the buttons selected from the buttons (1) to (3) are superimposed. In FIG. 45, the video synthesis output shows a state in which the mask (button) pattern (1) is selected. The data of the graphic pattern and the mask (button) pattern are stored in the graphic unit (GU).

Figure 46:
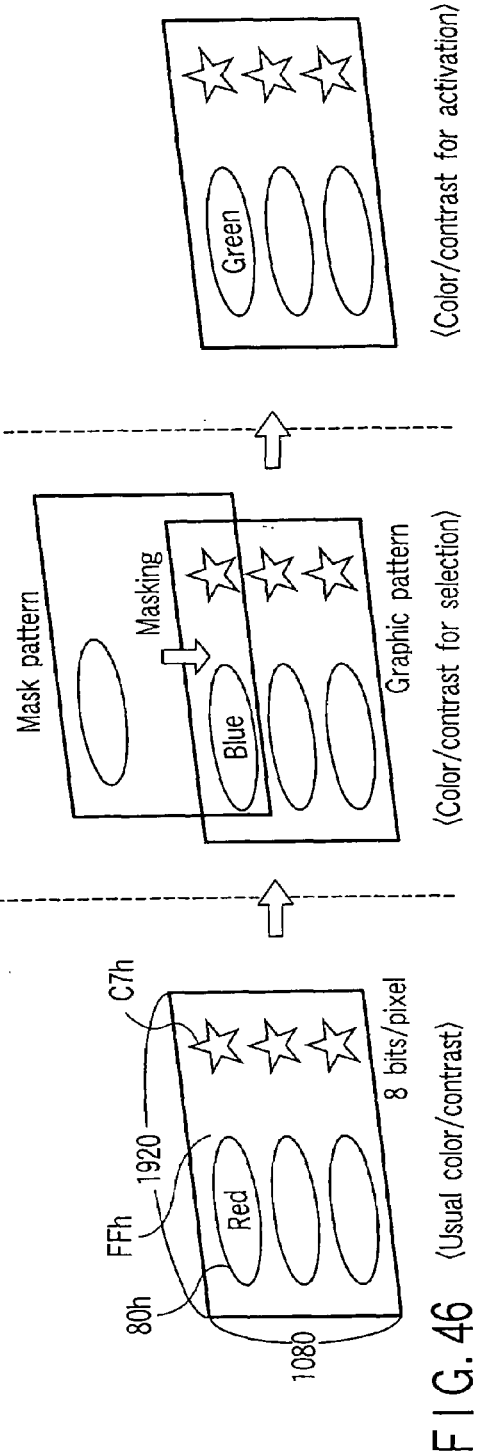
FIG. 46 is a diagram showing one example of a color contrast information table stored in color pallet information b22.

FIG. 46 shows one example of a color contrast information table stored in the color pallet information b22. A left end shows an example of the usual color pallet b221, a middle shows an example of the color pallet b222 for selection, and a right end shows an example of the color pallet b223 for activation. The table comprises 256 color contrast tables '00h' to 'FFh', and is represented by four bytes in total of color data of eight bits each of R(Red), G(Green), B(Blue), and eight bits of contrast data. In the example of FIG. 46, an elliptic button part of the graphic data is '80h', a star-shaped button part is 'C7h', and a background part is 'FFh'. In a button pixel part '80h', red (R: 'FFh', G:'00h', B: '00h'), and translucent ('80h') are assigned to the usual color pallet b221. Blue (R: '00h', G: '00h', B: 'FFh'), and translucent ('80h') are assigned to the color pallet b222 for selection. Green (R: '00h', G: 'FFh', B: '00h'), and translucent ('80h') are assigned to the color pallet b223 for activation. Each background pixel part of 'FFh' comprises white (R: 'FFh', G: 'FFh', B: 'FFh'), and transparent ('FFh').

FIG. 46 shows an example in which a place corresponding to the "button part" of the superimposed mask patterns changes to blue from red by the color pallet for selection, and further changes to green from blue by user's button activation operation. Accordingly, the button is highlighted by the user's selection operation on the menu screen, the user is allowed to grasp the selected button, the button is highlighted by the user's activation operation, and the user can grasp the activated button.

Figure 47:
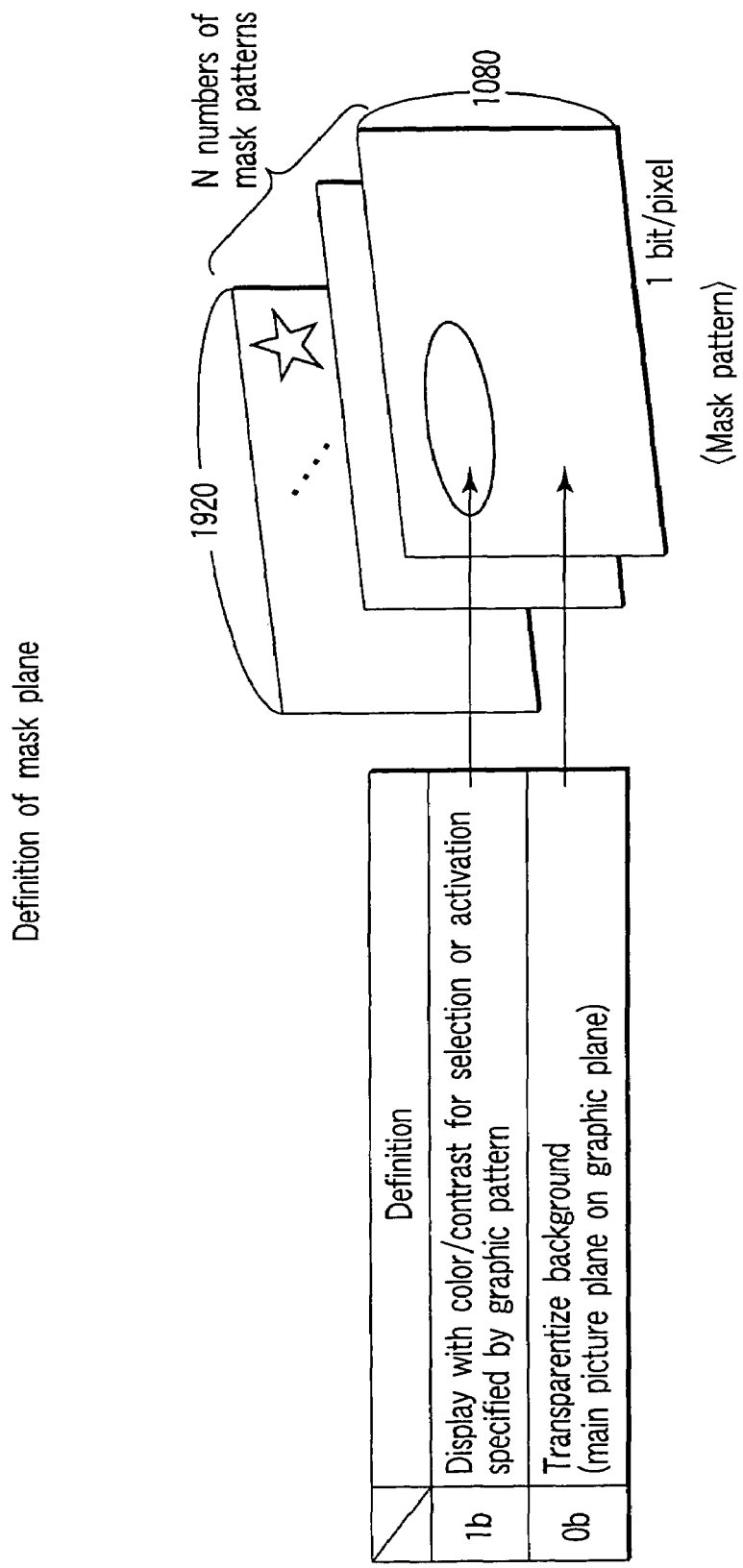
FIG. 47 is a diagram showing bit definition of mask data b3 of one bit/pixel stored in the graphic unit (GU)

FIG. 47 shows a bit definition of the mask data b3 of one bit/pixel, stored in the graphic unit (GU). When the value of the bit is '1b', selection (color, contrast) designated by the graphic pattern or activation (color, contrast) is displayed. When the bit value is '0b', the background (usual (color, contrast) of the main picture plane or the graphic plane is displayed) is transmitted.

FIG. 48 shows an information reproduction apparatus (player) which reads and plays back information stored in a disk-shaped information storage medium 1. The information storage medium 1 is attached to a disk drive 101. The disk drive 101 rotates/drives the attached information storage medium 1, and reads information stored in the information storage medium 1 using an optical pickup (not shown).

The information read by the disk drive 101 is supplied to a data processor 102, subjected to an error correction process, and stored in a track buffer (not shown) in the data processor 102. Moreover, in the information stored in the track buffer, the management information of the HD video manager information region 31 and HD video title set information region 41 is recorded in the memory 122, and used in presentation control, data management and the like. In the information stored in the track buffer, the information of the video object regions 32, 42, 43 is transferred to a separation unit 103, and separated for each video pack a4, graphic unit pack a5, audio pack a6, and sub-picture pack a7. The information of the video pack a4 is supplied to a video decoder unit 111, that of the sub-picture pack a7 is supplied to a sub-picture decoder unit 112, that of the graphic unit pack a5 is supplied to a graphic decoder unit 113, and that of the audio pack a6 is supplied to an audio decoder unit 114. The information is decoded.

Main picture information decoded by the video decoder unit 111, sub-picture information decoded by the sub-picture decoder unit 112, and graphic information decoded by the graphic decoder unit 113 are supplied to a video processor 104, and subjected to a superposition process. Thereafter, the information is converted to analog information by a digital/analog (D/A) converter 132, and output as a video signal to a video display device (not shown) such as a cathode ray tube (CRT). The sound information decoded by the audio decoder unit 114 is converted to analog information by a D/A converter 133, and is output as an audio signal to an audio reproduction device such as a speaker (not shown).

A series of presentation operation with respect to the information storage medium 1 is generally controlled by a micro processing unit (MPU) 121. On receiving operation information from a key input device 131, the MPU 121 controls each section based on a program stored in a read only memory (ROM) 123.

Figure 49:
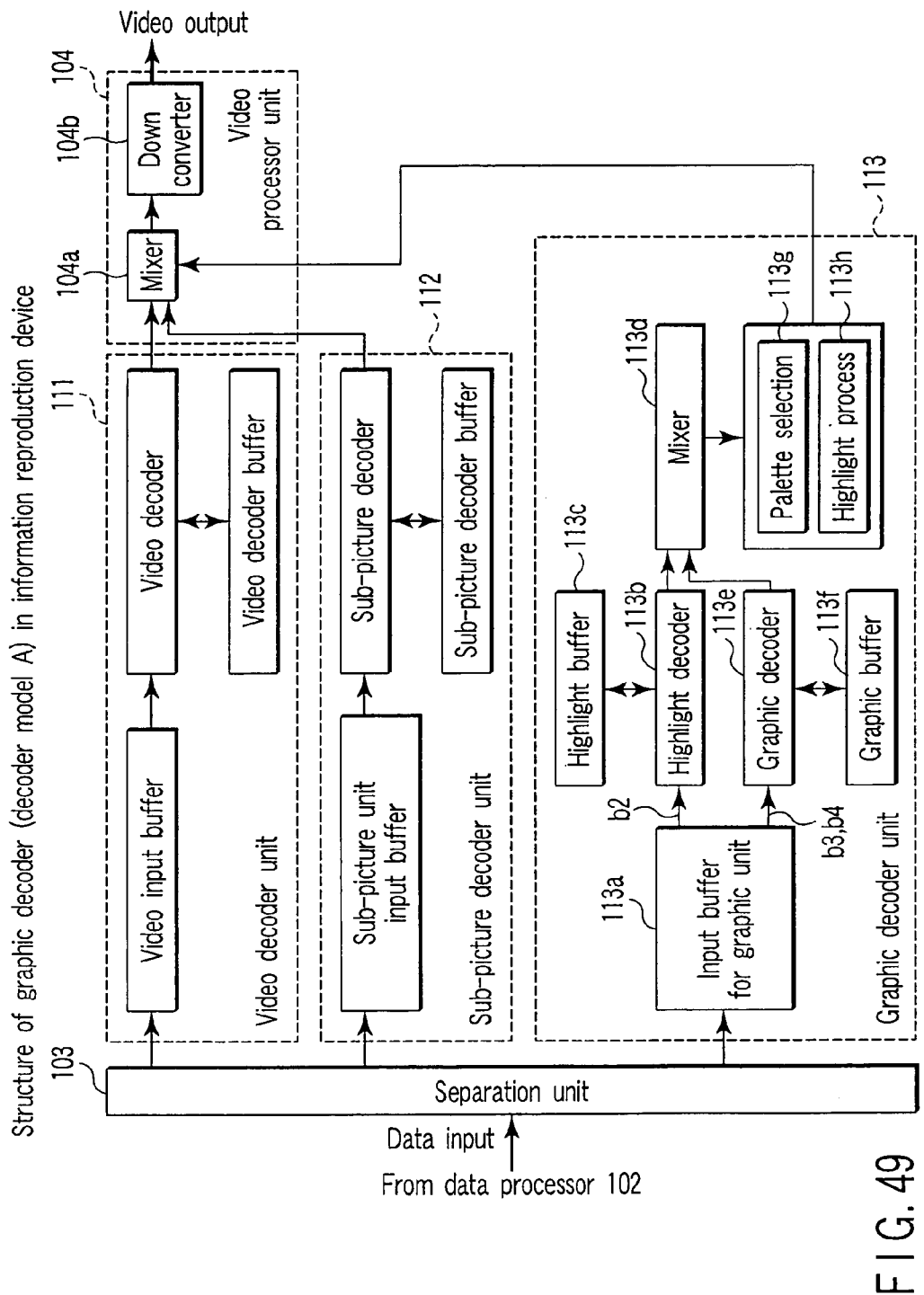
FIG. 49 is a diagram showing a decoder model A of a decoder block in a video system of and after a separation unit 103 of FIG. 48.
Figure 50:
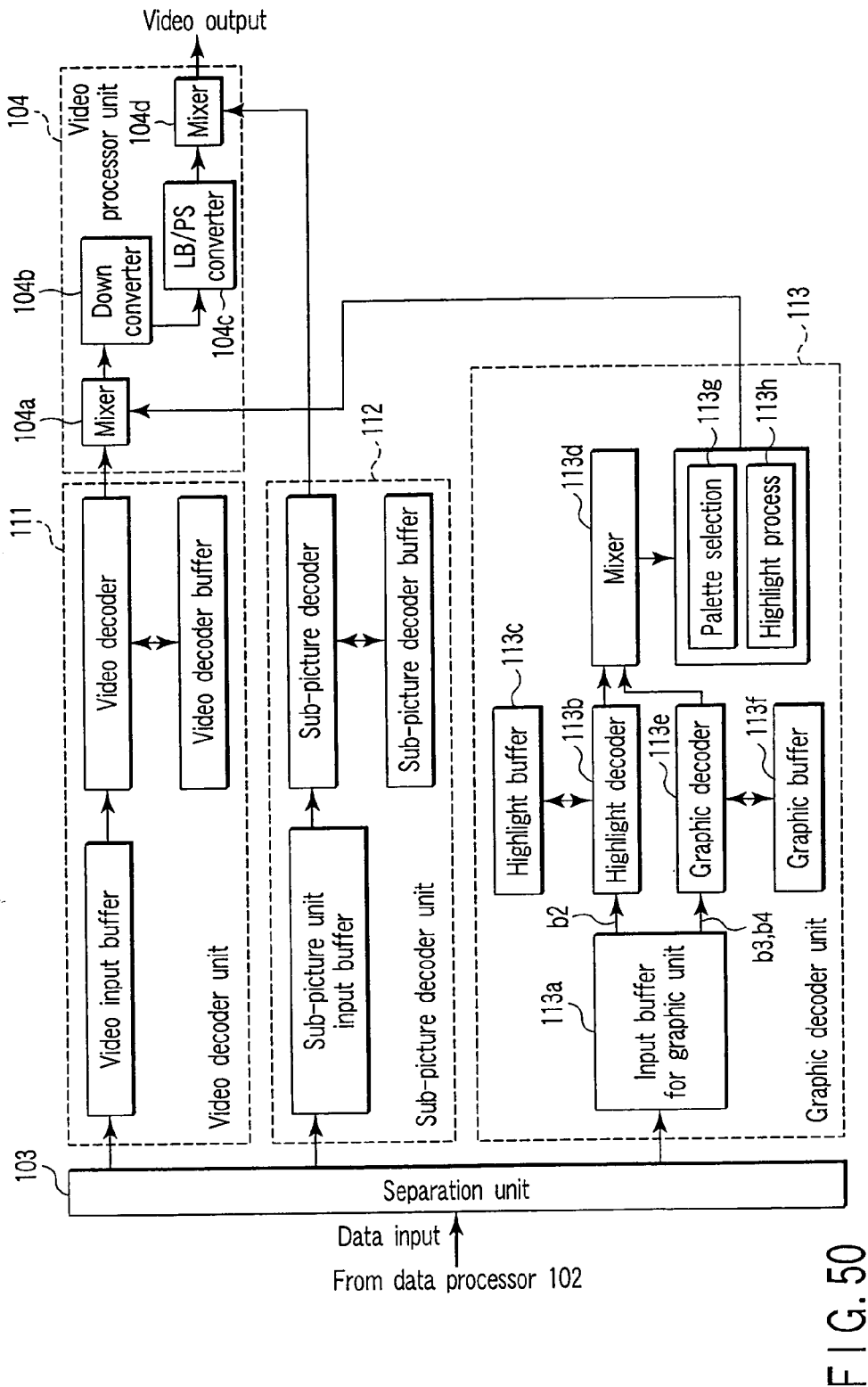
FIG. 50 is a diagram showing a decoder model B of the decoder block in the video system of and after the separation unit 103 of FIG. 48.
Figure 51:
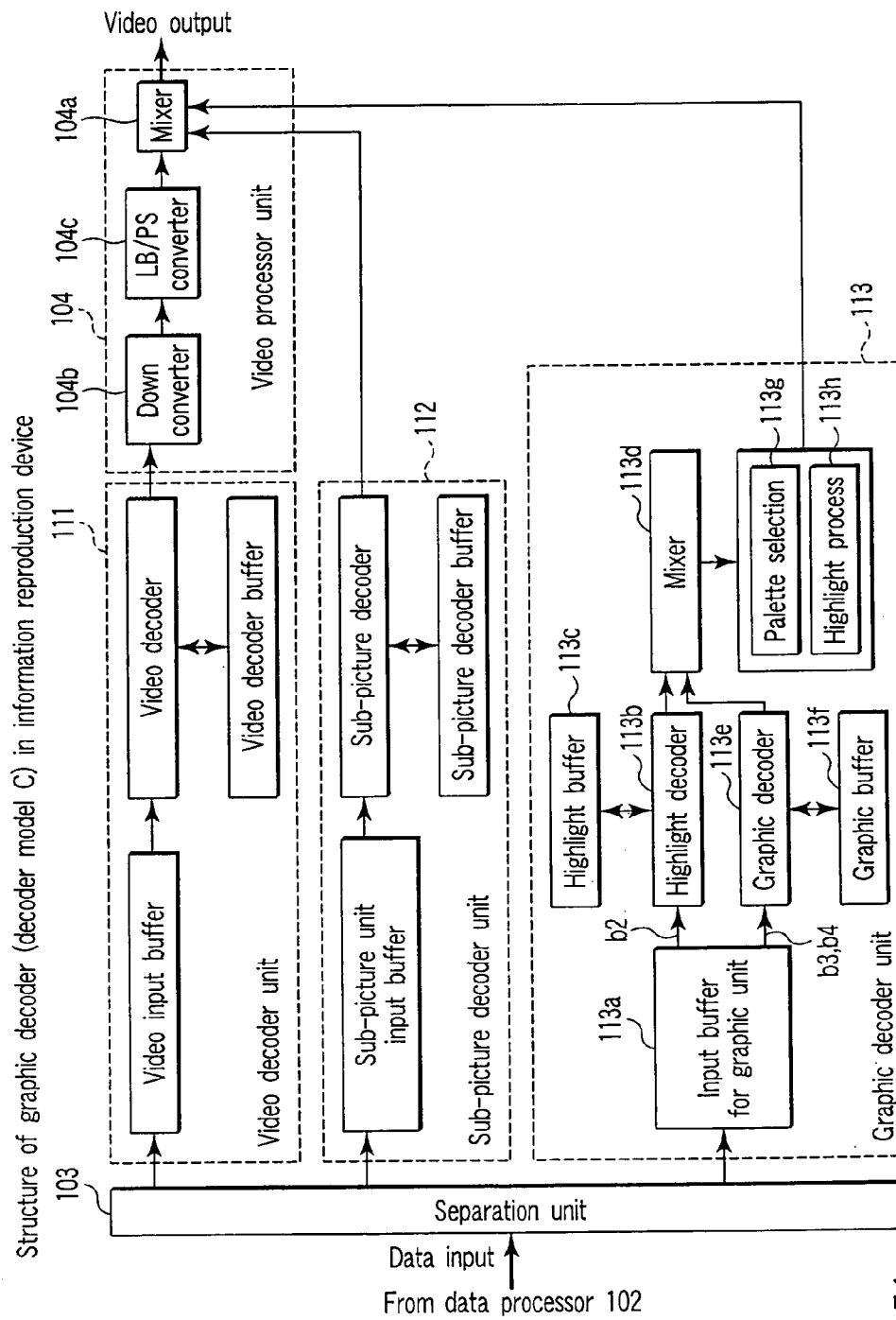
FIG. 51 is a diagram showing a decoder model C of the decoder block in the video system of and after the separation unit 103 of FIG. 48.

FIGS. 49, 50, and 51 are explanatory views of model examples A, B, and C of a video system decoder block of and after the separation unit 103 of FIG. 48. The video decoder unit 111 comprises a video input buffer, video decoder, and video decoder buffer, and the video data decoded by the video decoder is sent to the video processor 104 in the subsequent stage. The sub-picture decoder unit 112 comprises a sub-picture unit input buffer, sub-picture decoder, and sub-picture decoder buffer, and the sub-picture data decoded by the sub-picture decoder is sent to the video processor 104 in the subsequent stage. The graphic decoder unit 113 buffers the graphic unit pack aS separated by the separation unit 103, and comprises a graphic unit input buffer 113a capable of storing at least one graphic unit; a highlight decoder 113b which decodes the highlight information b2 and mask data b3 of the graphic unit stored in the input buffer 113a; a highlight buffer 113c; a graphic decoder 113e which decodes the graphic data b4 of the graphic unit stored in the input buffer 113a; and a graphic buffer 113f. Furthermore, the button pattern decoded by the highlight decoder 113b is mixed with the graphic data decoded by the graphic decoder 113e by a mixer 113d in the subsequent stage, subjected to pallet selection 113g and highlight process 113h, and thereafter sent to the video processor 104.

FIG. 49 shows an example of the decoder model A having the graphic decoder. In the decoder model A, the data decoded by the respective decoders 111, 112, and 113 described above are supplied to the video processor 104. The video data, sub-picture data, and graphic data are mixed with and superposed by a mixer 104a in the video processor 104. Furthermore, when a connected display unit is standard television (SDTV), a down-convert process for a mixed signal output from the mixer 104a is performed by a down converter 104b, and the video is output.

FIG. 50 shows an example of a decoder model B having a graphic decoder. In the decoder model B, the data decoded by the above-described decoders 111, 112, and 113 are supplied to the video processor 104. The video data and graphic data are first mixed with and superposed by a first mixer 104a. Thereafter, when a connected display unit is standard television (SDTV), an output from the mixer 104a is subjected to a down-convert process by a down converter 104b. Furthermore, when an aspect ratio of the connected display unit is 4:3, an output form the down converter 104b is subjected to a letterbox or pan-scan conversion process by a letterbox (LB)/pan-scan (PS) converter 104c. Thereafter, an output from the converter 104c is mixed with and superposed on the sub-picture data in accordance with the display type (HD, SD wide, SD 4:3, SD pan-scan, SD letterbox) output form the sub-picture decoder 112 by a second mixer 104d, and the video is output.

FIG. 51 shows an example of a decoder model C having a graphic decoder. In the decoder model C, the video data decoded by the video decoder 111 is first subjected to a down conversion by a down converter 104b in the video processor 104 when a connected display unit is standard television (SDTV). Furthermore, when an aspect ratio of the connected display unit is 4:3, a letterbox or pan/scan conversion process is performed by a letterbox/pan scan converter 104c. Thereafter, the data is mixed with and superposed on the sub-picture data in accordance with the display type (HD, SD wide, SD 4:3, SD pan-scan, SD letterbox) and graphic data by a mixer 104a in the subsequent stage, and the video is output.

Figure 52:
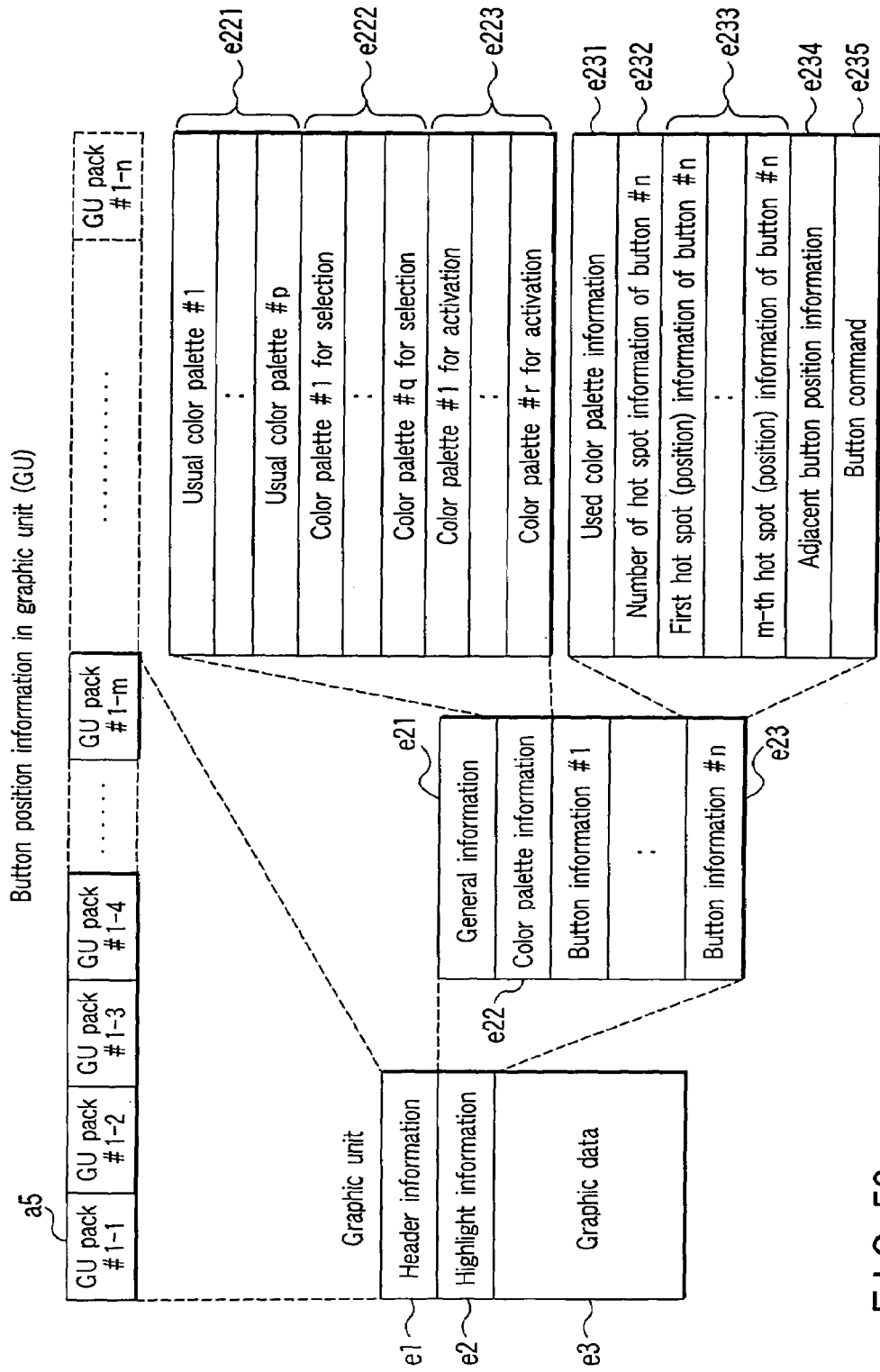
FIG. 52 is an explanatory view of button position information in the graphic unit.

FIG. 52 shows another example having button position information in the data structure of the graphic unit (GU) shown in FIGS. 41 and 42. As shown in FIG. 52, payload data of a plurality of GU packs a5 are connected to one another to constitute one graphic unit (GU). In the figure, additional data such as pack header and padding packet are not illustrated. The graphic unit (GU) is roughly constituted of header information e1, highlight information (HLI) e2, and graphic data e3, and does not have any mask data. Here, detailed contents of the highlight information (HLI) e2 will be described (the header information e1 and general information e21 are the same as those of FIGS. 41, 42).

The highlight information e2 includes general information e21, color pallet information e22, and one or more pieces of button information e23. The color pallet information e22 controls a button color on the menu, and comprises a plurality of usual color pallets e221 designated in non-highlighted button colors; a plurality of color pallets e222 for selection designated in highlighted/selected button colors by user's input selection of an arrow key or the like; and further a plurality of color pallets e223 for activation designated from selected colors to activated colors, when the user determines the highlighted/selected button.

The button information e23 includes use color pallet information e231 which designates numbers of a plurality of color pallets for usual use, selection and activation; the number e232 of pieces of hot spot information of the buttons, in which a plurality of selectable positions (hot spots) are given on the menu screen by one piece of button information; a plurality of pieces of hot spot (position) information e233 of the corresponding number of the buttons; adjacent button position information e234 which is information for moving the button to front/back/left/right buttons by user input; and a button command e235 executed when the button is activated. A command sequence in which one or more commands are continuously arranged can be constituted in the button command, and eight commands at maximum can be arranged in the present embodiment. When the button is activated, one to eight commands are continuously executed, and accordingly compound processes such as setting and branching can be executed at once.

Figure 53:
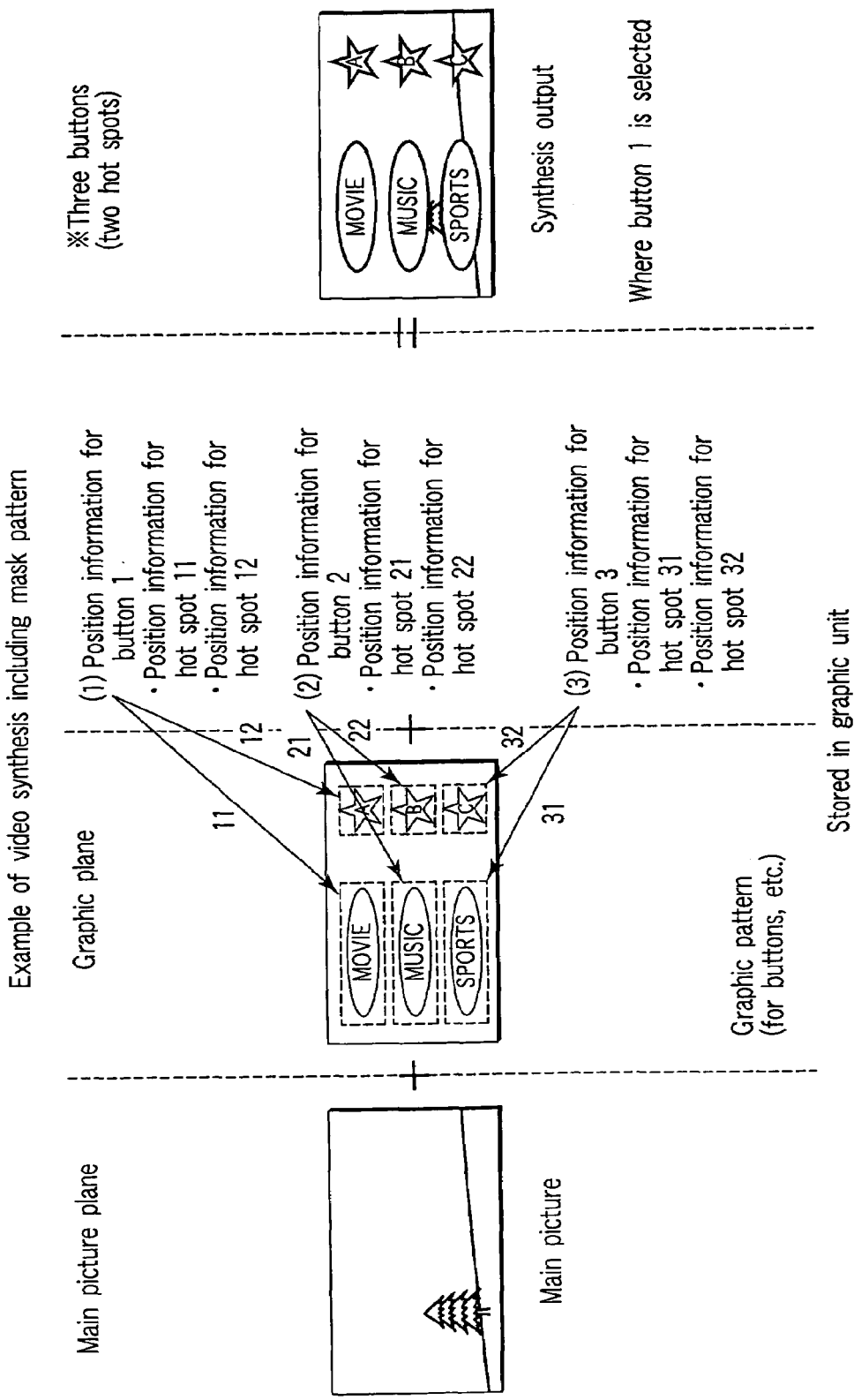
FIG. 53 is a diagram showing one example of video synthesis including the graphic unit having the button position information shown in FIG. 52.

FIG. 53 shows an example of video synthesis including the graphic unit having the button position information shown in FIG. 52. In FIG. 53, the video synthesis output comprises two planes of the main picture and graphic pattern (for buttons, etc.) and the button position information e233 of the respective buttons (the user can designate a plurality of pointable hot spots with respect to one piece of button information on the menu screen, the executed button command is the same). The main picture+graphic pattern+button position information (1) to (3) are superimposed upon one another to synthesize the video. In FIG. 53, the video synthesis output shows a state in which the button position information (1) is selected. The graphic pattern and each button position information are stored in the graphic unit. In the example of FIG. 53, two hot spots are designated in each button position information. The button position information (1) for button 1 includes position information of hot spots 11 and 12, and the respective spots correspond to elliptic and star-shaped buttons in an upper part of the graphic pattern. Even when either button is selected/activated, the same button command e235 is issued, and a selection/activation operation of the menu is the same. Similarly, the button position information (2) for button 2 includes the position information of hot spots 21 and 22, and the respective spots correspond to elliptic and star-shaped buttons in a middle part of the graphic pattern. The button position information (3) for button 3 includes position information of hot spots 31 and 32, and the respective spots correspond to elliptic and star-shaped buttons in a lower part of the graphic pattern.

Figure 54:
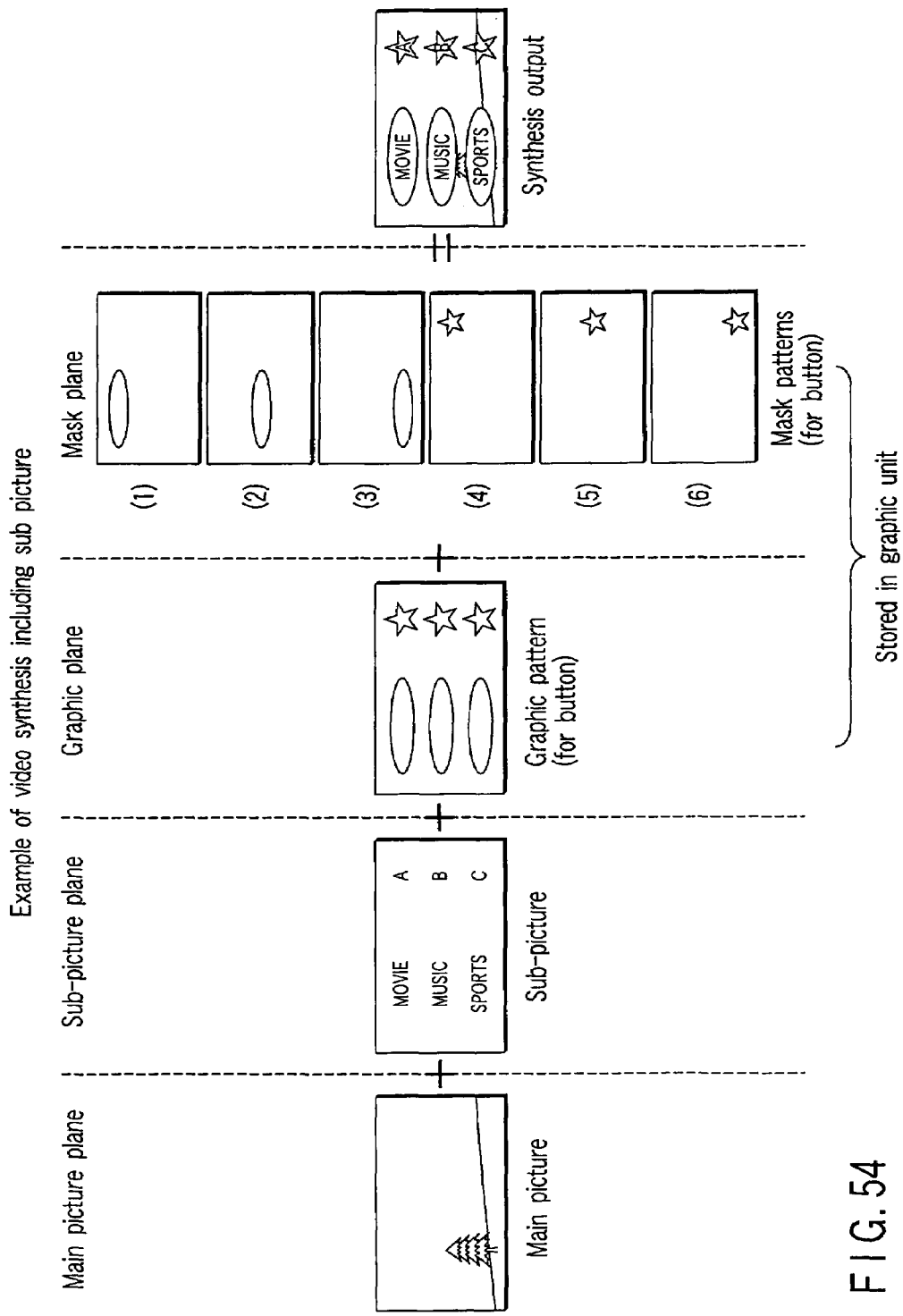
FIG. 54 is a diagram showing another example of the video synthesis in which the video synthesis shown in FIG. 45 further includes sub-picture data.

FIG. 54 shows an example of the video synthesis further including sub-picture data in the video synthesis shown in FIG. 45. In FIG. 54, a video synthesis output comprises four planes of the main picture, sub-picture, graphic pattern (for buttons, etc.), and mask pattern (for buttons, etc.), and data of the main picture+sub-picture+graphic pattern+mask pattern are superimposed upon one another to synthesize the video. In the mask plane, the buttons selected from the buttons (1) to (6) are superimposed. In FIG. 54, the video synthesis output shows a state in which the mask (button) pattern of (1) is selected. The data of the graphic pattern and the mask (button) pattern are stored in the graphic unit (GU).

Figure 55:
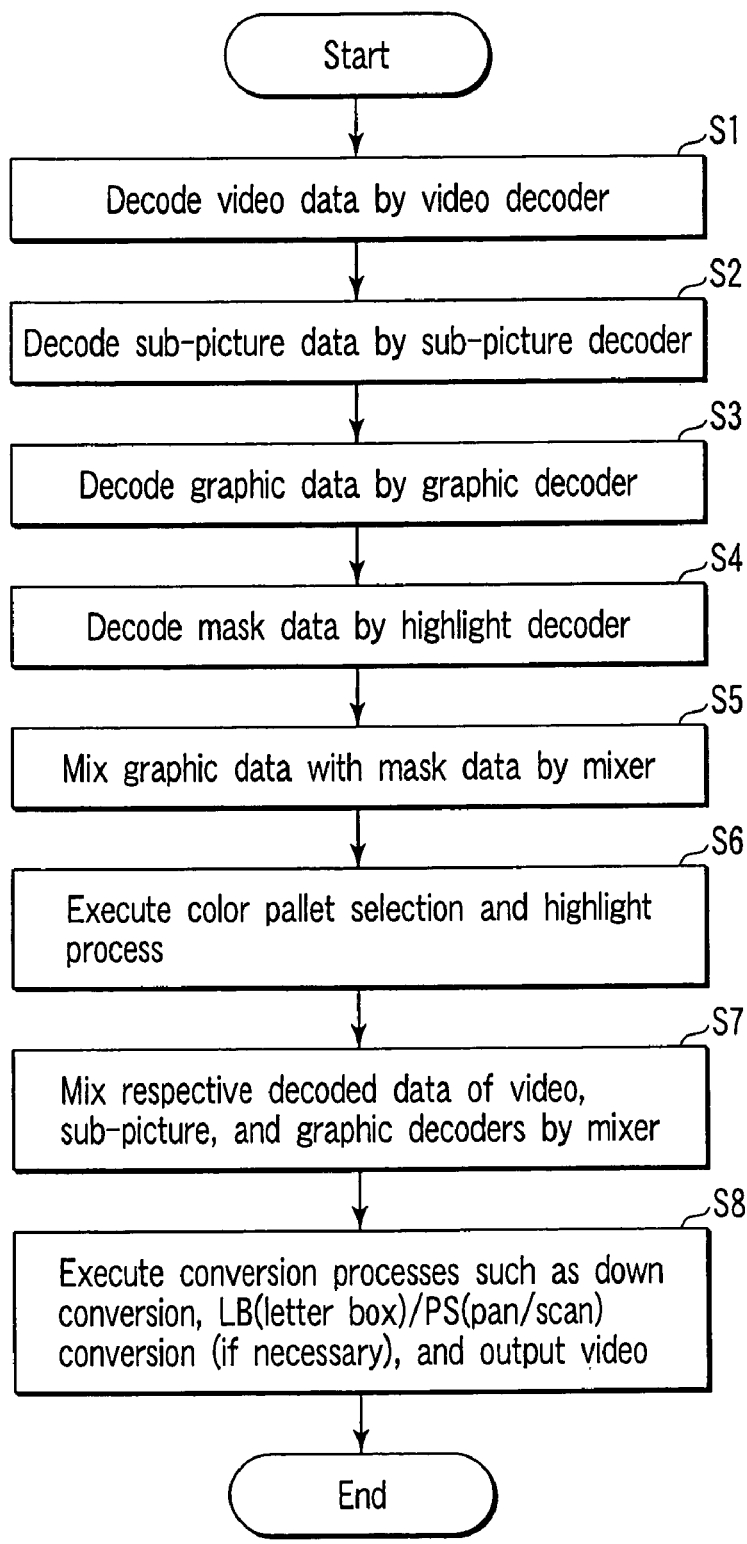
FIG. 55 is a diagram showing a flowchart of the video synthesis associated with the video decoder including the graphic decoder.

FIG. 55 shows a video synthesis flow associated with a video decoder including a graphic decoder. In FIG. 55, the video is synthesized as follows.

(1) The video data is decoded by the video decoder 111 (step S1).

(2) The sub-picture data is decoded by the sub-picture decoder 112 (step S2).

(3) The graphic data is decoded by the graphic decoder 113 (step S3)

(4) The mask data is decoded by the highlight decoder 113b (step S4).

(5) The graphic data is mixed with the mask data by the mixer 113d (step S5).

(6) Color pallet selection 113g and highlight process 113h are executed (step S6).

(7) The respective data decoded by the video, sub-picture, and graphic decoders are mixed by the mixer 104a or 104 104d (step S7).

(8) Conversion processes such as down conversion, letter-box (LB) conversion, and pan-scan (PS) conversion are executed if necessary, and the video is output (step S8).

As described above, in an information storage medium in which the graphic unit (GU) is recorded and a system capable of decoding the graphic unit (GU), not only conventional rectangular buttons but also complicated button shapes such as an elliptic shape and a star shape can be constructed by 256 color graphics, and varieties of menu screens can be presented to the user. Furthermore, since the graphic unit (GU) is constructed separately from a sub-picture stream for use in a subtitle or the like, a menu selection period can be set with time information of the graphic unit (GU) without being influenced by the display period of the sub-picture as in the DVD menu of the conventional SD. Therefore, contents producer's degree of freedom is broadened, and varieties of contents can be presented to the users.

Next, a modification of a sub-picture will be described.

FIG. 56 shows a data structure in a sub-picture unit (SPU). Behind a sub-picture unit header (SPUH), a bit map screen of a sub-picture is subjected to run length compression (a part of a data compression technique), and the screen is recorded in a pixel data region (PXD). Further, behind this screen, a sub-picture display control sequence table (SP_DCSQT) is recorded in which information is recorded such as a display position, size, or timing, before the run length compression, of the sub-picture recorded in the pixel data region (PXD) with respect to a main picture screen of the bit map screen. As shown in FIG. 58A, a data structure in the sub-picture unit header (SPUH) for use in the existing SD-DVD content comprises size information (SPU_SZ) of a sub-picture unit, and sub-picture display control sequence table start address information (SP_DCSQT_SA), and each information is represented by two bytes.

The definitions of the size information (SPU_SZ) of the sub-picture unit and the sub-picture display control sequence table start address information (SP_DCSQT_SA) are shown in FIG. 57. The sub-picture display control sequence table start address information (SP_DCSQT_SA) represents a relative address (data size) from a start position of the sub-picture unit header (SPUH) to a sub-picture display control sequence table start position. The size information (SPU_SZ) of the sub-picture unit represents the size of the whole sub-picture unit (SPU), and this value needs to be set to 53,220 bytes or less in the existing SD-DVD. The existing SD-DVD video specifications support an only standard definition (SD) image having a resolution of 480 lines×720 pixels at maximum, for example, in National Television System Committee (NTSC). On the other hand, a high definition (HD) image having a high resolution of, for example, 1,080 lines×1,920 pixels is supported as video information in the NTSC, and a sub-picture stream having the corresponding high resolution is to be recorded. In this case, a problem occurs that the stream does not enter the existing sub-picture unit (SPU) whose upper limit is defined as 53,220 bytes. Similarly, a size of the sub-picture display control sequence table (SP_DCSQT) in which information such as the display position of the sub-picture screen is recorded needs to be also increased. Therefore, as shown in FIG. 58C, in the sub-picture unit header (SPUH) corresponding to the HD, the size information (SPU_SZ) of the sub-picture unit is expanded to four-byte presentation from conventional two-byte presentation, and 393,216 bytes at maximum can be set. The sub-picture display control sequence table start address information (SP_DCSQT_SA) is also expanded to the four-byte presentation from the conventional two-byte presentation. Furthermore, the information is structured in such a manner as to aim at compatibility of the data structure with respect to the existing SD-DVD contents. That is, in the structure, the sub-picture unit headers (SPUHs) for the SD and the HD can be distinguished from each other by information of two bytes from the head of the sub-picture unit header (SPUH). When information other than '0000h' is recorded in the information of two bytes from the head of the sub-picture unit header (SPUH), the sub-picture unit header (SPUH) for the SD is identified, and it is recognized that the information of two bytes indicates the size information (SPU_SZ) of the sub-picture unit. Conversely, when the two-byte information is '0000h', the sub-picture unit header (SPUH) for the HD is identified, and the two-byte information is distinguished as ID information (SPU_ID) for the sub-picture unit for the HD, recorded in a pre-header (PRE_HEAD) of the sub-picture unit. In the sub-picture unit header (SPUH) for the HD, the size information (SPU_SZ) of the sub-picture unit and the sub-picture display control sequence table start address information (SP_DCSQT_SA) are recorded in a post-header (POST_HEAD) of the sub-picture unit.

Figure 61:
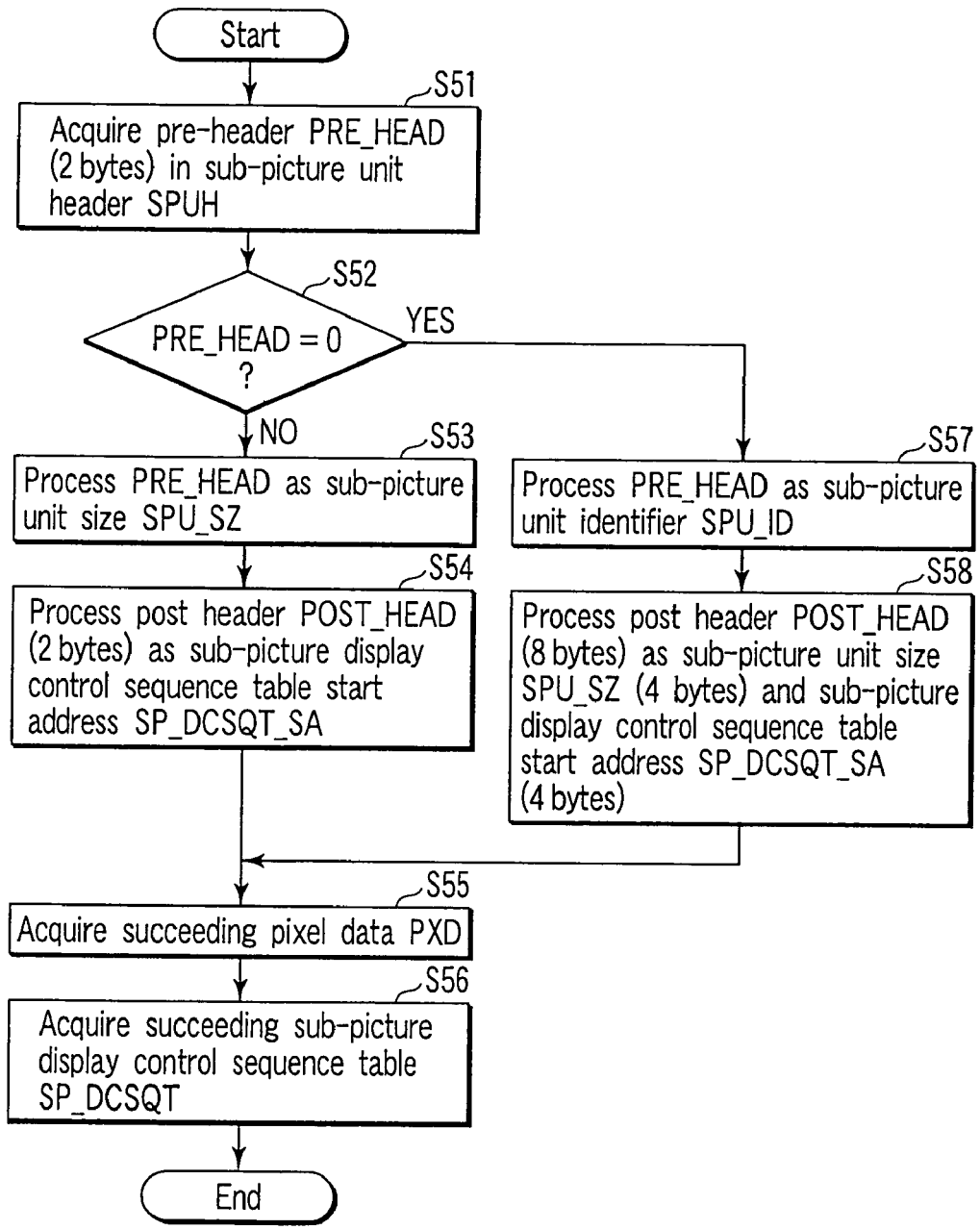
FIG. 61 is a flowchart showing presentation of the sub-picture unit performed in accordance with the contents of a pre-header in the sub-picture unit header (SPUH).

A flowchart for reproducing the sub-picture unit in accordance with the identified type based on the above-described contents is shown in FIG. 61.

First, a two-byte preceding header (PRE_HEAD) in the sub-picture unit header (SPUH) is acquired (S51), and it is determined whether or not the data in the PRE_HEAD is '0000h' (S52). When the data is other than '0000h', two-byte PRE_HEAD is processed as the sub-picture unit size (SPU_SZ) (S53), and a two-byte post-header (POST_HEAD) is processed as the sub-picture display control sequence table start address (SP_DCSQT_SA) (S54).

When the data in the PRE_HEAD is '0000h', the two-byte PRE_HEAD is process as a sub-picture unit identifier (SPU_ID) (S57), and an eight-byte post-header (POST_HEAD) is processed as a four-byte sub-picture unit size (SPU_SZ) and a four-byte sub-picture display control sequence table start address (SP_DCSQT_SA) (S58).

In either case, subsequently, after acquiring the succeeding pixel data (PXD) (S55), the succeeding sub-picture display control sequence table (SP_DCSQT) is acquired (S56).

The data structure in the sub-picture unit header (SPUH) for the HD, shown in FIG. 58C, is re-drawn from another viewpoint, and shown in FIGS. 59A, 59B, and 59C.

With respect to a list of sub-picture display control commands (SP_DCCMDs) recordable in the sub-picture display control sequence table (SP_DCSQT), as shown in FIG. 60, a display region of pixel data which is a command with respect to the sub-picture having a high resolution corresponding to an HD content is added as Setting 2 (SET_DAREA2), a display start address of the pixel data is added as Setting 2 (SET_DSPXA2), and changes of color and contrast of the pixel data are added as Setting 2 (CHG_COLCON2). The SET_DAREA2 which is Setting 2 of the display region of the pixel data is a command which designates a display range of the sub-picture bit map screen in the main picture screen in the same manner as in the SET_DAREA, and conditions for setting a designated value of the display range for the HD picture are added to those for the conventional SD picture. In the SET_DSPXA2 which is Setting 2 of the display start address of the pixel data, five-byte presentation (of the SET_DSPXA) is expanded to eight-byte presentation in such a manner that the display start position of the PXD data can be addressed/designated in accordance with the high resolution of the HD with a command to designate the display start address in the main picture screen of the sub-picture bit map screen in the same manner as in the SET_DSPXA. The CHG_COLCON2 which is Setting 2 of the changes of the color and contrast of the pixel data is a command which designates the changes of the color and contrast of the sub-picture bit map screen in the same manner as in the CHG_COLCON.

As described above, according to the present embodiment, the size information (SPU_SZ) of the sub-picture unit (SPU) for HD content is expanded to four bytes from two bytes for SD content, the sub-picture display control sequence table start address information (SP_DCSQT) is also expanded to four bytes from two bytes for SD content, and the first two bytes of the sub-picture unit header (SPUH) comprise the identification information (SPU_ID) indicating whether the sub-picture unit corresponds to SD content or HD content. Accordingly, compatibility with a processing circuit or a reproduction control program for use in a conventional DVD player can be kept, and the sub-picture stream for HD content can be recorded without changing the data structure in the sub-picture unit (SPU).

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, some constituting elements may be deleted from all the constituting elements described in the embodiments. Furthermore, the constituting elements in the different embodiments may be appropriately combined.

What is claimed is:

1. An information reproduction apparatus for reproducing an information storage medium which records a video object unit comprising sub-picture packs,
the sub picture packs comprising a first sub-picture unit for a standard definition content and a second sub-picture unit for a high-definition content,
the first sub-picture unit comprising a first sub-picture unit header of four bytes, pixel data, and a sub-picture display control sequence table,
the second sub-picture unit comprising a second sub-picture unit header of ten bytes, pixel data, and a sub-picture display control sequence table,
the first sub-picture unit header comprising size information of the first sub-picture unit of two bytes and a sub-picture display control sequence table start address of two bytes,
the second sub-picture unit header comprising a pre-header of two bytes and a post-header of eight bytes,
the post-header comprising size information of the second sub-picture unit of four bytes and a sub-picture display control sequence table start address of four bytes,
the pre-header of two bytes being 0, and
the size information of the first sub-picture unit of two bytes being other than 0,
the apparatus comprising:
means for reading data of a first two bytes of the first sub-picture unit and data of the first two bytes of the second sub-picture unit;
means for determining whether the data of the first two bytes is 0 or other than 0; and
means for reproducing the second sub-picture unit by processing four bytes succeeding to the pre-header as the size information of the second sub-picture unit and further succeeding four bytes as a sub-picture display control sequence table start address when the determining means determines that the data of the first two byte is 0, and for reproducing the first sub-picture unit by processing the data of the first two bytes as the size information of the first sub-picture unit and further succeeding two bytes as the sub-picture display control sequence table start address when the determining means determines that the data of the first two byte is other than 0.

2. The information reproduction apparatus according to claim 1, wherein a sub-picture display control sequence table in the second sub-picture unit comprises a control command for a standard definition content and a control command for a high definition content.

3. An information reproduction method for reproducing an information storage medium which records a video object unit comprising sub-picture packs,
the sub picture packs comprising a first sub-picture unit for a standard definition content and a second sub-picture unit for a high-definition content,
the first sub-picture unit comprising a first sub-picture unit header of four bytes, pixel data, and a sub-picture display control sequence table,
the second sub-picture unit comprising a second sub-picture unit header of ten bytes, pixel data, and a sub-picture display control sequence table,
the first sub-picture unit header comprising size information of the first sub-picture unit of two bytes and a sub-picture display control sequence table start address of two bytes,
the second sub-picture unit header comprising a pre-header of two bytes and a post-header of eight bytes,
the post-header comprising size information of the second sub-picture unit of four bytes and a sub-picture display control sequence table start address of four bytes,
the pre-header of two bytes being 0, and
the size information of the first sub-picture unit of two bytes being other than 0,
the method comprising steps of:
reading data of a first two bytes of the first sub-picture unit and data of the first two bytes of the second sub-picture unit;
determining whether the data of the first two bytes is 0 or other than 0; and
reproducing the second sub-picture unit by processing four bytes succeeding to the pre-header as the size information of the second sub-picture unit and further succeeding four bytes as a sub-picture display control sequence table start address when the determining means determines that the data of the first two byte is 0, and reproducing the first sub-picture unit by processing the data of the first two bytes as the size information of the first sub-picture unit and further succeeding two bytes as the sub-picture display control sequence table start address when the determining means determines that the data of the first two byte is other than 0.

4. The information reproduction method according to claim 3, wherein a sub-picture display control sequence table in the second sub-picture unit comprises a control command for a standard definition content and a control command for a high definition content.

* * * * *